US012386425B2

(12) United States Patent
Hu et al.

(10) Patent No.: US 12,386,425 B2
(45) Date of Patent: Aug. 12, 2025

(54) TACTILE FEEDBACK SYSTEM

(71) Applicant: TDK TAIWAN CORP., Taoyuan (TW)

(72) Inventors: Chao-Chang Hu, Taoyuan (TW); Mao-Kuo Hsu, Taoyuan (TW); Ching-Chieh Huang, Taoyuan (TW); Guan-Yu Su, Taoyuan (TW); Po-Xiang Zhuang, Taoyuan (TW); Wei-Jhe Shen, Taoyuan (TW); Yi-Ho Chen, Taoyuan (TW); Ko-Lun Chao, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 307 days.

(21) Appl. No.: 17/649,318

(22) Filed: Jan. 28, 2022

(65) Prior Publication Data

US 2022/0244785 A1 Aug. 4, 2022

Related U.S. Application Data

(60) Provisional application No. 63/276,237, filed on Nov. 5, 2021, provisional application No. 63/230,990, filed
(Continued)

(51) Int. Cl.
| | |
|---|---|
| *G06F 3/01* | (2006.01) |
| *G02B 27/64* | (2006.01) |
| *G08B 6/00* | (2006.01) |
| *H02K 11/215* | (2016.01) |
| *H02K 33/18* | (2006.01) |
| *H02K 41/035* | (2006.01) |

(52) U.S. Cl.
CPC ............... *G06F 3/016* (2013.01); *G08B 6/00* (2013.01); *H02K 11/215* (2016.01); *H02K 33/18* (2013.01); *H02K 41/0356* (2013.01); *G02B 27/646* (2013.01)

(58) Field of Classification Search
CPC ........ G06F 3/016; G06F 3/038; G06F 3/0414; G08B 6/00; H02K 11/215; H02K 33/18; H02K 41/0356; G02B 27/646
See application file for complete search history.

(56) References Cited

U.S. PATENT DOCUMENTS

2001/0010513 A1* 8/2001 Rosenberg .......... G06F 3/03545
345/156
2006/0241864 A1* 10/2006 Rosenberg .............. G06F 3/016
701/469
(Continued)

OTHER PUBLICATIONS

Partial European Search Report for Application No. 22153856.4 dated May 31, 2022.
(Continued)

*Primary Examiner* — Quan Zhen Wang
*Assistant Examiner* — Mancil Littlejohn, Jr.
(74) *Attorney, Agent, or Firm* — MUNCY, GEISSLER, OLDS & LOWE, P.C.

(57) ABSTRACT

A tactile feedback system is provided, including a fixed part, a movable part, and a driving assembly. The fixed part is affixed to an electronic device. The movable part can move relative to the fixed part. The driving assembly is configured to drive the movable part to move relative to the fixed part, thereby generating a tactile feedback force to a user.

14 Claims, 65 Drawing Sheets

Related U.S. Application Data on Aug. 9, 2021, provisional application No. 63/143,344, filed on Jan. 29, 2021.

(56) References Cited

U.S. PATENT DOCUMENTS

| | | | |
|---|---|---|---|
| 2010/0156818 A1* | 6/2010 | Burrough | G06F 3/04883 345/173 |
| 2012/0256864 A1* | 10/2012 | Miki | G06F 3/041 345/173 |
| 2018/0059793 A1* | 3/2018 | Hajati | H02K 33/02 |
| 2018/0113520 A1* | 4/2018 | Klein | G06F 1/1677 |
| 2019/0025926 A1 | 1/2019 | Harley et al. | |
| 2020/0081537 A1 | 3/2020 | Gordon et al. | |

OTHER PUBLICATIONS

Extended European Search Report issued on Aug. 16, 2022 for the corresponding Application No. 22153856.4, 14 pages.

* cited by examiner

TACTILE FEEDBACK SYSTEM

CROSS REFERENCE TO RELATED APPLICATIONS

This application claims the benefit of U.S. Provisional Application No. 63/143,344, filed Jan. 29, 2021, U.S. Provisional Application No. 63/230,990, filed Aug. 9, 2021, and U.S. Provisional Application No. 63/276,237, filed Nov. 5, 2021, the entirety of which are incorporated by reference herein.

BACKGROUND OF THE INVENTION

Field of the Invention

The present invention relates to a tactile feedback system, and, in particular, to tactile feedback system that has a sensing module.

Description of the Related Art

Conventional electronic devices (e.g. cell phones or tablet computers) usually have vibrators to provide tactile feedbacks to the users. As sensing technology has advanced, to expand the application of vibration tactile feedback becomes a challenge.

BRIEF SUMMARY OF THE INVENTION

An embodiment of the present invention provides a tactile feedback system that includes a fixed part, a movable part, and a driving assembly. The fixed part is affixed to an electronic device. The movable part can move relative to the fixed part. The driving assembly is configured to drive the movable part to move relative to the fixed part, thereby generating a tactile feedback force to a user.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the embodiments of the tactile feedback system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

The first embodiment of the present disclosure is described below.

Figure 1:
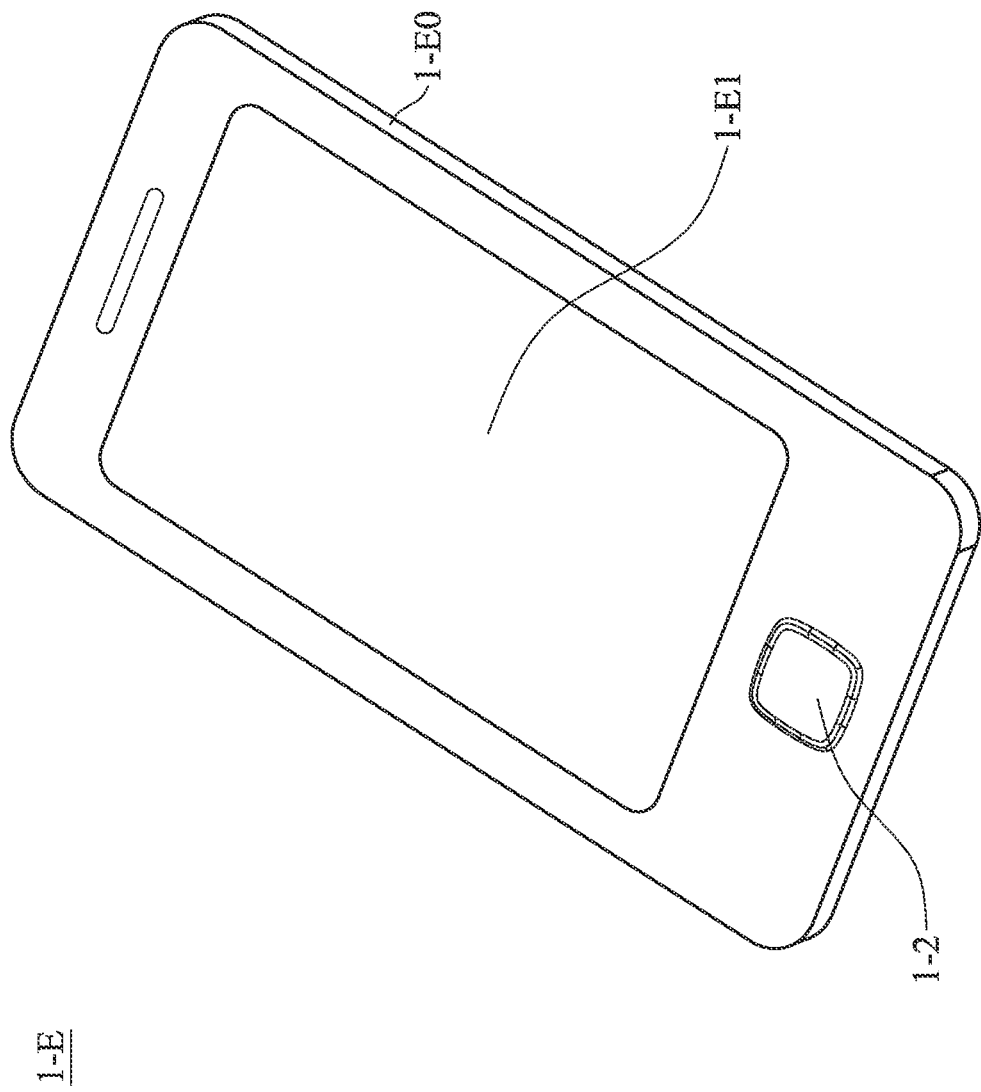
FIG. 1 is a perspective diagram of an electronic device 1-E in accordance with an embodiment of the invention.
Figure 2:
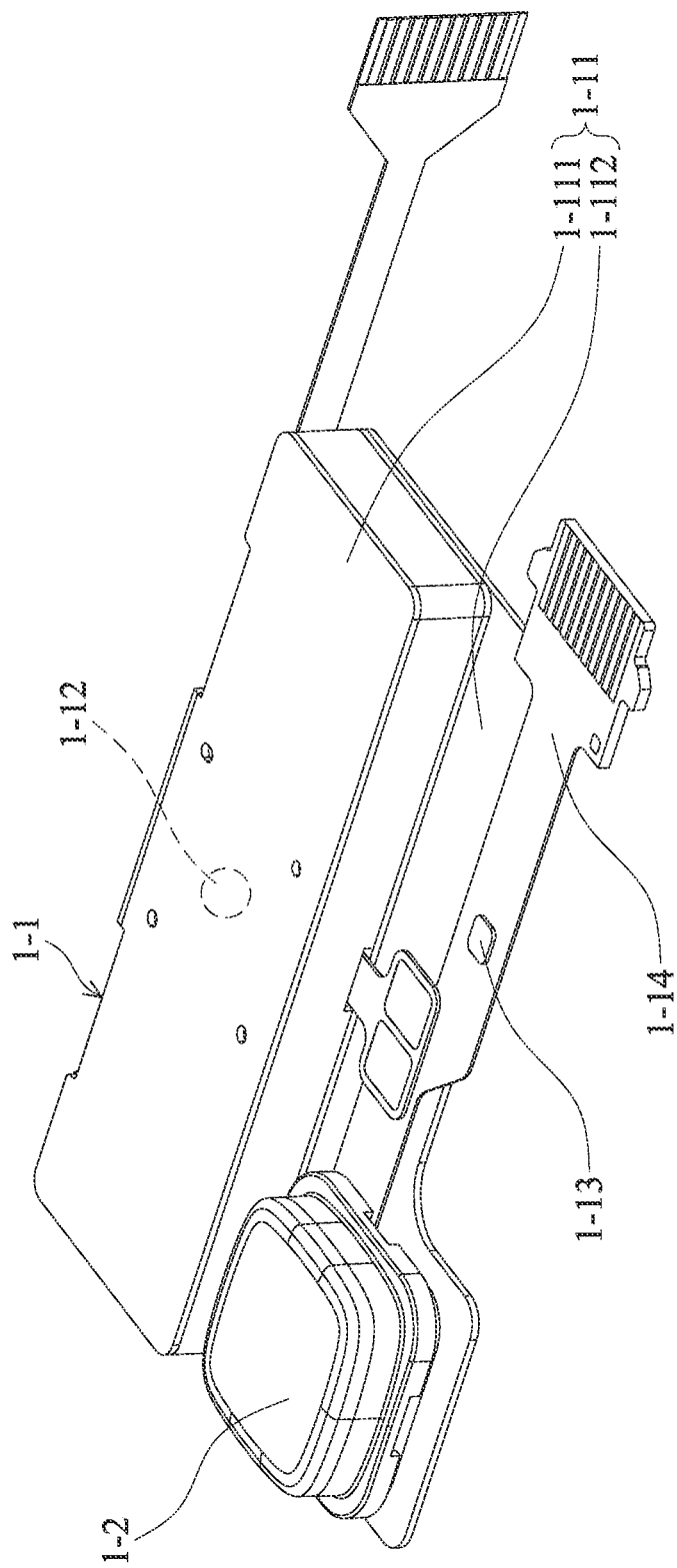
FIG. 2 is a perspective diagram of a tactile feedback system 1-1 and a sensing module 1-2 disposed in the electronic device 1-E of FIG. 1.

FIG. 1 is a perspective diagram of an electronic device 1-E in accordance with an embodiment of the invention. FIG. 2 is a perspective diagram of a tactile feedback system 1-1 and a sensing module 1-2 disposed in the electronic device 1-E of FIG. 1.

Referring to FIGS. 1 and 2, the electronic device 1-E in this embodiment may be a cell phone or a tablet computer that comprises a housing 1-E0 and a screen 1-E1 disposed on the housing 1-E0. Specifically, a sensing module 1-2 is disposed on a lower side of the housing 1-E0. The sensing module 1-2 may constitute at least a part of a touch pad, a button or other user interface of the electronic device 1-E. In some embodiments, the sensing module 1-2 may comprise an Optical Finger Navigation (OFN) sensor, gyroscope, accelerometer, tactile switch, fingerprint sensor, pressure sensor, sound wave sensor, gas sensor, temperature sensor, or gas concentration sensor, not limited to the embodiments of the invention.

As shown in FIG. 2, a tactile feedback system 1-1 is connected to the sensing module 1-2 and accommodated in the housing 1-E0 of the electronic device 1-E. The tactile feedback system 1-1 primarily comprises a fixed part 1-11 (including a frame 1-111 and a flat base 1-112), a vibrator 1-12 (movable part), a control unit 1-13, and a circuit assembly 1-14. The frame 1-111 is affixed in the housing 1-E0, and the base 1-112 is affixed to the bottom of the frame 1-111. The vibrator 1-12 can move in the frame 1-111 to provide vibration feedback (tactile feedback force) to the users.

It should be noted that the sensing module 1-2, the circuit assembly 1-14, and the control unit 1-13 on the circuit assembly 1-14 are all affixed to the base 12 and located outside the frame 1-111. The sensing module 1-2 and the control unit 1-13 can be electrically connected to a CPU of the electronic device 1-E via the circuit assembly 1-14.

In some embodiments, the sensing module 1-2 can also be disposed in other positions of the electronic device 1-E. For example, the sensing module 1-2 can be disposed on the housing 1-E0, on a circuit board (not shown) or on a flat member that is received in the housing 1-E0. Moreover, the frame 1-111 and the circuit assembly 1-14 may also be affixed to the housing 1-E0 or a flat member (e.g. circuit board) that is received in the housing 1-E0, not limited to the embodiments of the invention.

The control unit 1-13 may comprise a controller IC, and it can transmit a control signal through the circuit assembly 1-14 to a driving assembly (not shown) in the frame 1-111, thereby driving the vibrator 1-12 (movable part) to vibrate relative to the frame 1-111.

In this embodiment, the driving assembly may comprise a coil disposed on the frame 1-111 and a magnet disposed on the vibrator 1-12. When an electrical current (control signal) is applied to the coil, the magnet and the vibrator 1-12 can be driven to move relative to the frame 1-111. For example, the fixed part 1-11, the vibrator 1-12 (movable part), and the driving assembly constitute at least a part of a linear resonant actuator (LRA) in the electronic device 1-E.

Figure 3:
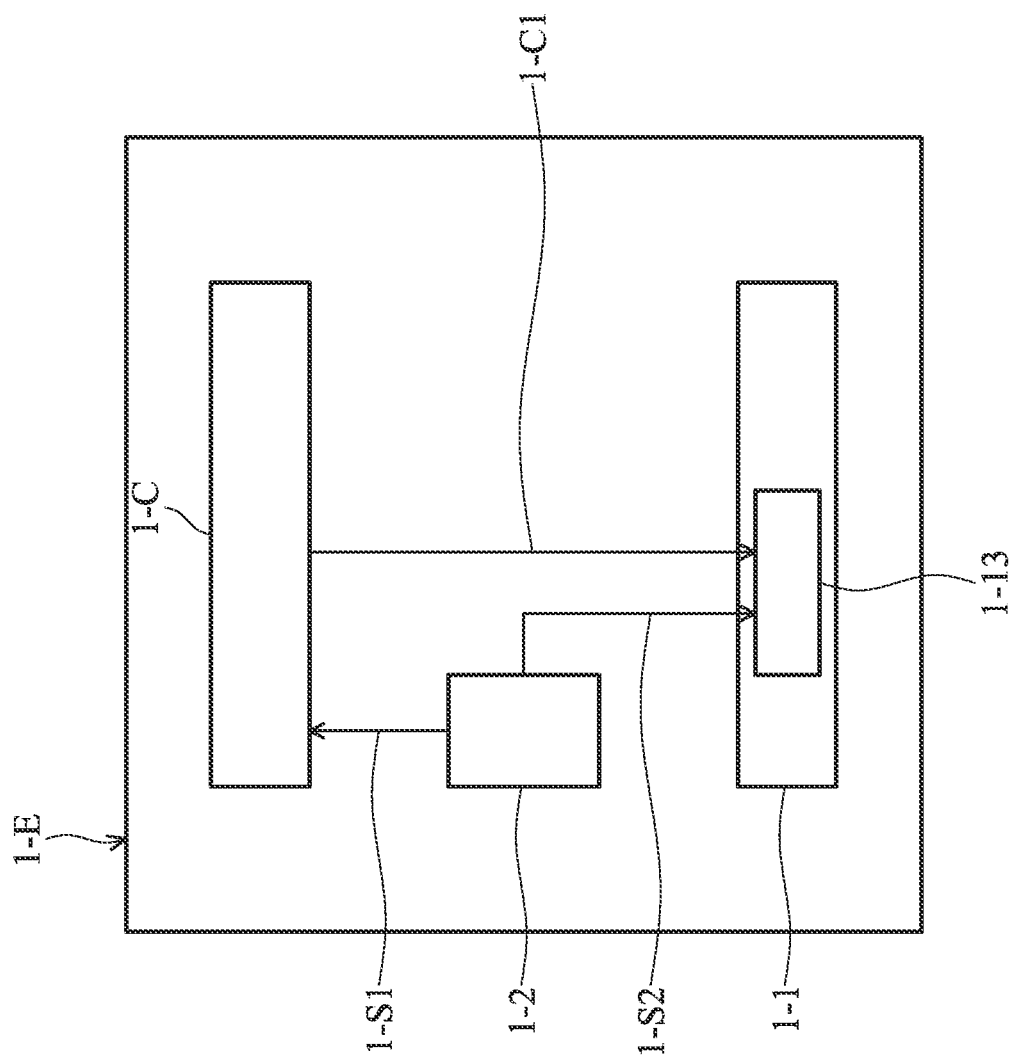
FIG. 3 is a function block diagram of the tactile feedback system 1-1, the sensing module 1-2 and the CPU 1-C in the electronic device 1-E.

FIG. 3 is a function block diagram of the tactile feedback system 1-1, the sensing module 1-2 and the CPU 1-C in the electronic device 1-E. As shown in FIG. 3, the sensing module 1-2 can detect the posture, velocity, acceleration of the electronic device 1-E or the user's input (e.g. touch or click) and then output a first sensing signal 1-S1 to the CPU 1-C in the electronic device 1-E accordingly. Subsequently, the CPU 1-C transmits a command signal 1-C1 to the control unit 1-13 according to the first sensing signal 1-S1, whereby the control unit 1-13 can be adjusted to a specific control mode. In this embodiment, when different postures of the electronic device 1-E are detected, the vibrator 1-12 can be driven to vibrate at different amplitudes correspondingly. That is, the control unit 1-13 can output control signals of different modes according to the command signal 1-C1, thereby providing various kinds of tactile feedbacks to the users.

Additionally, the sensing module 1-2 can further transmit a second sensing signal 1-S2 to the control unit 1-13 by detecting the posture, velocity, or acceleration of the electronic device 1-E, and the second sensing signal 1-S2 does not pass through the CPU 1-C. In this embodiment, the second sensing signal 1-S2 may be greater than, less than or equal to the first sensing signal 1-S1.

It should be noted that the control unit 1-13 can output the control signal to the driving assembly (e.g. the coil disposed on the frame 1-111) according to both of the command signal 1-C1 and the second sensing signal 1-S2. Thus, the vibrator 1-12 can be driven to move relative to the frame 1-111 and provide appropriate vibration feedback to the users.

Figure 4:
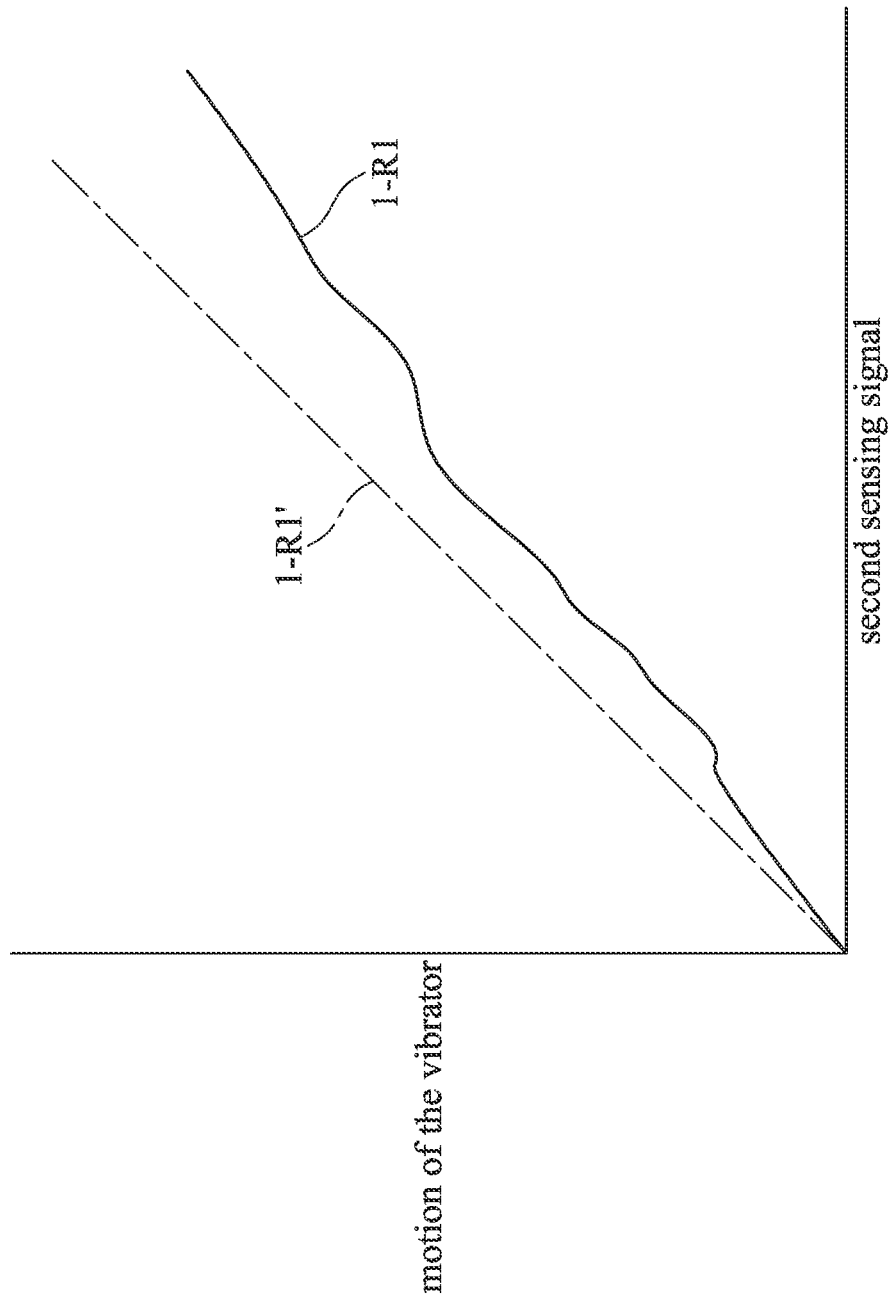
FIG. 4 is a schematic diagram of a first curve 1-R1 that represents the relationship between the motion of the vibrator 1-12 measured by an external equipment and the second sensing signal 1-S2 generated by the sensing module 1-2, wherein the first curve 1-R1 deviates from a first target curve 1-R1'.

FIG. 4 is a schematic diagram of a first curve 1-R1 that represents the relationship between the motion of the vibrator 1-12 measured by an external equipment and the second sensing signal 1-S2 generated by the sensing module 1-2, wherein the first curve 1-R1 deviates from a first target curve 1-R1'.

In this embodiment, an external equipment (not shown) can be used to measure a motion (e.g. displacement, velocity, or acceleration) of the vibrator 1-12 relative to the frame 1-111. Hence, a first curve 1-R1 (FIG. 4) can be obtained that represents the relationship between the motion of the vibrator 1-12 measured by the external equipment and the second sensing signal 1-S2 that is generated by the sensing module 1-2 detecting the motion of the vibrator 1-12.

Before the calibration process of the sensing module 1-2 is performed, the first curve 1-R1 may deviate from a first target curve 1-R1' as shown in FIG. 4. To address the deficiency, the external equipment can modify a setting parameter of the control unit 1-13 according to the first curve 1-R1, so as to achieve high motion control accuracy and efficiency of the vibrator 1-12 relative to the frame 1-111.

After the calibration process of the sensing module 1-2 (second sensing signal 1-S2), the tactile feedback system 1-1 can perform accurate closed-loop motion or amplitude control of the vibrator 1-12 according to the second sensing signal 1-S2, thus providing appropriate and precise vibration feedback to the users. It should be noted that the calibration process does not involve the CPU 1-C of the electronic device 1-E.

Figure 5:
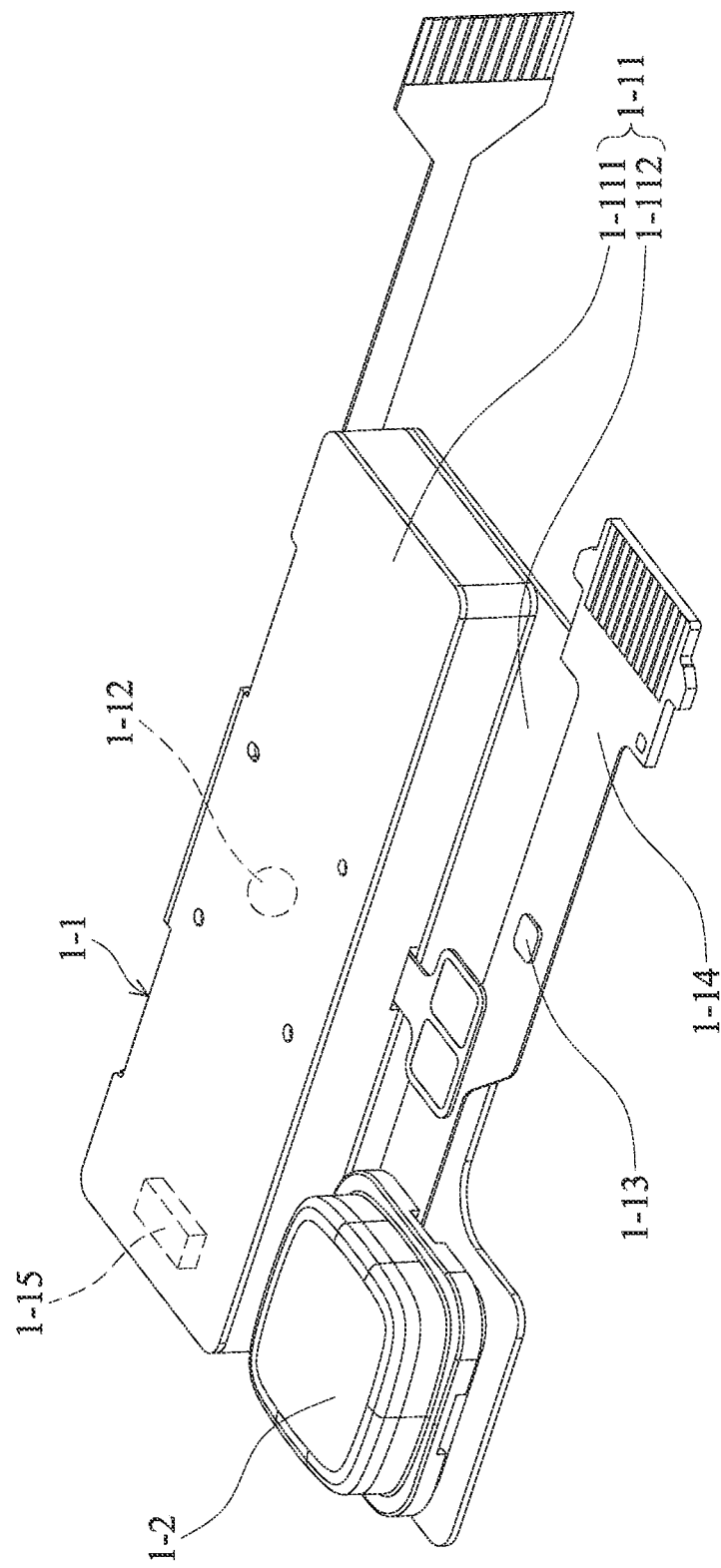
FIG. 5 is a perspective diagram of a tactile feedback system 1-1 and a sensing module 1-2 disposed in the electronic device 1-E, in accordance with another embodiment of the invention.
Figure 6:
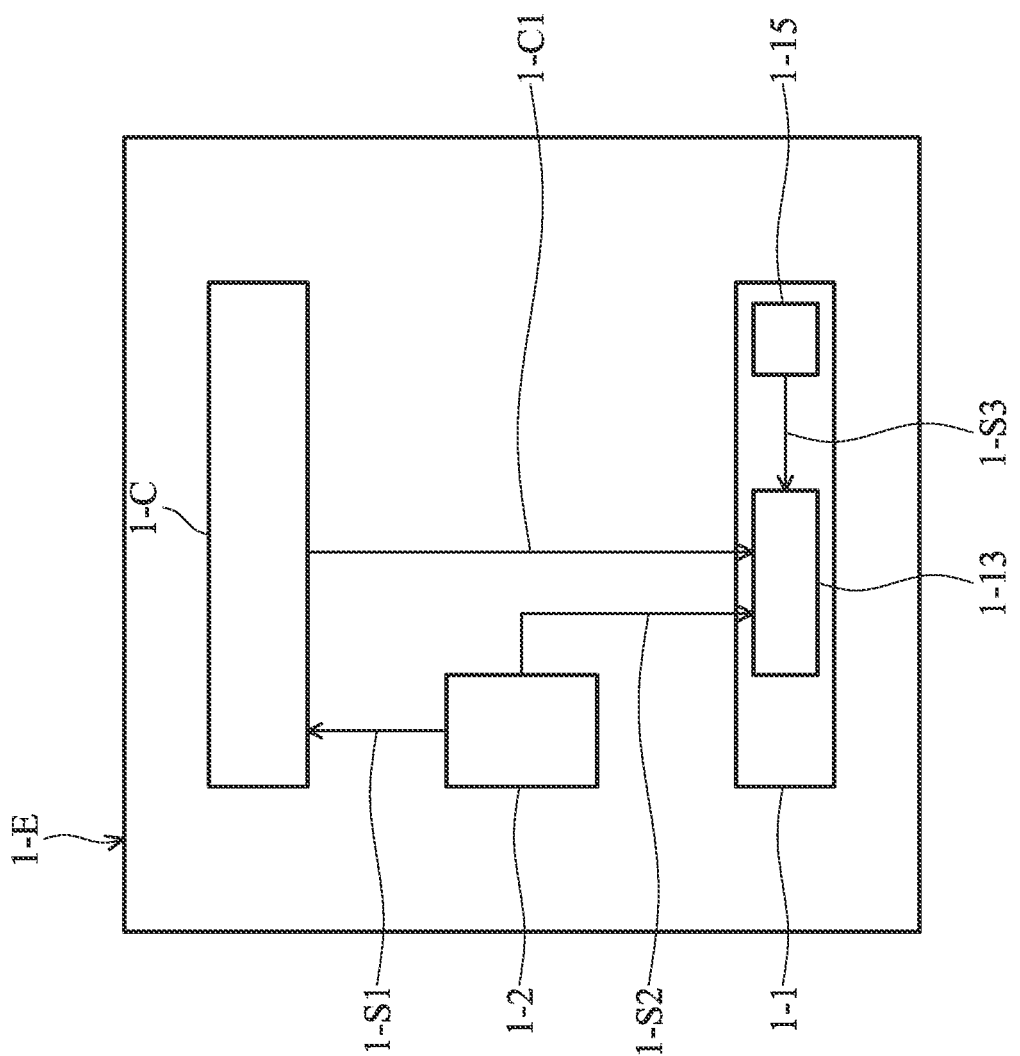
FIG. 6 is a function block diagram of the tactile feedback system 1-1, the sensing module 1-2 and the CPU 1-C in the electronic device 1-E, in accordance with another embodiment of the invention.
Figure 7:
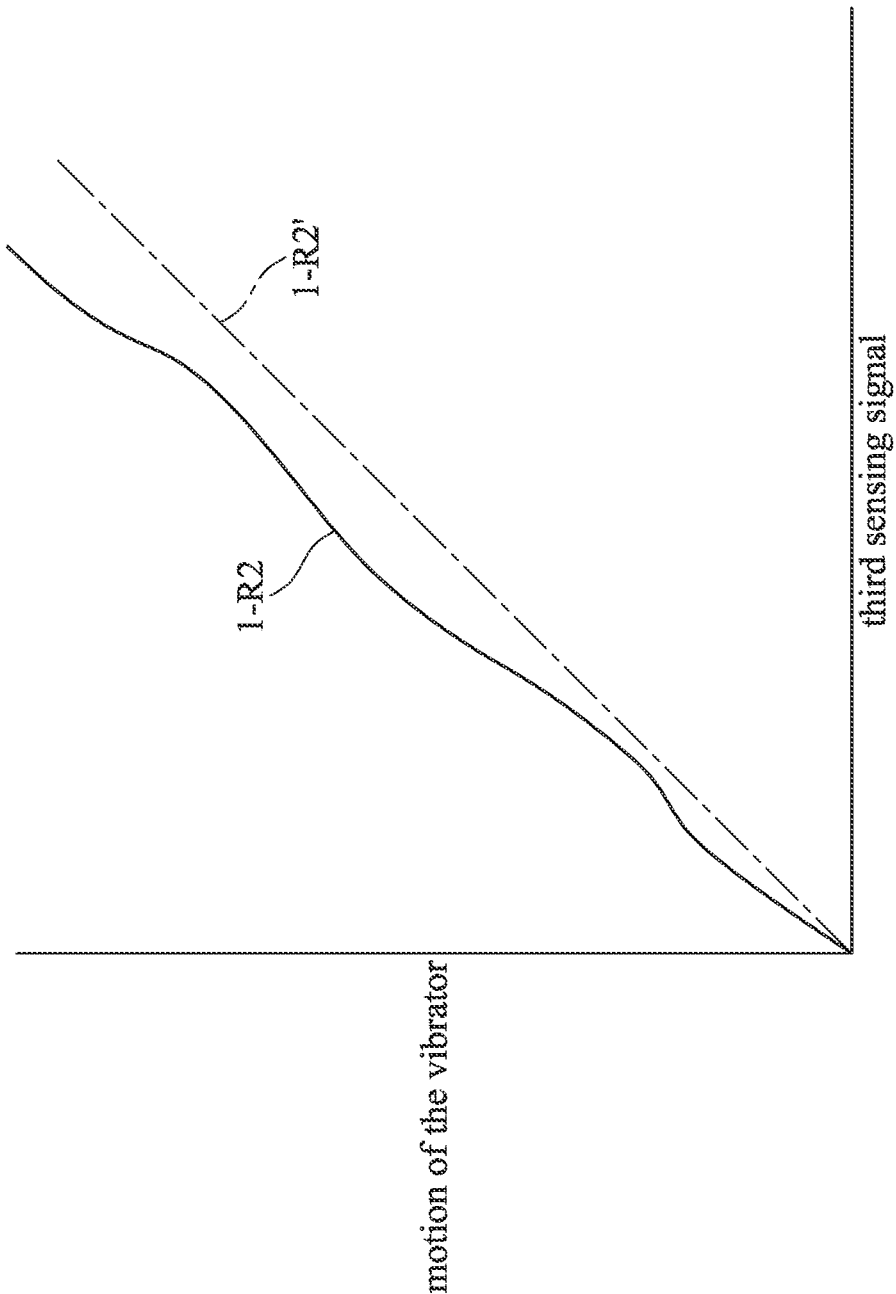
FIG. 7 is a schematic diagram of a second curve 1-R2 that represents the relationship between the motion of the vibrator 1-12 measured by an external equipment and the third sensing signal 1-S3 generated by the sensor element 1-15, wherein the second curve 1-R2 deviates from a second target curve 1-R2'.

FIG. 5 is a perspective diagram of a tactile feedback system 1-1 and a sensing module 1-2 disposed in the electronic device 1-E, in accordance with another embodiment of the invention. FIG. 6 is a function block diagram of the tactile feedback system 1-1, the sensing module 1-2 and the CPU 1-C in the electronic device 1-E, in accordance with another embodiment of the invention. FIG. 7 is a schematic diagram of a second curve 1-R2 that represents the relationship between the motion of the vibrator 1-12 measured by an external equipment and the third sensing signal 1-S3 generated by the sensor element 1-15, wherein the second curve 1-R2 deviates from a second target curve 1-R2'.

FIGS. 5-7 is different from the embodiment of FIGS. 2-4 in that a sensor element 1-15 (FIG. 5) is provided in the frame 1-111 to detect the motion of the vibrator 1-12 relative to the frame 1-111, and the sensor element 1-15 can transmit a third sensing signal 1-S3 to the control unit 1-13 accordingly (FIG. 6).

In some embodiments, the sensor element 1-15 may also be directly disposed on the frame 1-111 or the base 1-112, not limited to the embodiments of the invention. Here, the sensor element 1-15 may comprise a Hall sensor.

As shown in FIG. 6, the control unit 1-13 can output a control signal to the driving assembly according to the command signal 1-C1, the second sensing signal 1-S2, and the third sensing signal 1-S3 thereby driving the vibrator 1-12 (movable part) to vibrate relative to the frame 1-111 and providing precise vibration feedback to the users.

In this embodiment, an external equipment (not shown) can be used to measure a motion (e.g. displacement, velocity, or acceleration) of the vibrator 1-12 relative to the frame 1-111. Hence, a second curve 1-R2 (FIG. 7) can be obtained that represents the relationship between the motion of the vibrator 1-12 measured by the external equipment and the third sensing signal 1-S3 that is generated by the sensor element 1-15 detecting the motion of the vibrator 1-12.

Before the calibration process of the sensing module 1-2 is performed, the second curve 1-R2 may deviate from a second target curve 1-R2' as shown in FIG. 7. To address the deficiency, the external equipment can modify a setting parameter of the control unit 1-13 according to the first curve 1-R1 and the second curve 1-R2, so as to achieve high motion control accuracy and efficiency of the vibrator 1-12 relative to the frame 1-111.

After the calibration process of the sensing module 1-2 (second and third sensing signals 1-S2 and 1-S3), the tactile feedback system 1-1 can perform accurate closed-loop motion or amplitude control of the vibrator 1-12 according to the second and third sensing signals 1-S2 and 1-S3, thus providing comfortable and precise vibration feedback to the users. It should be noted that the calibration process does not involve the CPU 1-C of the electronic device 1-E.

In some embodiments, the sensing module 1-2 may comprise gyroscope and/or accelerometer to detect the posture of the electronic device 1-E. When the second sensing signal 1-S2 meets a first condition (e.g. the sensing module 1-2 detects the electronic device 1-E is oriented upward), the control unit 1-13 controls the vibrator 1-12 to move in a first mode (e.g. continuous vibration) via the driving assembly. In contrast, when the second sensing signal 1-S2 meets a second condition (e.g. the sensing module 1-2 detects the electronic device 1-E is oriented downward), the control unit 1-13 controls the vibrator 1-12 to move in a second mode (e.g. intermittent vibration) via the driving assembly.

The second embodiment of the present disclosure is described below.

The optical component driving mechanism of the embodiment of the present invention is described below. However, it can be easily understood that the embodiments of the present invention provide many suitable inventive concepts and can be implemented in a wide variety of specific backgrounds. The specific embodiments disclosed are only used to illustrate the use of the present invention in a specific method, and are not used to limit the scope of the present invention. Unless otherwise defined, all terms used here (including technical and scientific terms) have the same meanings commonly understood by the general artisans to whom the disclosures in this article belong. It is understandable that these terms, such as the terms defined in commonly used dictionaries should be interpreted as having a meaning consistent with the relevant technology and the background or context of this disclosure, and should not be interpreted in an idealized or excessively formal way, unless specifically defined herein.

Figure 8:
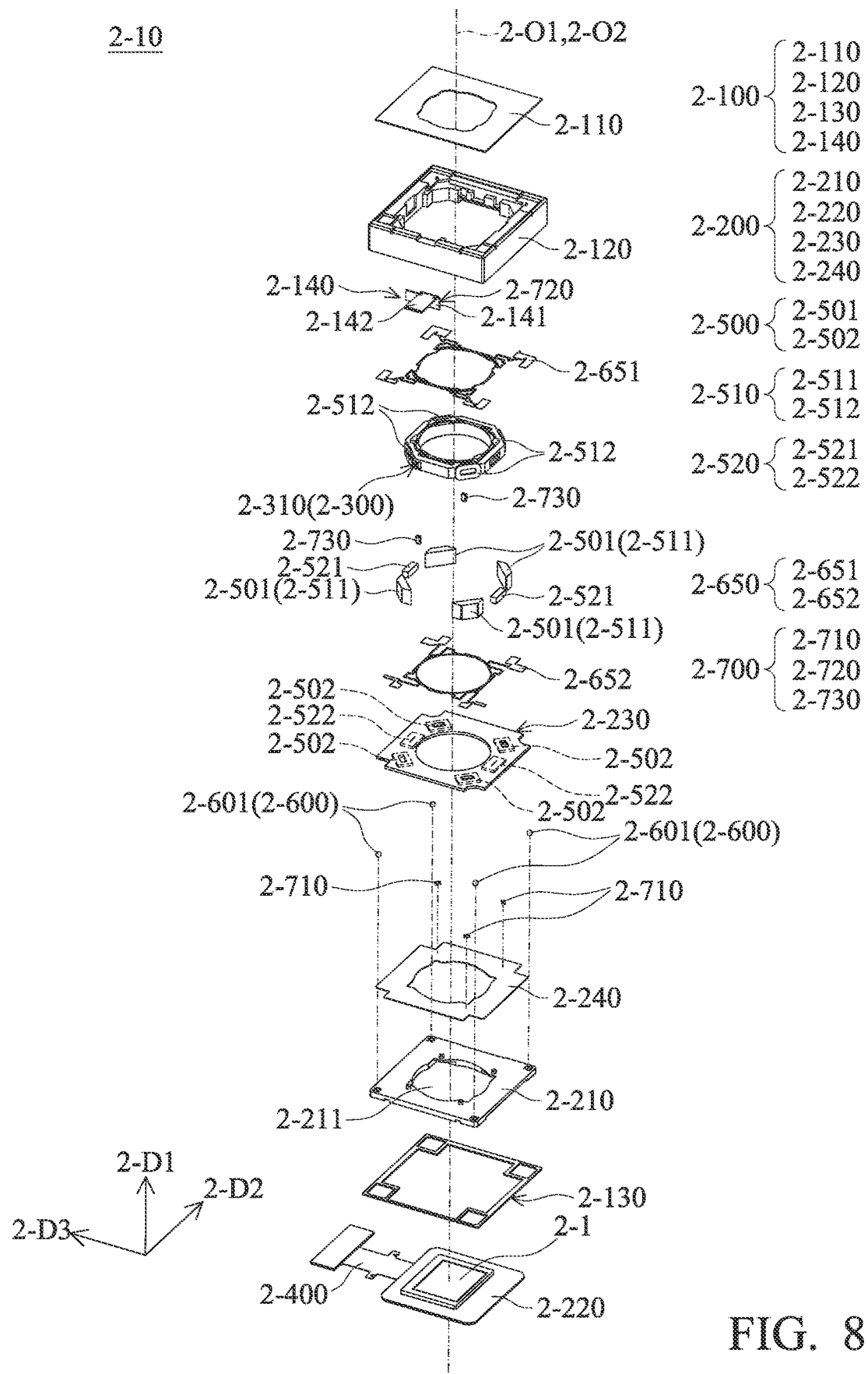
FIG. 8 shows an exploded view of an optical component driving mechanism, according to certain aspects of the present disclosure.

FIG. 8 shows an exploded view of an optical component driving mechanism 2-10, according to certain aspects of the present disclosure. The aforementioned optical component driving mechanism 2-10 may be disposed inside an electronic device such as a camera, a tablet computer, or a mobile phone, to obtain images. The aforementioned optical component driving mechanism 2-10 may relatively move both the first optical component 2-1 and the second optical component (not shown) disposed therein, so as to achieve the purpose of auto-focusing (AF) and optical image stabilization (OIS). The detailed structure of the optical component driving mechanism 2-10 is described below.

Figure 13:
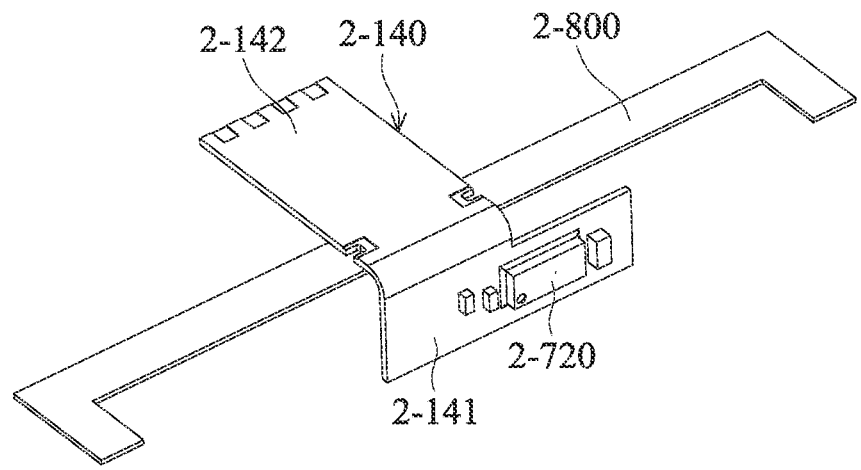
FIG. 13 shows a perspective view of the second circuit assembly, the second sensing component, and the strengthening assembly individually, according to certain aspects of the present disclosure.
Figure 13:
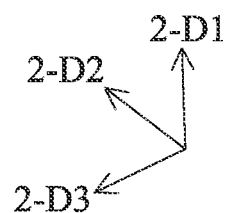
Figure 14:
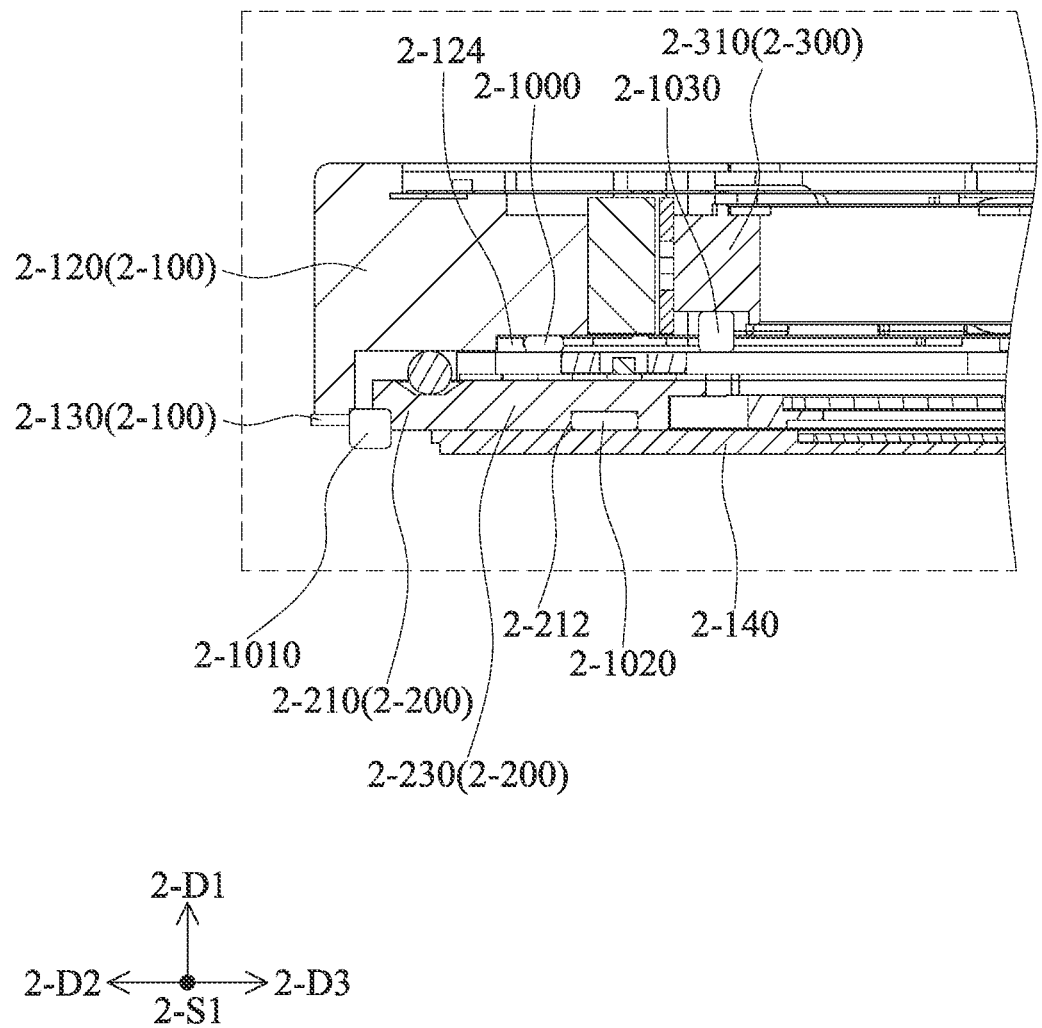
FIG. 14 is a schematic diagram showing the first shock absorbing component, the second shock absorbing component, the third shock absorbing component, and the fourth shock absorbing component, according to certain aspects of the present disclosure.

As shown in FIG. 1, the optical component driving mechanism 2-10 includes a fixed portion 2-100, a first movable portion 2-200, a second movable portion 2-300, a connecting portion 2-400, a first driving assembly 2-500, a second driving assembly 2-510, a third driving assembly 2-520, a first supporting assembly 2-600, a second supporting assembly 2-650, a sensing assembly 2-700, a strengthening assembly 2-800 (shown in FIG. 13), three magnetically permeable components 2-900 (shown in FIG. 18A to 11C), a first shock absorbing component 2-1000 (shown in FIG. 14), a second shock absorbing component 2-1010 (shown in FIG. 14), a third shock absorbing component 2-1020 (shown in FIG. 14), and a fourth shock absorbing component 2-1030 (shown in FIG. 14).

The fixed portion 2-100 includes a housing 2-110, a frame 2-120, and a base 2-130. The housing 2-110 has a plate-like structure, and the housing 2-110 is fixedly connected to the frame 2-120. The base 2-130 is fixedly connected to the frame 2-120. Details regarding the frame 2-120 are described in FIGS. 11A to 11C. In addition, the first movable portion 2-200 includes a first circuit assembly 2-220. The fixed portion 2-100 further includes a second circuit assembly 2-140.

The first circuit assembly 2-220 has a plate-like structure. The second circuit assembly 2-140 is disposed on the frame 2-120. The second circuit assembly 2-140 includes a first portion 2-141 and a second portion 2-142. Both the first portion 2-141 and the second portion 2-142 have a plate-like structure, and the first portion 2-141 and the second portion 2-142 are not parallel to each other.

The first movable portion 2-200 further includes a first holder 2-210, a third circuit assembly 2-230, and a fourth circuit assembly 2-240. The first holder 2-210 is fixedly connected to the first circuit assembly 2-220. The second movable portion 2-300 includes a second holder 2-310.

The first holder 2-210 is configured to connect a first optical component 2-1, and the second holder 2-310 is configured to connect a second optical component (not shown). In this embodiment, the first optical component 2-1 is configured to receive electromagnetic waves and output signals. The first optical component 2-1 and the second optical component may be optical components such as a photosensitive component, a camera lens, a lens, etc.

The first optical component 2-1 has a first optical axis 2-O1, and the second optical component has a second optical axis 2-O2. In this embodiment, the first optical axis 2-O1, the second optical axis 2-O2, and a main axis 2-D1 are substantially parallel. The first optical component 2-1 and the first circuit assembly 2-220 at least partially overlap when viewed along the first optical axis 2-O1. The first optical component 2-1 is electrically connected to the first circuit assembly 2-220.

Both the third circuit assembly 2-230 and the fourth circuit assembly 2-240 have a plate-like structure. The third circuit assembly 2-230 is disposed on the fourth circuit assembly 2-240. The third circuit assembly 2-230 is electrically connected to the first circuit assembly 2-220 via the fourth circuit assembly 2-240.

The optical component driving mechanism 2-10 may achieve the effect of optical image stabilization through the movement of the first movable portion 2-200 relative to the fixed portion 2-100. The optical component driving mechanism 2-10 may achieve the effect of auto-focusing through the movement of the second movable portion 2-300 relative to the fixed portion 2-100.

The optical component driving mechanism 2-10 carries the first optical component 2-1 and the second optical component (not shown). When the light from the outside enters the optical component driving mechanism 2-10, the incident light passes through from the light incident end (near the housing) to the light exit end. Between the light incident end to the light exit end, along the second optical axis of the second optical component, the light passes through the second optical component disposed in the optical component driving mechanism 2-10, and then to the first optical component 2-1 to obtain image. The connecting portion 2-400 is configured to connect the first circuit assembly 2-220 to an external circuit (not shown), wherein the first circuit assembly 2-220 or the connecting portion 2-400 may be connected to the external circuit through a flexible printed circuit board or TSA+ technique.

The first driving assembly 2-500 includes four first magnetic components 2-501 and four first coils 2-502. The second driving assembly 2-510 includes four second magnetic components 2-511 and four second coils 2-512. The third driving assembly 2-520 includes two third magnetic components 2-521 and two third coils 2-522.

The first magnetic component 2-501 and the second magnetic component 2-511 have an integrated structure, that is to say, the first magnetic component 2-501 and the second magnetic component 2-511 are not two separate components, and the first magnetic component 2-501 is also the second magnetic component element 2-511. In this way, the volume of the optical component driving mechanism 2-10 may be reduced to achieve miniaturization.

The first magnetic components 2-501, the second magnetic components 2-511, and the third magnetic components 2-521 are disposed on the frame 2-120. The first coils 2-502 and the third coils 2-522 are embedded in the third circuit assembly 2-230. The second coils 2-512 are disposed on the second holder 2-310.

The first driving assembly 2-500 is electrically connected to the first circuit assembly 2-220. The second driving assembly 2-510 is electrically connected to the second circuit assembly 2-140. The first driving assembly 2-500 is configured to drive the first holder 2-210 to move relative to the frame 2-120 in a first dimension. The first dimension is movement in the plane formed by a second axis 2-D2 and a third axis 2-D3. The second driving assembly 2-510 is configured to drive the second holder 2-310 to move relative to the frame 2-120 in a second dimension. The second dimension is movement along the second optical axis 2-O2.

One of the features of the present disclosure is that the optical component driving mechanism 2-10 in the present disclosure includes a third driving assembly 2-520. The third driving assembly 2-520 is configured to drive the first holder 2-210 to move relative to the frame 2-120 in a third dimension. The third dimension is rotation with a rotation axis as the axle center, and the rotation axis is parallel to the first optical axis 2-O1.

The first support assembly 2-600 may support the first holder 2-210 to move relative to the frame 2-120. The first support assembly 2-600 includes four support components 2-601. In this embodiment, the four support components 2-601 are all balls.

The second support assembly 2-650 may support the movement of the second holder 2-310 relative to the frame 2-120. The second support assembly 2-650 includes a first elastic component 2-651 and a second elastic component 2-652. The first support assembly 2-600 partially overlaps the second support assembly 2-650 when viewed along the first optical axis 2-O1. The second holder 2-310 is movably connected to the frame 2-120 via the first elastic component 2-651 and the second elastic component 2-652.

The sensing assembly 2-700 includes three first sensing components 2-710, one second sensing component 2-720, and two sensing magnets 2-730. The second sensing component 2-720 cannot be seen in the viewing angle of FIG. 8, the configuration of the second sensing component 2-720 on the second circuit assembly 2-140 is described in detail with respect to FIG. 12 to FIG. 13.

The aforementioned first sensing components 2-710 and the second sensing component 2-720 may be Hall effect sensors, and the sensing magnet 2-730 may be a permanent magnet. The Hall effect sensor may determine the position of the permanent magnet by detecting the change of the magnetic field of the permanent magnet, thereby increasing the accuracy of compensation or focusing.

In another embodiment, other types of alignment components/assemblies, such as a magnetoresistive sensor (MRS) or an optical sensor, may also be used to detect the relative position of the first movable portion 2-200 and the second movable portion 2-300.

The first sensing components 2-710 are configured to sense the movement of the first holder 2-210. The first sensing components 2-710 are disposed on the fourth circuit assembly 2-240 and are electrically connected to the fourth circuit assembly 2-240. The second sensing component 2-720 is configured to sense the movement of the second holder 2-310. The second sensing component 2-720 is electrically connected to the second circuit assembly 2-140. The second sensing component 2-720 is disposed on the first portion 2-141 of the second circuit assembly 2-140.

The first sensing components 2-710 and the second sensing component 2-720 do not overlap when viewed in any direction perpendicular to the main axis 2-D1. The sensing magnets 2-730 are disposed on the opposite sides of the second holder 2-310, the details of which will be shown in FIGS. 16A to 16B.

Figure 9A:
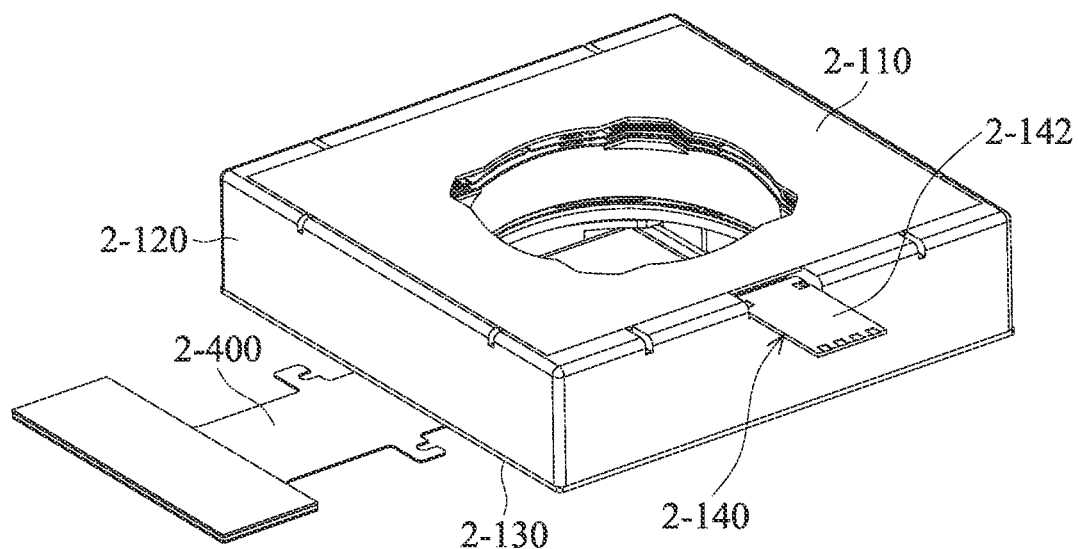
FIG. 9A is a perspective view of the optical component driving mechanism, according to certain aspects of the present disclosure.
Figure 9A:
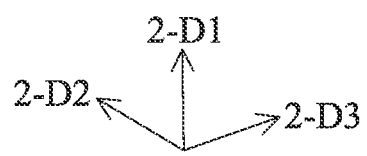

FIG. 9A is a perspective view of the optical component driving mechanism 2-10, according to certain aspects of the present disclosure. The housing 2-110, the frame 2-120, the second portion 2-142 of the second circuit assembly 2-140, the connecting portion 2-400, and a portion of the base 2-130 can be seen in FIG. 9A. The base 2-130 is fixedly connected to the frame 2-120.

Figure 9B:
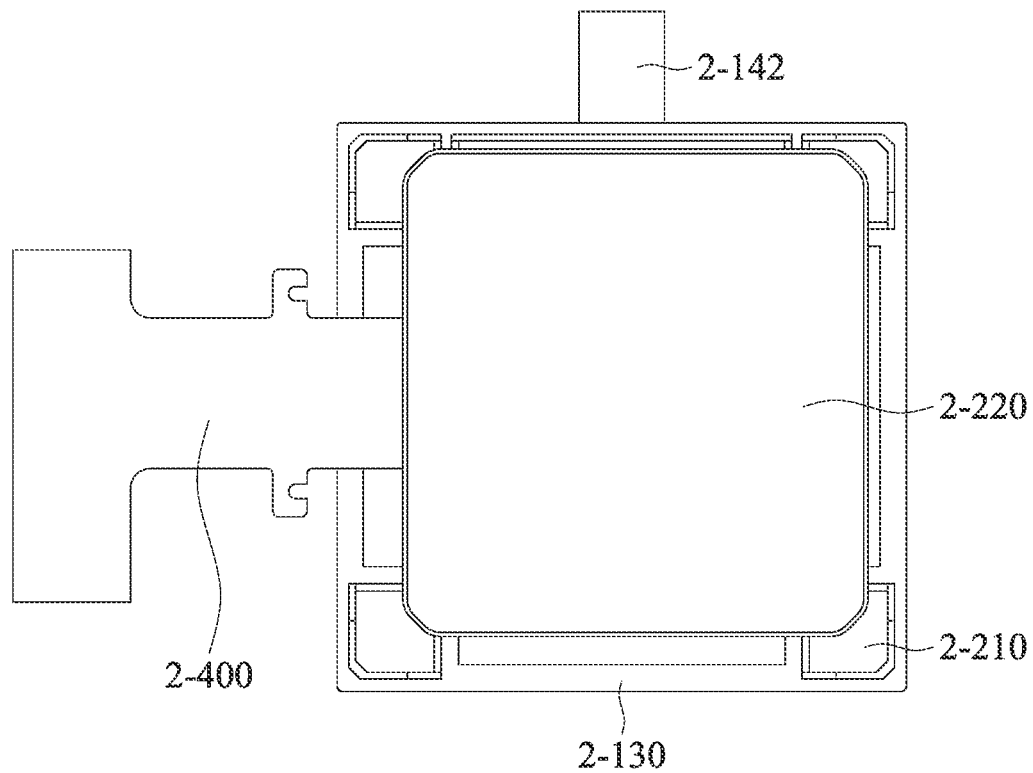
FIG. 9B is a bottom view of the optical component driving mechanism, according to certain aspects of the present disclosure.

FIG. 9B is a bottom view of the optical component driving mechanism 2-10, according to certain aspects of the present disclosure. The first circuit assembly 2-200 is electrically connected to the connecting portion 2-400. The first circuit assembly 2-220 is fixedly connected to the first holder 2-210.

Figure 10A:
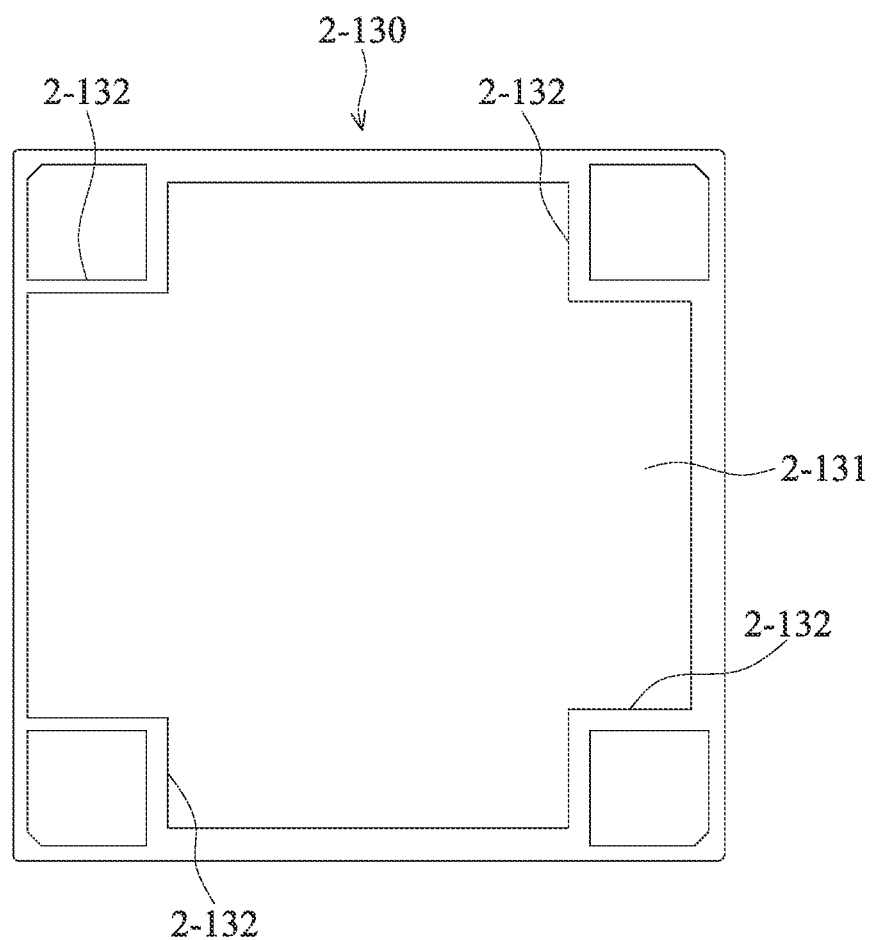
FIG. 10A is a bottom view of the base, according to certain aspects of the present disclosure.
Figure 10A:
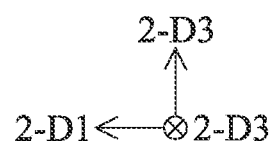
Figure 10B:
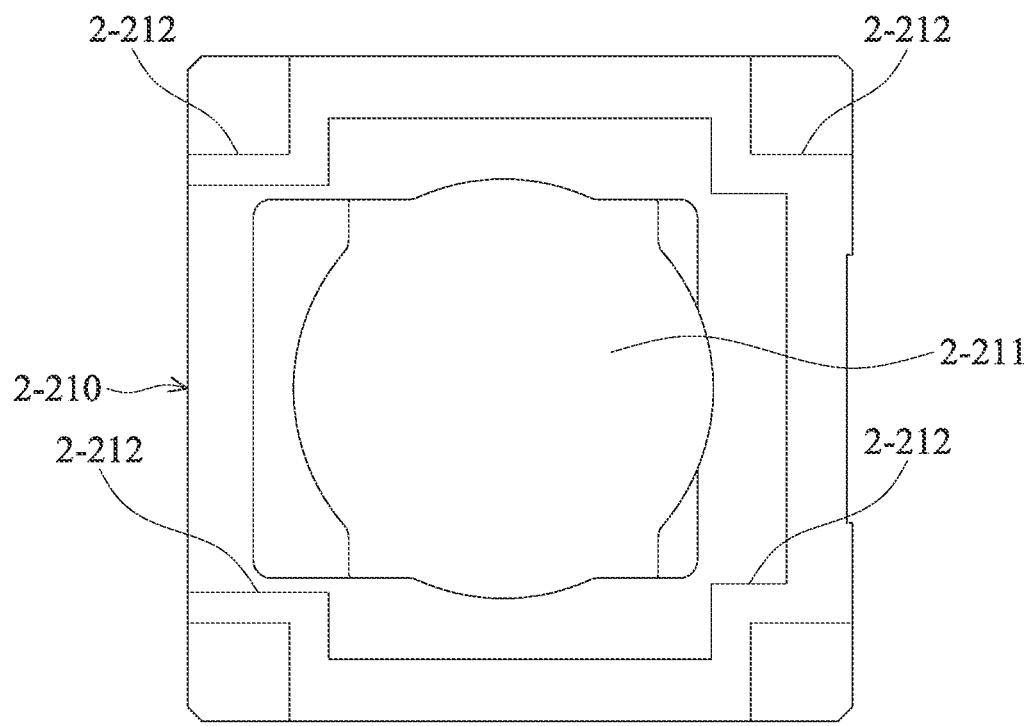
FIG. 10B is a bottom view of the first holder, according to certain aspects of the present disclosure.
Figure 10B:
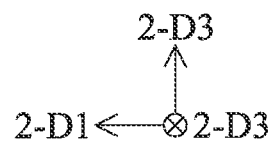

FIG. 10A is a bottom view of the base 2-130, according to certain aspects of the present disclosure. FIG. 10B is a bottom view of the first holder 2-210, according to certain aspects of the present disclosure. The base 2-130 includes a second opening 2-131 and four stopper portions 2-132. The base 2-130 is made of metal material. The first holder 2-210 includes a first opening 2-211, four avoidance portions 2-212, and four recess portions 2-213. The first holder 2-210 is made of non-metallic materials, such as plastic, fiberglass, or rubber, etc. Since the recess portion 2-213 cannot be seen in the viewing angle of FIG. 10B, the recess portion 2-213 is described in detail with respect to FIGS. 11A to 11B.

The first opening 2-211 and the second opening 2-131 correspond to the first optical axis 2-O1 of the first optical component 2-1. The avoidance portion 2-212 is a groove structure for corresponding to the stopper portion 2-132. The stop portion 2-132 is configured to limit the range of motion of the first holder 2-210.

In detail, the stopper portion 2-132 is disposed in the avoidance portion 2-212, which has a groove structure. Therefore, when the first holder 2-210 is driven by the first driving assembly 2-500 or the third driving assembly 2-520 (FIG. 8) to move, the movement of the first holder 2-210 is limited by the stopper portion 2-132.

Figure 11A:
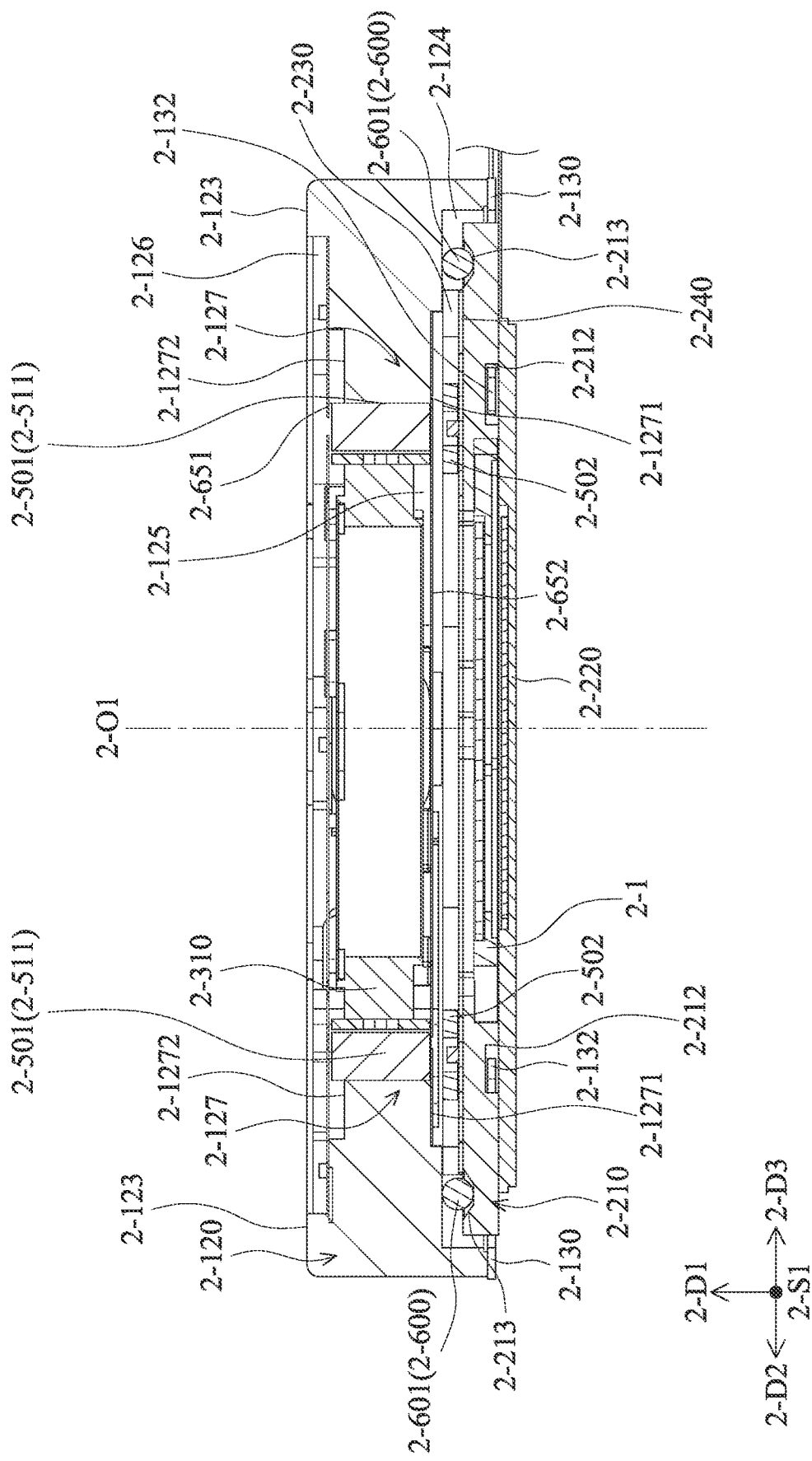
FIG. 11A is a cross-sectional view of the optical component driving mechanism, according to certain aspects of the present disclosure.
Figure 11B:
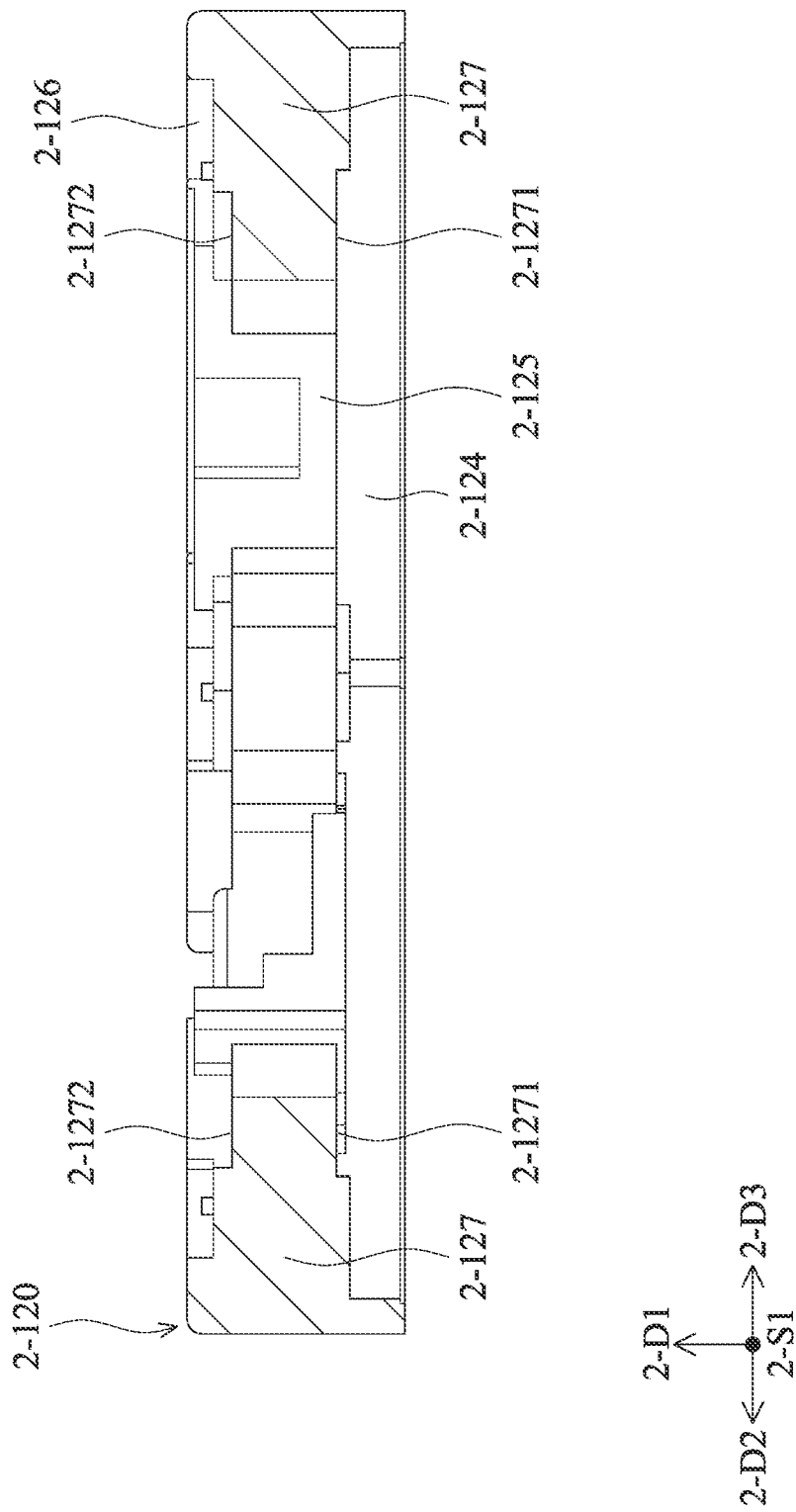
FIG. 11B is a cross-sectional view of the frame, according to certain aspects of the present disclosure.
Figure 11C:
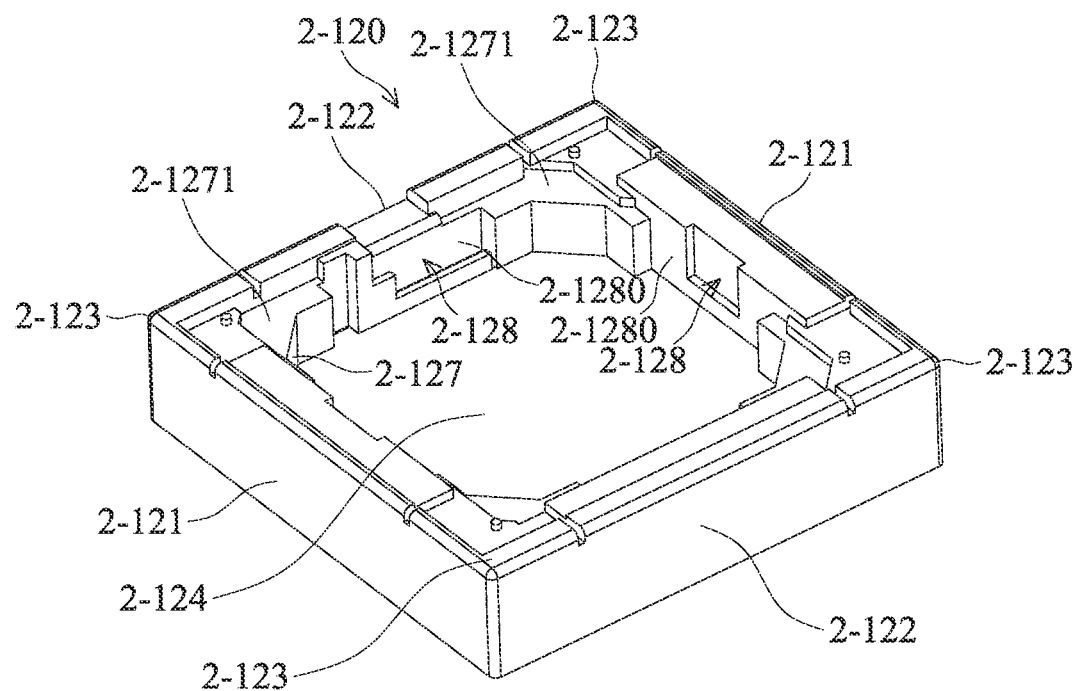
FIG. 11C is a perspective view of the frame, according to certain aspects of the present disclosure.
Figure 11C:
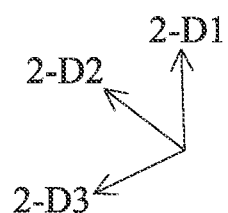

FIG. 11A is a cross-sectional view of an optical component driving mechanism 2-10, according to certain aspects of the present disclosure. FIG. 11B is a cross-sectional view of a frame 2-120, according to certain aspects of the present disclosure. FIG. 11C is a perspective view of a frame 2-120, according to certain aspects of the present disclosure. FIG. 11A and FIG. 11B is a cross-sectional view, which observed along a first axis 2-S1 as viewing angles. The first axis 2-S1 is an axis located on the plane formed by the second axis 2-D2 and the third axis 2-D3. Both the included angle between the first axis 2-S1 and the second axis 2-D2 and the included angle between the first axis 2-S1 and the third axis 2-D3 are 45 degrees. The relationships among the first axis 2-S1, the second axis 2-D2 and the third axis 2-D3 are shown more clearly in FIG. 17B.

Referring to FIGS. 11A to 11C together, the frame 2-120 includes two first sides 2-121, two second sides 2-122, four corners 2-123, a first accommodating space 2-124, a second accommodating space 2-125, a third accommodating space 2-126, four frame protrusions 2-127, and four inner walls 2-128.

The first sides 2-121 are two opposite sides of the frame 2-120, and the second sides 2-122 are the other two opposite sides of the frame 2-120. The first sides 2-121 extend along the second axis 2-D2. The first side 2-121 and the second side 2-122 are adjacent and perpendicular to each other. The four corners 2-123 are each located at the junction of the first side 2-121 and the second side 2-122. When viewed along the main axis 2-D1, the support components 2-601 of the first support assembly 2-600 each located at four corners 2-123 of the frame 2-120.

The first accommodating space 2-124 is configured to accommodate the first holder 2-210. The first accommodating space 2-124 is adjacent to the base 2-130. The second accommodating space 2-125 is configured to accommodate the second holder 2-310 and the second optical component (not shown). The third accommodating space 2-126 is adjacent to the housing 2-110. The first elastic component 2-651 is located in the third accommodating space 2-126.

The main axis 2-D1 passes through the first accommodating space 2-124, the second accommodating space 2-125, and the third accommodating space 2-126. The second accommodating space 2-125 is connected with the first accommodating space 2-124 and the third accommodating space 2-126, respectively. When viewed along the first optical axis 2-O1, the stopper portion 2-132 and the first holder 2-210 and the first circuit assembly 2-220 at least partially overlap.

The frame protrusion 2-127 has a first frame surface 2-1271 and a second frame surface 2-1272. The first frame surface 2-1271 and the second frame surface 2-1272 face in opposite directions. The first frame surface 2-1271 faces the first accommodating space 2-124. The second frame surface 2-1272 faces the third accommodating space 2-126.

When viewed along the main axis 2-D1, the first frame surface 2-1271 and the second frame surface 2-1272 partially overlap. The frame protrusion 2-127 is adjacent to the second accommodation space 2-125. The inner walls 2-128 have inner surfaces 2-1280, and the frame protrusions 2-127 protrude from the inner walls 2-128. The frame protrusions 2-127 overlap the second accommodation space 2-124 when viewed along the first axis 2-S1.

The support components 2-601 are located at the corners 2-123 of the frame 2-120. The first magnetic components 2-501 are located at the corners 2-123 when viewed along the main axis 2-D1. The corners 2-123 are adjacent to the first sides 2-121 when viewed along the main axis 2-D1.

In the present embodiment, the support components 2-601 are positioned in the recess portions 2-213. The support components 2-601 contact the frame 2-120 and the first holder 2-210 respectively, so as to assist the first holder 2-210 to move relative to frame 2-120 when the first driving assembly 2-500 (FIG. 8) or the third driving assembly 2-520 (FIG. 8) drives the first holder 2-210.

As shown in FIG. 11A, the stopper portion 2-132 is positioned in the groove structure of the avoidance portion 2-212. When the first movable portion 2-200 are driven by the first driving assembly 2-500 (FIG. 8) or the third driving assembly 2-520 (FIG. 8), and move to a limit position, the avoidance portion 2-212 will contact the stopper portion 2-132 and limit the first movable portion 2-200 within a certain range of movement.

Figure 12:
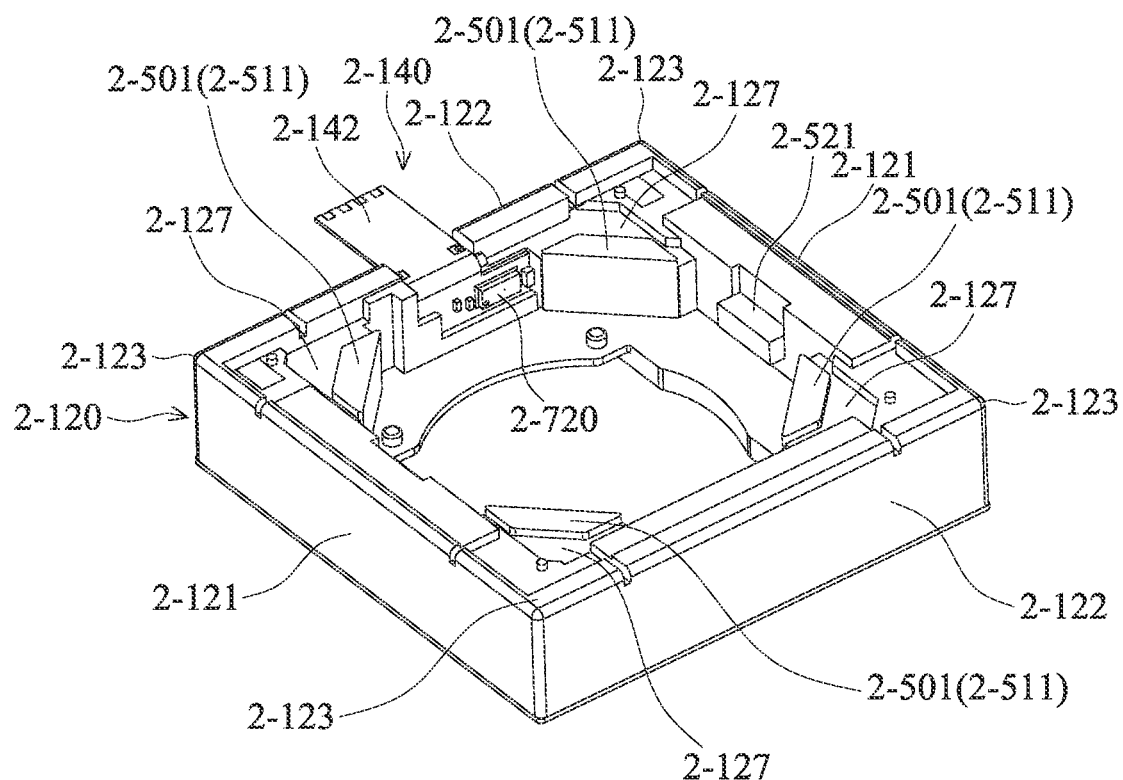
FIG. 12 is a perspective view of the frame, the first magnetic component, the second magnetic component, the third magnetic component, the second circuit assembly, and the second sensing component, according to certain aspects of the present disclosure.
Figure 12:
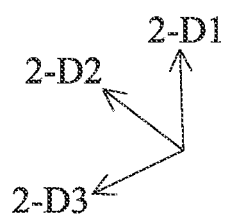

FIG. 12 is a perspective view of the frame 2-120, the first magnetic component 2-501, the second magnetic component 2-511, the third magnetic component 2-521, the second circuit assembly 2-140, and the second sensing component 2-720, according to certain aspects of the present disclosure. FIG. 13 shows a perspective view of the second circuit assembly 2-140, the second sensing component 2-720, and the strengthening assembly 2-800 individually, according to certain aspects of the present disclosure.

As shown in FIG. 12, the frame protrusion 2-127 positions the first magnetic component 2-501 and the second magnetic component 2-511, which have an integrated structure. The first magnetic components 2-501 and the second magnetic components 2-511 having an integrated structure are each located at the corners 2-123 of the frame 2-120.

The two third magnetic components 2-521 are each located on the two first sides 2-121, although only one third magnetic component 2-521 can be seen in the viewing angle of FIG. 12. In this embodiment, the third magnetic component 2-521 is disposed on the frame 2-120, but in different embodiments, the third magnetic component 2-521 may be disposed on the second holder 2-310 or the frame 2-120.

The second sensing component 2-720 is disposed on the first portion 2-141. The second circuit assembly 2-140 is electrically connected to the second driving assembly 2-510 (FIG. 8) and the second sensing component 2-720. The second driving assembly 2-510 is electrically connected to the second circuit assembly 2-140 via the first elastic component 2-651 (FIG. 8).

Referring to FIG. 12 to FIG. 13 together, the strengthening assembly 2-800 is made of a metal material. The strengthening assembly 2-800 is fixedly connected to the frame 2-120. The second driving assembly 2-510 is electrically connected to the second circuit assembly 2-140 via the strengthening assembly 2-800. In this embodiment, the strengthening assembly 2-800 is embedded in the frame 2-120, and this configuration may achieve the effect of miniaturization.

For illustration purposes, FIG. 14 is a schematic diagram showing a first shock absorbing component 2-1000, a second shock absorbing component 2-1010, a third shock absorbing component 2-1020, and a fourth shock absorbing component 2-1030. The first shock absorbing component 2-1000, the second shock absorbing component 2-1010, and the third shock absorbing component 2-1020 are configured to restrain the abnormal movement of the first movable portion 2-200. The fourth shock absorbing component 2-1030 is configured to restrain the abnormal movement of the first movable portion 2-200 and the second movable portion 2-300.

The first shock absorbing component 2-1000, the second shock absorbing component 2-1010, the third shock absorbing component 2-1020, and the fourth shock absorbing component 2-1030 have flexibility, and are all made of non-metallic materials. In this embodiment, the first shock absorbing component 2-1000, the second shock absorbing component 2-1010, the third shock absorbing component 2-1020, and the fourth shock absorbing component 2-1030 may be gels.

As shown in FIG. 14, the first shock absorbing component 2-1000 is located in the first accommodating space 2-124. The first shock absorbing component 2-1000 is in direct contact with the third circuit assembly 2-230 of the first movable portion 2-200 and the frame 2-120 of the fixed portion 2-100. The second shock absorbing component 2-1010 is in direct contact with the first holder 2-210 of the first movable portion 2-200 and the frame 2-120 and the base 2-130 of the fixed portion 2-100.

As shown in FIG. 14, the third shock absorbing component 2-1020 is located in the groove structure of the avoidance portion 2-212, and the third shock absorbing component 2-1020 is in direct contact with the first holder 2-210 of the first movable portion 2-200, the first circuit assembly 2-140 and the base 2-130. The fourth shock absorbing component 2-1030 is in direct contact with the third circuit assembly 2-230 of the first movable portion 2-200 and the second holder 2-310 of the second movable portion 2-300.

Figure 15:
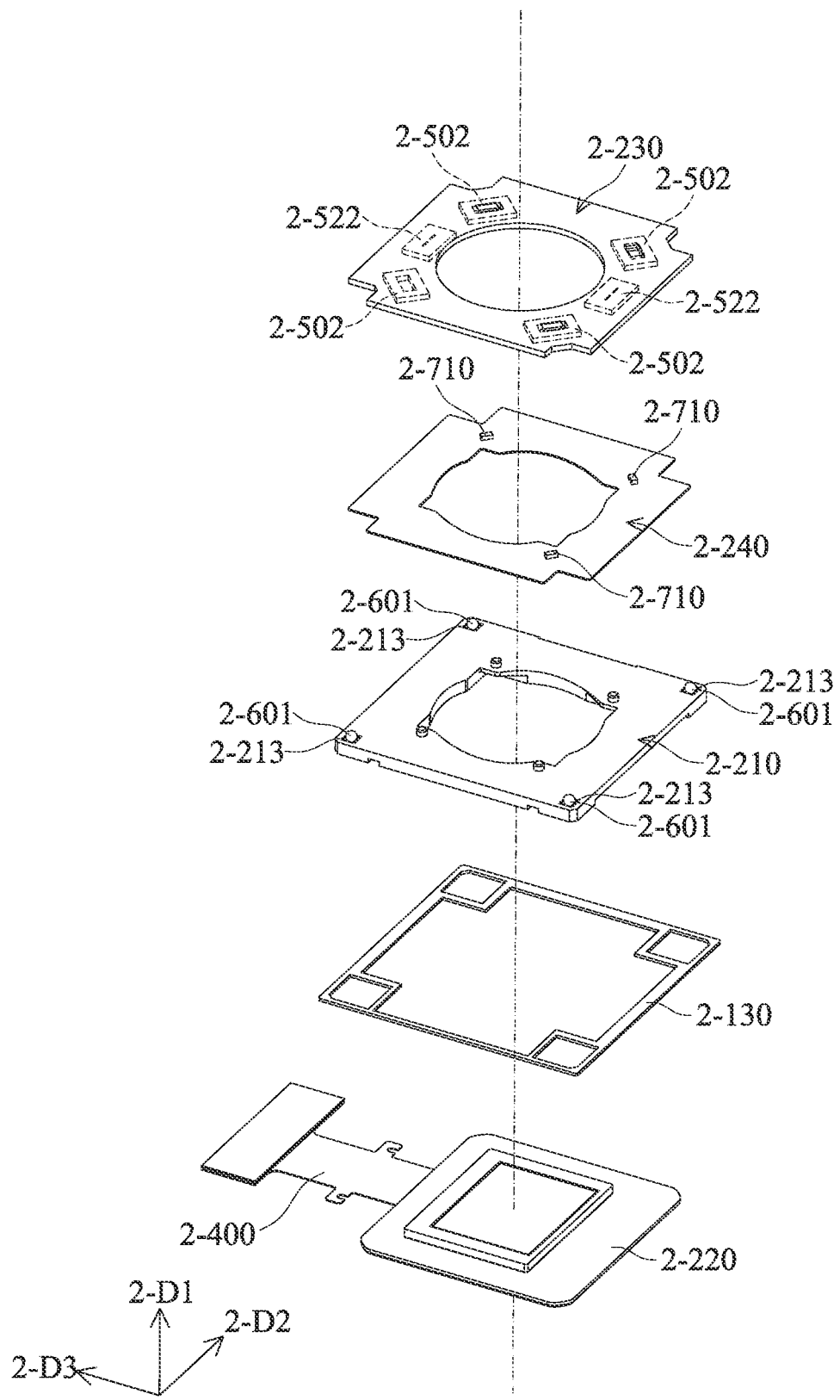
FIG. 15 is a perspective view shows the first coil and the third coil embedded in the third circuit assembly with dash lines, according to certain aspects of the present disclosure.

FIG. 15 shows the first coils 2-502 and the third coils 2-522 embedded in the third circuit assembly 2-230 with dash lines. The support components 2-601 are disposed in the recess portion 2-213 on the first holder 2-210. The first sensing component 2-710 is disposed on the fourth circuit assembly 2-240.

The first magnetic components 2-501 (FIG. 8) disposed on the frame 2-120 correspond to the first coils 2-502 disposed on the third circuit assembly 2-230 to drive the first holder 2-210 (FIG. 8) in the first dimension. The third magnetic components 2-521 (FIG. 8) disposed on the frame 2-120 correspond to the third coils 2-522 disposed on the third circuit assembly 2-230 to drive the first holder 2-210 (FIG. 8) to move in the third dimension.

Figure 16A:
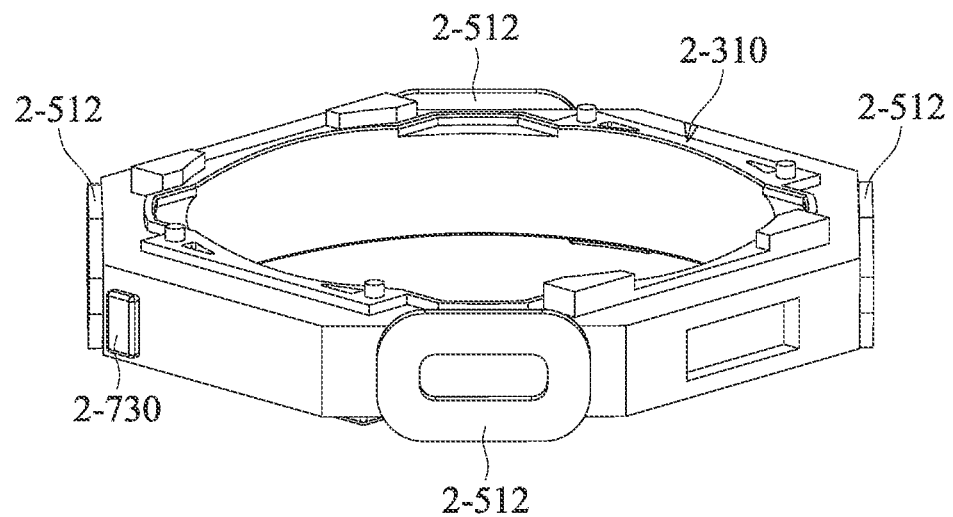
FIG. 16A is a perspective view of the second holder, the second coil, and the second sensing component, according to certain aspects of the present disclosure.
Figure 16A:
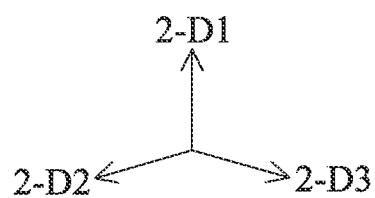
Figure 16B:
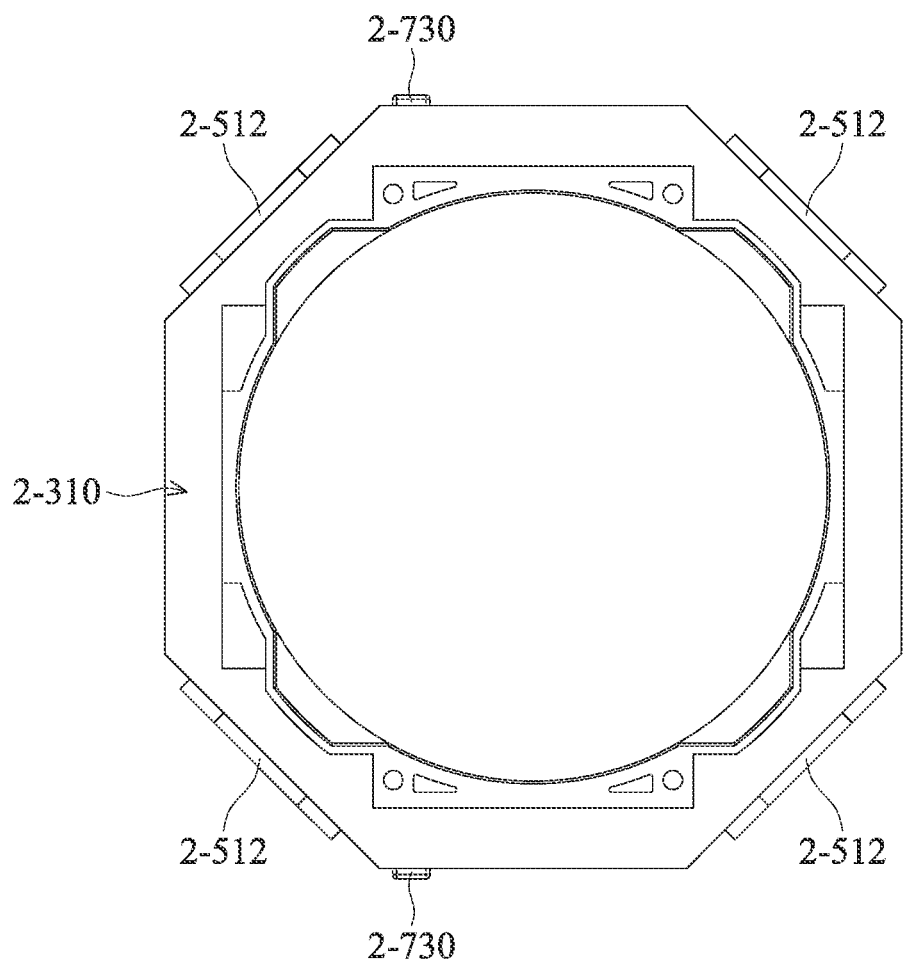
FIG. 16B is a top view of the second holder, the second coil, and the second sensing component, according to certain aspects of the present disclosure.

FIG. 16A is a perspective view of the second holder 2-310, the second coil 2-512, and the sensing magnet 2-730, according to certain aspects of the present disclosure. FIG. 16B is a top view of the second holder 2-310, the second coil 2-512, and the second sensing component 2-730, according to certain aspects of the present disclosure.

The second coils 2-512 correspond to the second magnetic components 2-511 (FIG. 12) provided on the frame 2-120 to drive the second holder 2-310 to move in the second dimension. As shown in FIGS. 16A to 16B, four second coils 2-512 are wound on the second holder 2-310, and two sensing magnets 2-730 are disposed on two opposite-facing surfaces of the second holder 2-310.

Figure 17A:
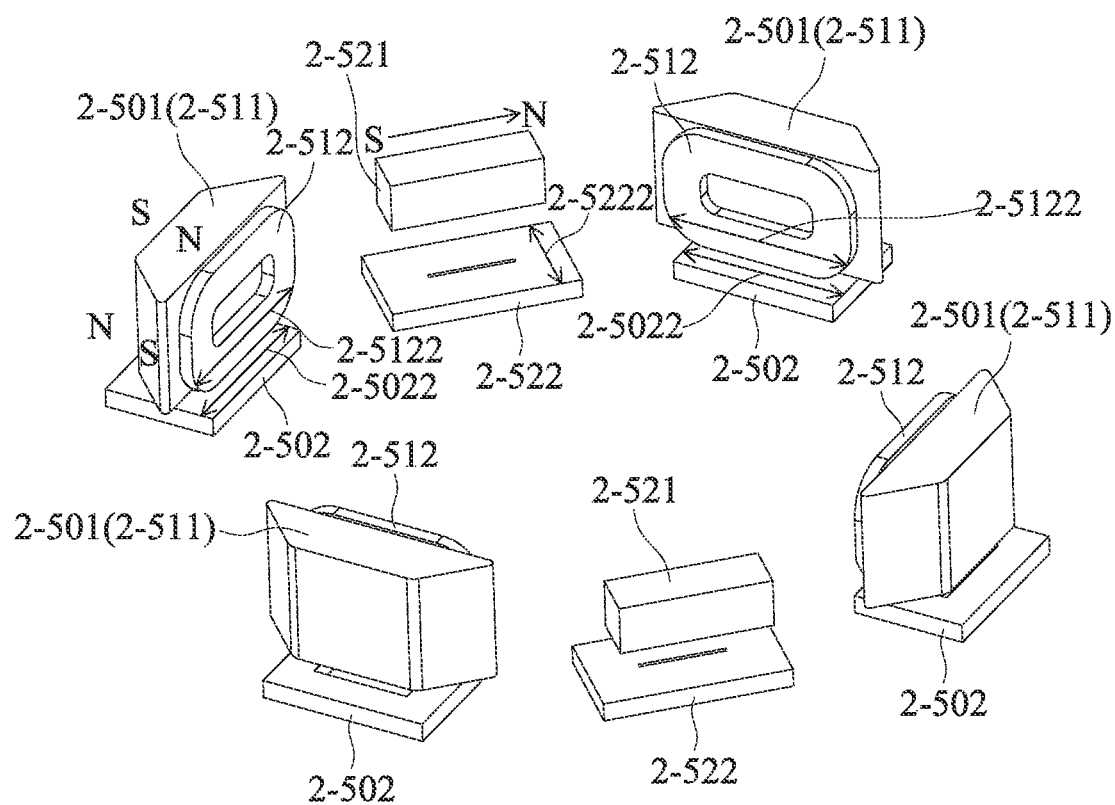
FIG. 17A shows a perspective view of the first driving assembly, the second driving assembly, and the third driving assembly individually, according to certain aspects of the present disclosure.
Figure 17B:
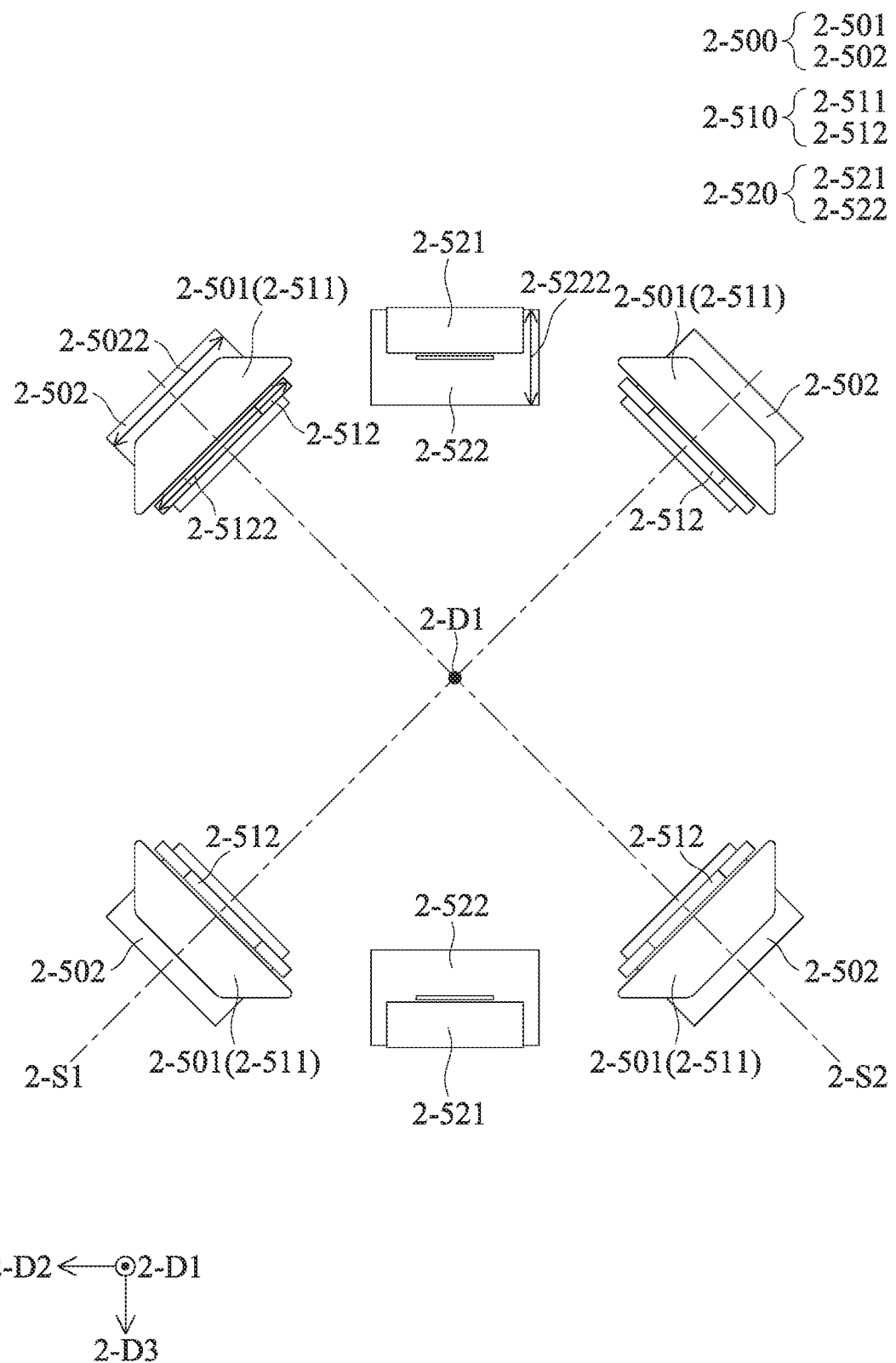
FIG. 17B shows a top view of the first driving assembly, the second driving assembly, and the third driving assembly individually, according to certain aspects of the present disclosure.

FIG. 17A shows a perspective view of the first driving assembly 2-500, the second driving assembly 2-510, and the third driving assembly 2-520 individually, according to certain aspects of the present disclosure. FIG. 17B shows a top view of the first driving assembly 2-500, the second driving assembly 2-510, and the third driving assembly 2-520 individually, according to certain aspects of the present disclosure.

As shown in FIG. 17A, for illustration purposes, the directions of the magnetic poles the first magnetic component 2-501 and the second magnetic component 2-511 are indicated on one of the first magnetic components 2-501, and the direction of the magnetic poles of the third magnetic component 2-521 is indicated on one of the third magnetic components 2-521.

The first coil 2-502 has a first segment 2-5022 that is perpendicular to the arrangement direction of the magnetic poles of the first magnetic component 2-501. The second coil 2-512 has a second segment 2-5122 that is perpendicular to the arrangement direction of the magnetic poles of the second magnetic component 2-511. The third coil 2-522 has a third segment 2-5222 that is perpendicular to the arrangement direction of the magnetic poles of the third magnetic component 2-521.

As shown in FIG. 17A, the extending direction of the first segment 2-5022 is parallel to the extending direction of the second segment 2-5122. The extending direction of the third segment 2-5222 is not parallel to the extending direction of the first segment 2-5022. The extending direction of the third segment 2-5222 is not perpendicular to the extending direction of the first segment 2-5022.

The extending direction of the third segment 2-5222 is not parallel to the second axis 2-D2 when viewed along the main axis 2-D1. The extending direction of the third segment 2-5222 is perpendicular to the second axis 2-D2 when viewed along the main axis 2-D1. The arrangement direction of the magnetic poles of the third magnetic component 2-521 is parallel to the second axis 2-D2 when viewed along the main axis 2-D1.

The first segment 2-5022 and the first magnetic component 2-501 are configured to generate a first driving force. The second segment 2-5122 and the second magnetic component 2-511 are configured to generate a second driving force. The third segment 2-5222 and the third magnetic component 2-521 are configured to generate a third driving force.

The first driving force may drive the first holder 2-210 (FIG. 8) to move in the first dimension relative to the frame 2-120 (FIG. 8). The second driving force may drive the second holder 2-310 (FIG. 8) to move in the second dimension relative to the frame 2-120 (FIG. 8). The third driving force may drive the first holder 2-210 (FIG. 8) to move in a third dimension relative to the frame 2-120 (FIG. 8).

In detail, as shown in FIG. 17B, the first axis 2-S1 located on the plane formed by the second axis 2-D2 and the third axis 2-D3. Both the included angle between the first axis 2-S1 and the second axis 2-D2 and the included angle between the first axis 2-S1 and the third axis 2-D3 are 45 degrees. An axis 2-S2 is located on the plane formed by the second axis 2-D2 and the third axis 2-D3, and the axis 2-S2 is perpendicular to the first axis 2-S1.

The first dimension is movement in the plane formed by the first axis 2-S1 and the second axis 2-D2 (which is also the plane formed by the second axis 2-D2 and the third axis 2-D3). More specifically, the first dimension is movement with the first axis 2-S1 or the axis 2-S2 as the moving direction. The second dimension is movement along the second optical axis 2-O2 (FIG. 8). The third dimension is the rotation around a rotational axis, and the rotational axis is parallel to the first optical axis 2-O1 (FIG. 8).

Figure 18A:
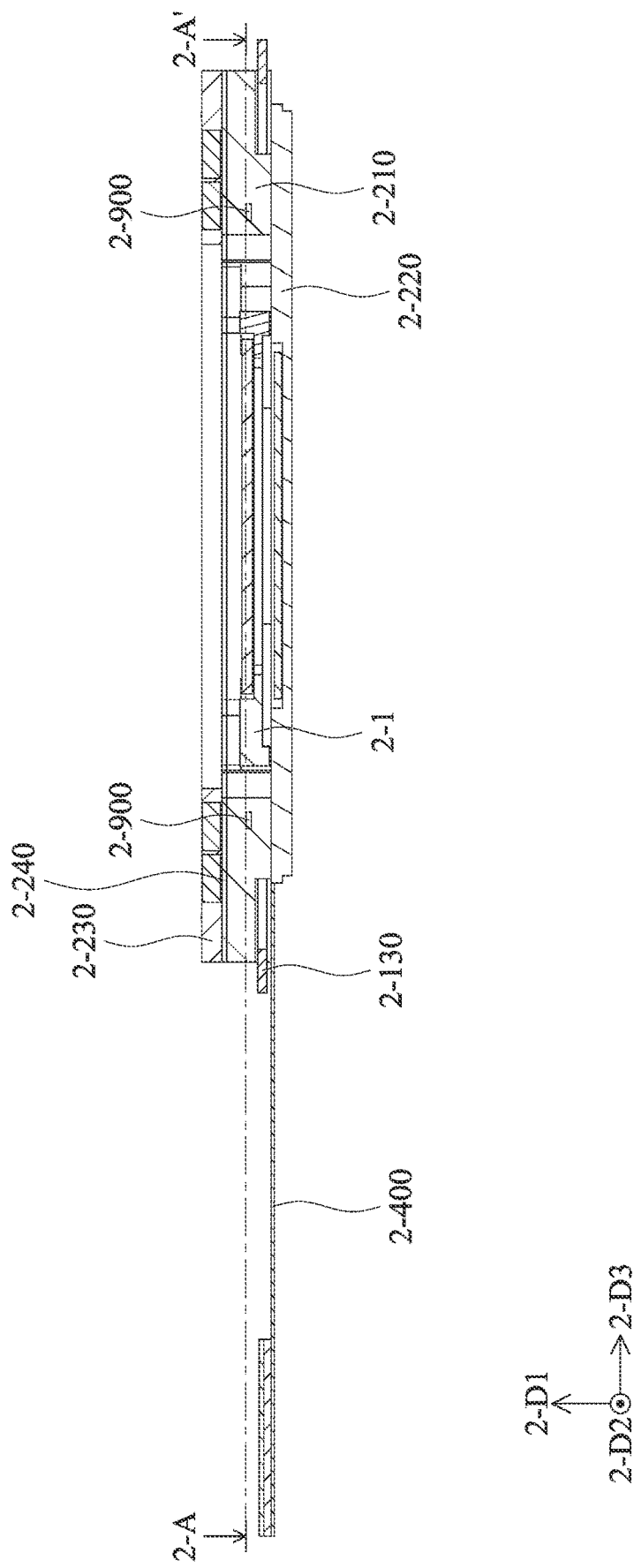
FIG. 18A is a cross-sectional view of the first holder, the first optical component, the first circuit assembly, the third circuit assembly, the fourth circuit assembly, the base, the connecting portion, and the magnetically permeable component, according to certain aspects of the present disclosure.

FIG. 18A is a cross-sectional view of the first optical component 2-1, the base 2-130, the first holder 2-210, the first circuit assembly 2-220, the third circuit assembly 2-230, the fourth circuit assembly 2-240, the connecting portion 2-400, and the magnetically permeable component 2-900. From FIG. 18A, a section of the magnetically permeable component 2-900 embedded in the first holder 2-210 can be seen.

Figure 18B:
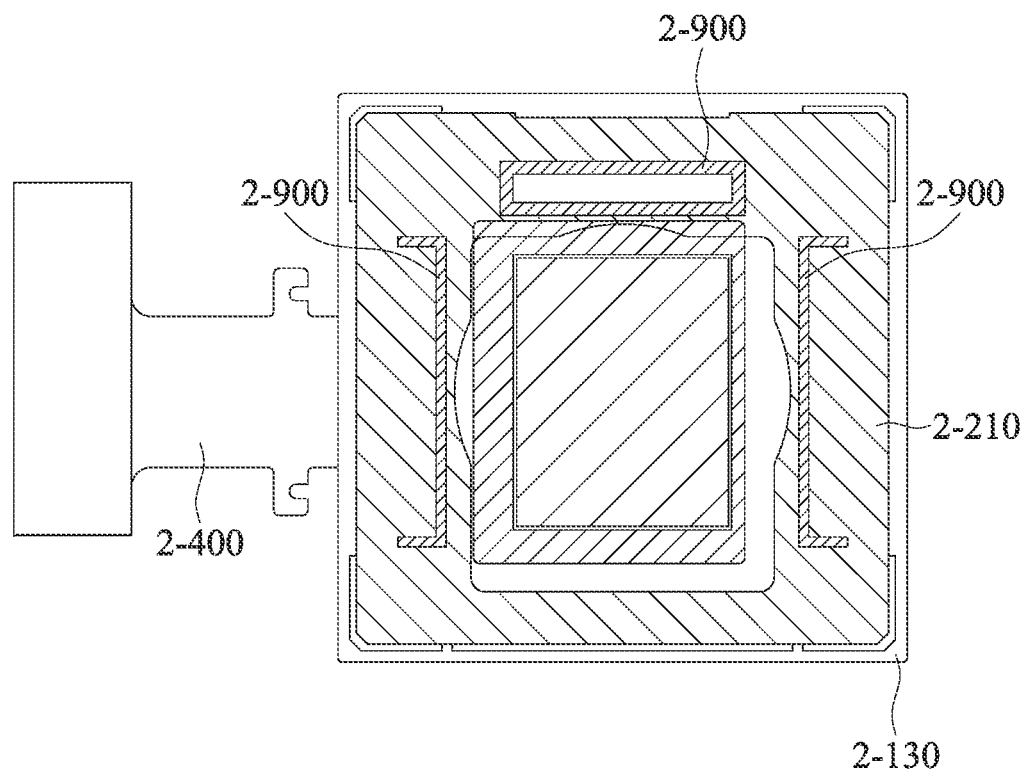
FIG. 18B is a cross-sectional view taken along the dashed line A to A' in FIG. 18A, according to certain aspects of the present disclosure.
Figure 18B:
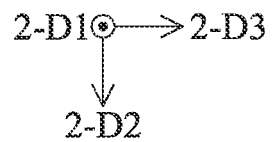
Figure 18C:
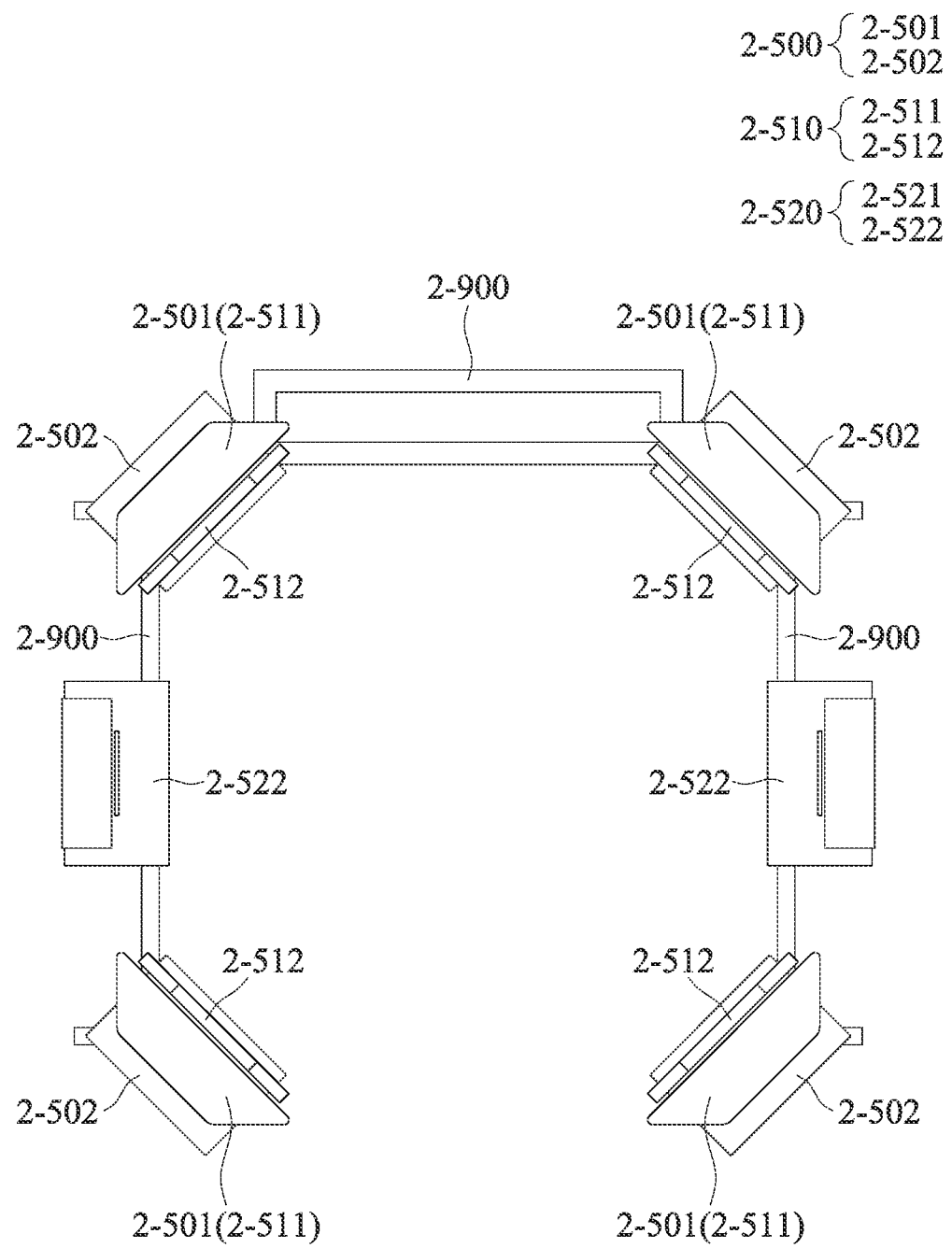
FIG. 18C shows a top view of the first driving assembly, the second driving assembly, and the third driving assembly individually, according to certain aspects of the present disclosure.
Figure 18C:
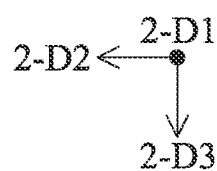

FIG. 18B is a cross-sectional view taken along the dashed line 2-A to 2-A' in FIG. 18A, according to certain aspects of the present disclosure. From FIG. 18B, three magnetically permeable components 2-900 embedded in the first holder 2-210 and not exposed on the first holder 2-210 can be seen. FIG. 18C shows a top view of the first driving assembly 2-500, the second driving assembly 2-510, the third driving assembly 2-520, and the magnetically permeable component 2-900 individually.

Referring to FIGS. 18A to 18C together, the magnetically permeable components 2-900 is made of a metal material. The magnetically permeable components 2-900 correspond to the first magnetic components 2-501. When viewed along the main axis 2-D1, there are two magnetically permeable components 2-900 located adjacent to the first sides 2-121 of the frame 2-120 (FIG. 11C), and another magnetically permeable component 2-900 is located adjacent to the second side 2-142 of the frame 2-120.

The magnetically permeable component 2-900 at least partially overlaps the first driving assembly 2-500 when viewed along the main axis 2-D1. The magnetically permeable component 2-900 at least partially overlaps the second driving assembly 2-510 when viewed along the main axis 2-D1. The magnetically permeable component 2-900 at least partially overlaps the third driving assembly 2-520 when viewed along the main axis 2-D1.

Figure 19:
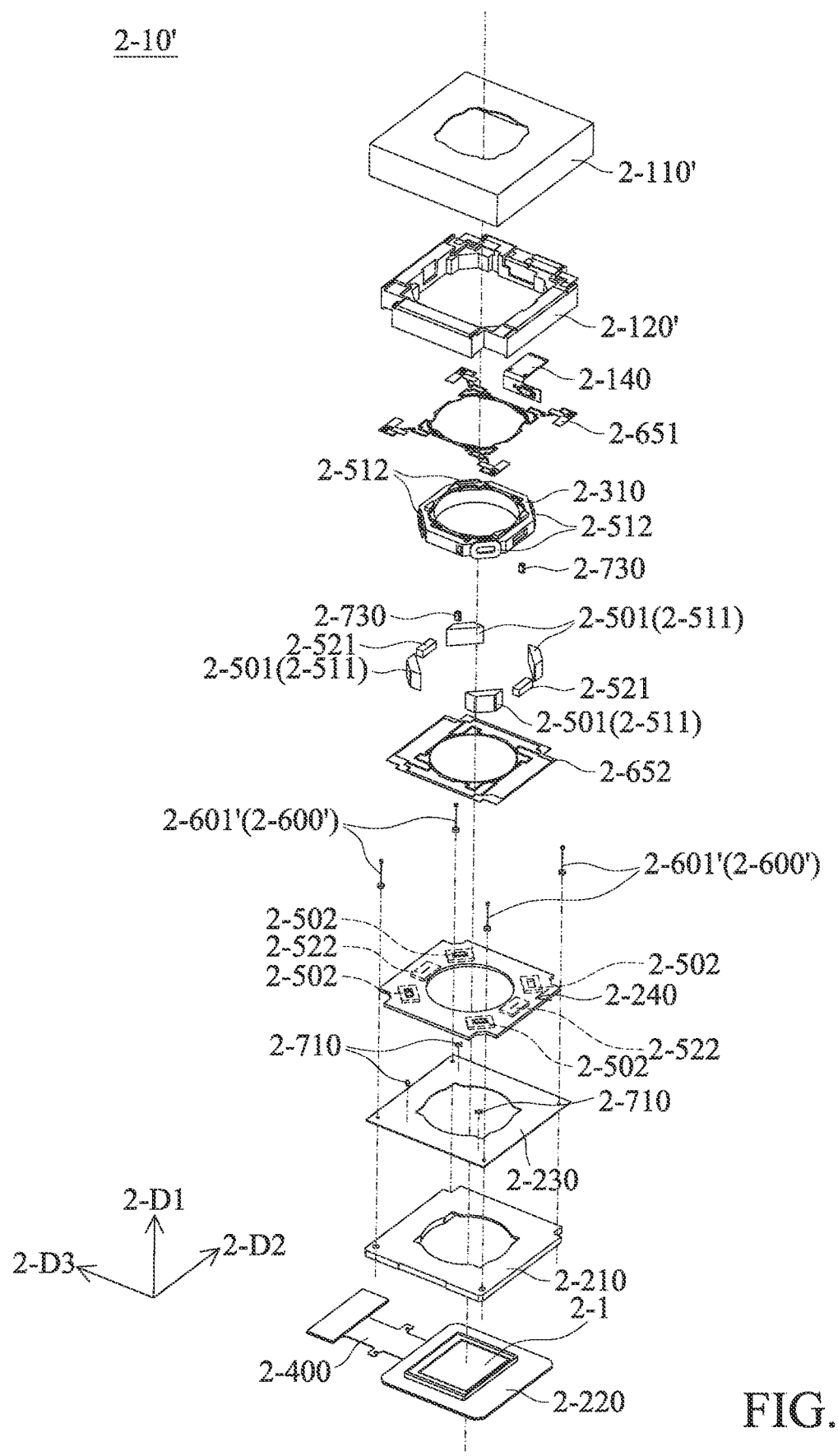
FIG. 19 is an exploded view of an optical component driving mechanism according to another embodiment of the present disclosure.

FIG. 19 is an exploded view of an optical component driving mechanism 2-10' according to another embodiment of the present disclosure. The difference between the optical component driving mechanism 2-10' shown in FIG. 19 and the optical component driving mechanism 2-10 shown in FIG. 8 is the housing 2-110', the frame 2-120', the base, and the first support assembly 2-600'.

In the embodiment shown in FIG. 19, the appearance of the housing 2-110' and the frame 2-120' of the optical component driving mechanism 2-10' is different from that of the housing 2-110 and the frame 2-120 of the optical component driving mechanism 2-10. However, the housing 2-110' and the frame 2-120' have a similar arrangement relationship with the housing 2-110 and the frame 2-120. Furthermore, the optical component driving mechanism 2-10' has no base.

In addition, in the embodiment shown in FIG. 1, the support components 2-601 are balls. In the embodiment shown in FIG. 19, the support components 2-601' are suspension wires. The first holder 2-210 is movable relative to the frame 2-120' via the support components 2-601'.

Figure 20A:
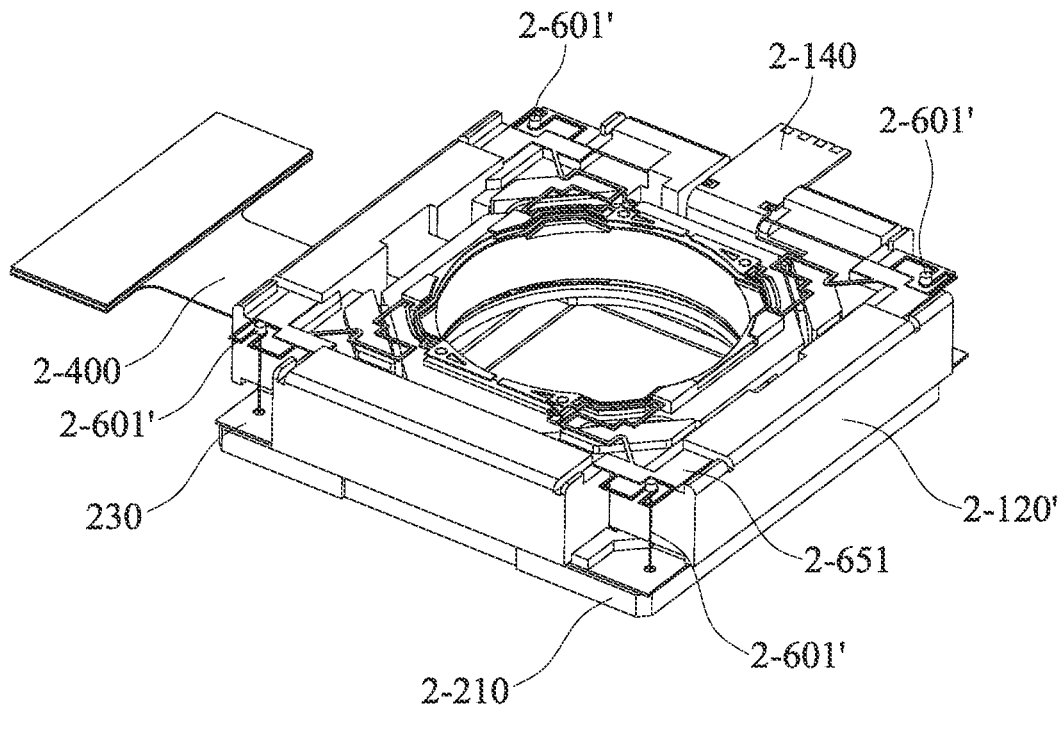
FIG. 20A shows a perspective view of the optical component driving mechanism of FIG. 19, according to certain aspects of the present disclosure, but for illustration purposes, the housing is not shown.
Figure 20B:
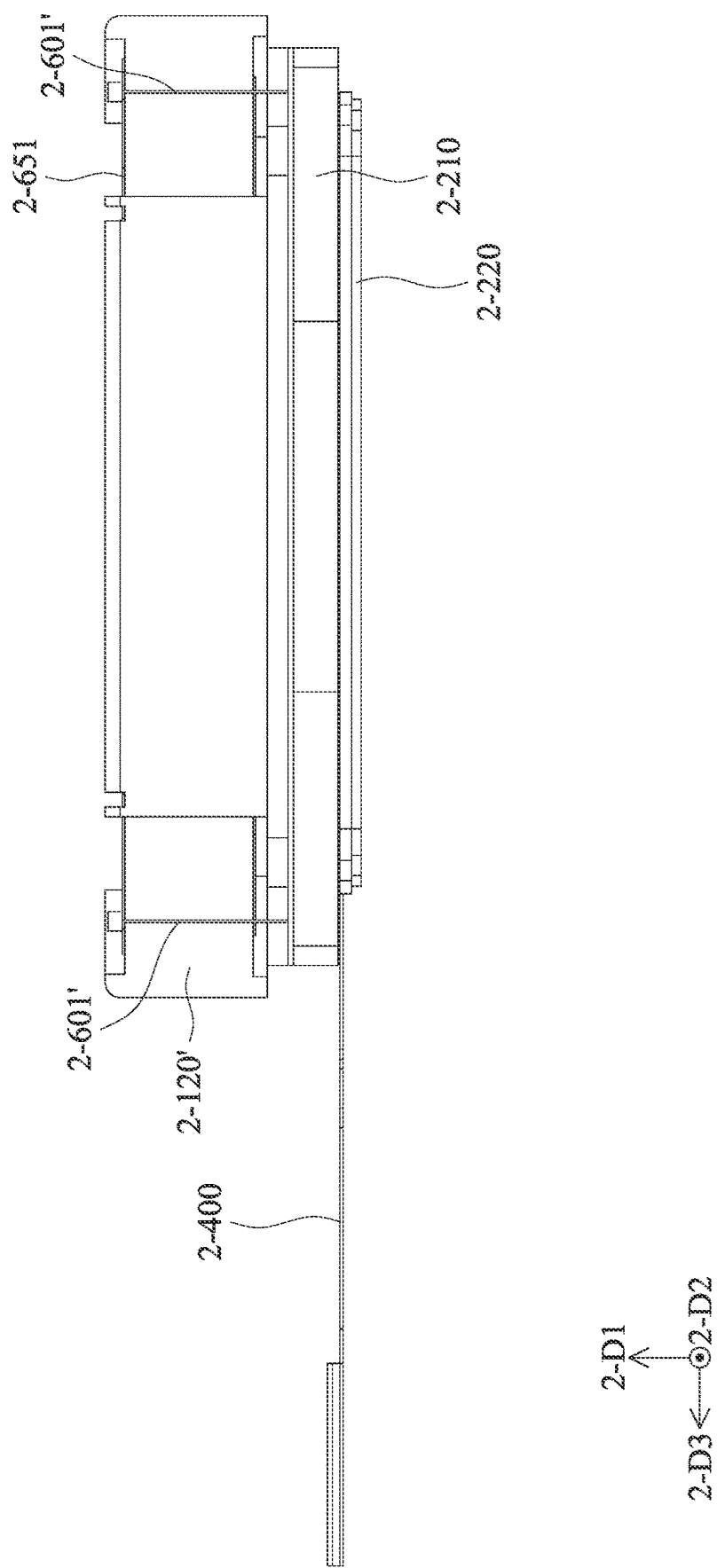
FIG. 20B shows a perspective view of the optical component driving mechanism of FIG. 19, according to certain aspects of the present disclosure, but for illustration purposes, the housing is not shown.

FIG. 20A shows a perspective view of the optical component driving mechanism 2-10' of FIG. 19, but the housing 2-110' is not shown for illustration purposes. FIG. 20B shows a perspective view of the optical component driving mechanism 2-10' of FIG. 19, but the housing 2-110' is not shown for illustration purposes.

As shown in FIGS. 20A to 20B, two ends of the support component 2-601' are connected to the first elastic member 2-651 and the first holder 2-210, respectively. The support component 2-601' may support the first holder 2-210 to move relative to the frame 2-120'.

In summary, the present invention provides an optical component driving mechanism for driving the first optical component and the second optical component, thereby achieving functions such as optical focusing or optical shake compensation. The first optical component is driven by the first driving assembly to move in a plane perpendicular to the first optical axis. The second optical component is driven by the second driving assembly to move along the second optical axis. The first optical component is driven by the third driving assembly to rotate around the first optical axis. The combination of the three driving mechanisms enables the optical component driving mechanism to have better optical focusing and optical compensation capabilities, which greatly improving the performance of electronic devices.

The third embodiment of the present disclosure is described below.

Figure 21A:
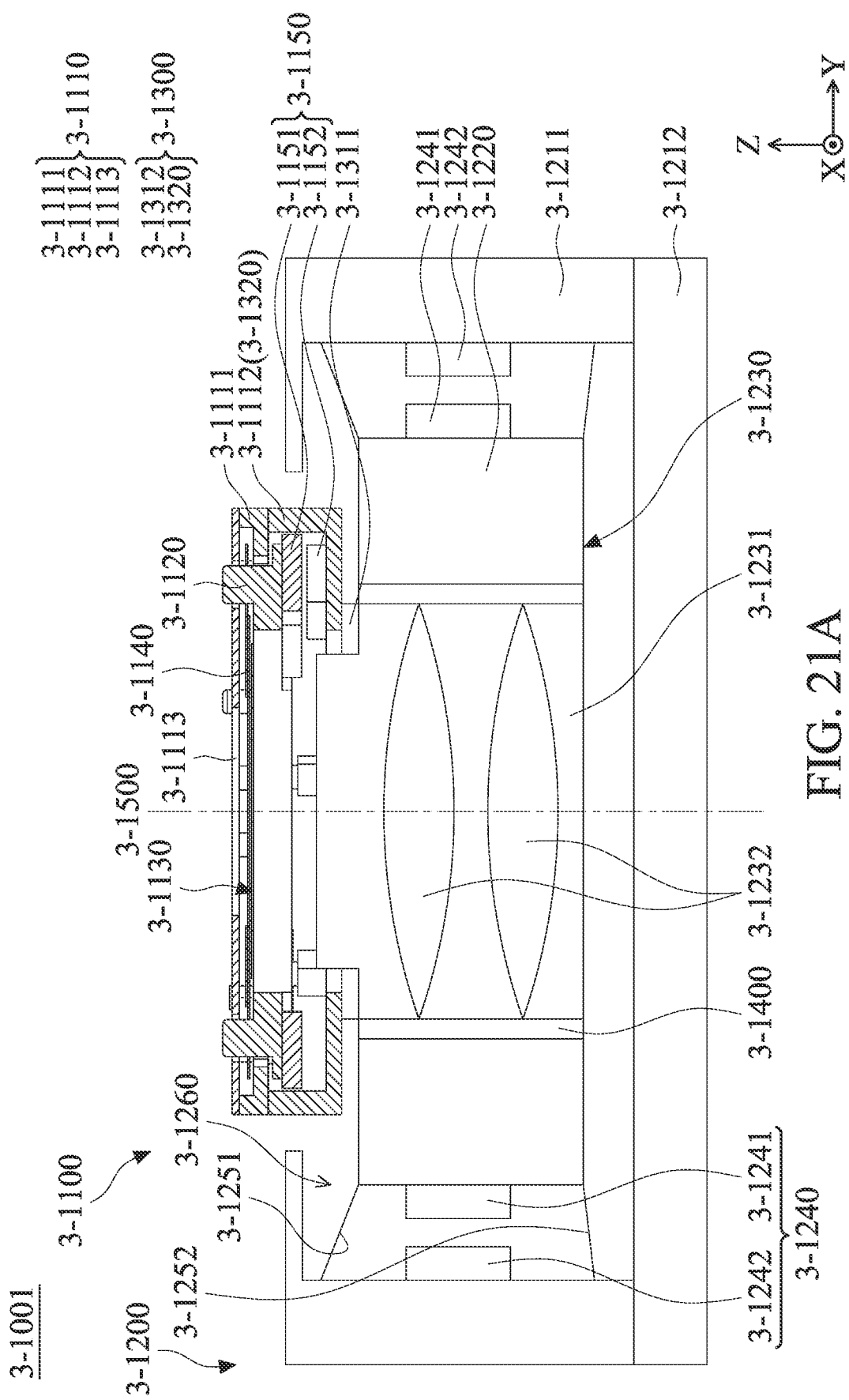
FIG. 21A is a schematic view of an optical module in some embodiments of the present disclosure.

Refer to FIG. 21A. FIG. 21A is a schematic view of an optical module 3-1001 in some embodiments of the present disclosure. The optical module 3-1001 may mainly include a light amount adjusting mechanism 3-1100 and an optical element driving mechanism 3-1200. An optical element 3-1230 may be disposed in the optical element driving mechanism 3-1200, and the optical element driving mechanism 3-1200 may drive the optical element 3-1230 to achieve optical image stabilization (OIS) or auto focus (AF). The light amount adjusting mechanism 3-1100 may be disposed on the optical element driving mechanism 3-1200 to control the amount or characteristic of light incident to the optical element 3-1230. For example, the light amount adjusting mechanism 3-1100 may be an aperture to control the depth of field, imaging quality, and amount of light coming in.

In some embodiments, the optical element 3-1230 may include a lens, a mirror, a prism, a beam splitter, an aperture, a liquid lens, an image sensor, a camera module, or a ranging module. It should be noted that the definition of the optical element is not limited to the element that is related to visible light, and other elements that relate to invisible light (e.g. infrared or ultraviolet) are also included in the present disclosure. For example, when the optical element 3-1230 is a camera lens, the optical element 3-1230 may include a lens barrel 3-1231 and at least one lens 3-1232. In some embodiments, the lens barrel 3-1231 may include nonmetal material, and the heat conductivity of the lens barrel 3-1231 may be different from the heat conductivity of the holder 3-1220, such as the heat conductivity of the lens barrel 3-1231 may be higher than the heat conductivity of the holder 3-1220.

Figure 22A:
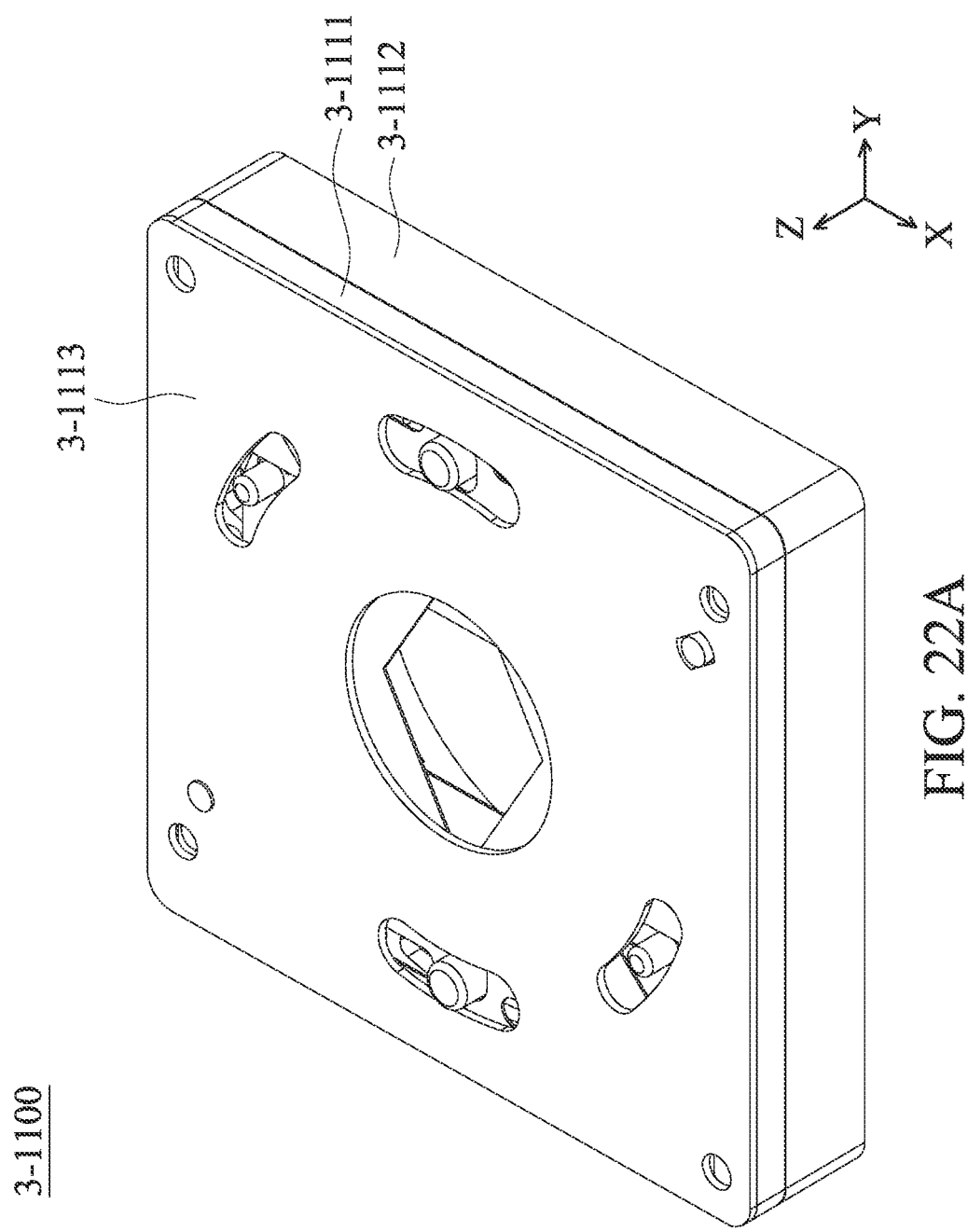
FIG. 22A is a schematic view of the light amount adjusting mechanism.
Figure 22B:
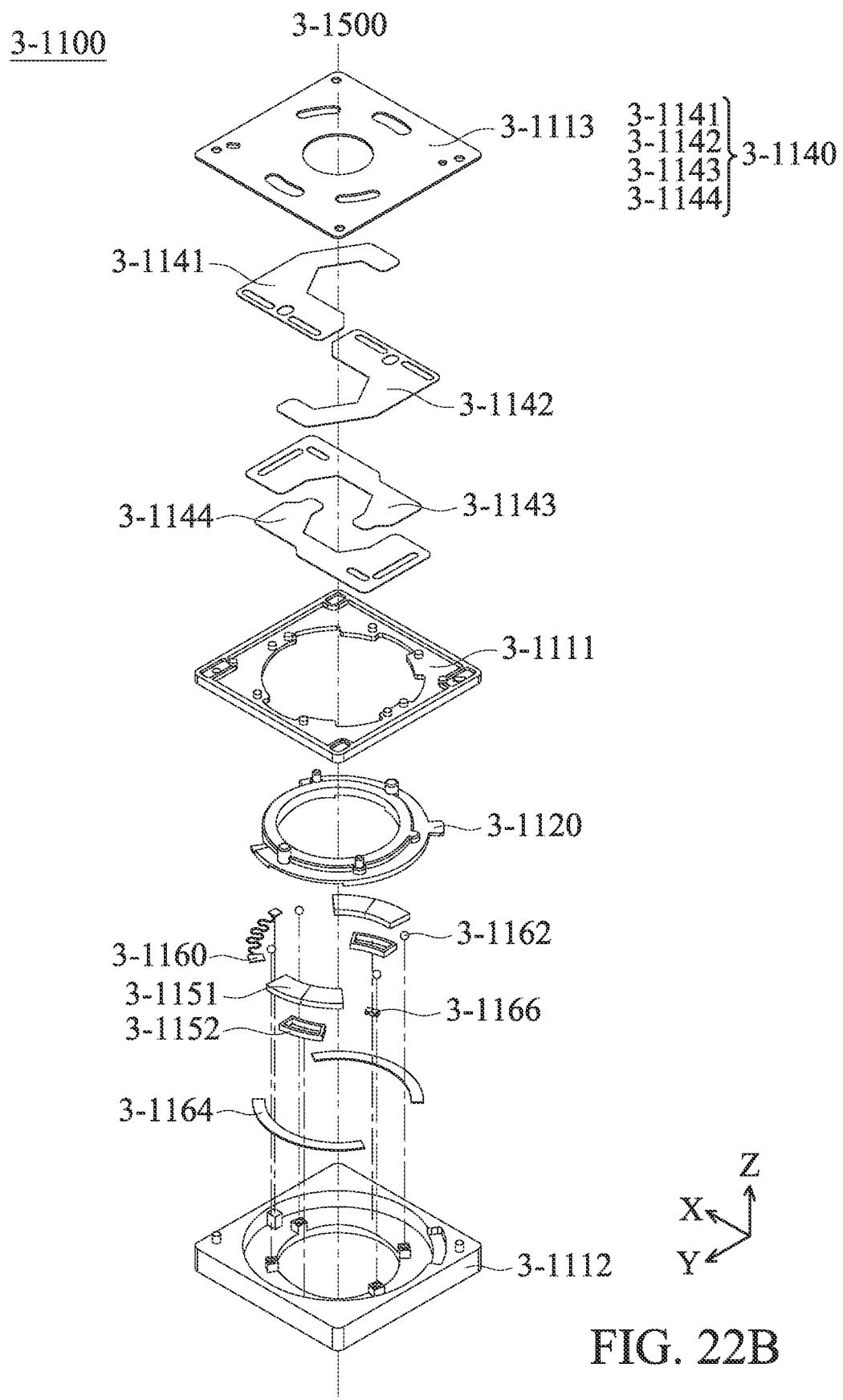
FIG. 22B is an exploded view of the light amount adjusting mechanism.

FIG. 22A is a schematic view of the light amount adjusting mechanism 3-1100. FIG. 22B is an exploded view of the light amount adjusting mechanism 3-1100. As shown in FIG. 21A, FIG. 22A, and FIG. 22B, the light amount adjusting mechanism 3-1100 may mainly include a case 3-1111, a bottom 3-1112, a top plate 3-1113, a movable portion 3-1120, a light amount control element 3-1140, a first driving assembly 3-1150, a third resilient element 3-1160, a connecting element 3-1162, a magnetic conductive element 3-1164, and a position sensor 3-1166 arranged in a main axis 3-1500. The case 3-1111, the bottom 3-1112, and the top plate 3-1113 may be called as a fixed portion 3-1110. The light amount control element 3-1140 may include a first light amount control unit 3-1141, a second light amount control unit 3-1142, a third light amount control unit 3-1143, and a fourth light amount control unit 3-1144, or may include other optical control elements such as blades, polarizer, or filter. The case 3-1111 and the bottom 3-1112 form a accommodating space 3-1130 used for accommodating the movable portion 3-1120, the third resilient element 3-1160, the connecting element 3-1162, the magnetic conductive element 3-1164, and the position sensor 3-1166, etc. In some embodiments, the distance between the bottom 3-1112 and the optical element 3-1230 is less than the distance between the case 3-1111 and the optical element 3-1230. The light amount control element 3-1140 may be outside the accommodating space 3-1130.

The movable portion 3-1120 may be used for connecting to the light amount control element 3-1140 and may move relative to the fixed portion 3-1110, such as may be movably connected to the bottom 3-1112 through the connecting element 3-1162. The first driving assembly 3-1150 may drive the movable portion 3-1120 to move relative to the fixed portion 3-1110. For example, the first driving assembly 3-1150 may include a first driving element 3-1151 and a second driving element 3-1152 disposed on the movable portion 3-1120 and the fixed portion 3-1110 (e.g. the bottom 3-1112), respectively. The first driving element 3-1151 and the second driving element 3-1152 may be a combination of a magnet and a coil used for generating a driving force to drive the movable portion 3-1120 moving relative to the fixed portion 3-1110. In some embodiments, the first driving assembly 3-1150 may include other driving elements, such as piezoelectric element or shape memory alloy. The magnetic conductive element 3-1164 may be used for guiding the magnetic field direction of the first driving element 3-1151. In some embodiments, as shown in FIG. 21A and FIG. 22B, the first driving element 3-1151 and the second driving element 3-1152 may arrange along the main axis 3-1500, and the magnetic conductive element 3-1164 and the first driving element 3-1151 may arrange along the main axis 3-1500.

The position sensor 3-1166 may be used for detecting the magnetic field variation of the first driving element 3-1151 when the first driving element 3-1151 is moving to get the position of the movable portion 3-1120 relative to the fixed portion 3-1110. For example, the position sensor 3-1166 may include a Hall sensor, a magnetoresistance effect sensor (MR sensor), a giant magnetoresistance effect sensor (GMR sensor), a tunneling magnetoresistance effect sensor (TMR sensor), or a fluxgate sensor.

In some embodiments, the optical element driving mechanism 3-1200 may mainly include a shell 3-1211, a base 3-1212, a holder 3-1220, and a second driving assembly 3-1240. The shell 3-1211 and the base 3-1212 may be affixed with each other to form a shell of the optical element driving mechanism 3-1200 for accommodating other elements. The holder 3-1220 may move relative to the shell 3-1211 and the base 3-1212 and may used for connecting to the optical element 3-1230.

The second driving assembly 3-1240 may include a third driving element 3-1241 and a fourth driving element 3-1242 disposed on the holder 3-1220 and the shell 3-1211. The third driving element 3-1241 and the fourth driving element 3-1242 may be a combination of a magnet and a coil used for generating a driving force to drive the holder 3-1220 moving relative to the shell 3-1211. In some embodiments, the second driving assembly 3-1240 may include other driving elements, such as piezoelectric element or shape memory alloy.

In some embodiments, the holder 3-1220 may suspended in the second accommodating space 3-1260 formed from the shell 3-1211 and the base 3-1212 by a first resilient element 3-1251 and a second resilient element 3-1252. Therefore, the holder 3-1220 may movably connected to the shell 3-1211 through the first resilient element 3-1251 and the second resilient element 3-1252.

In some embodiments, when the first driving assembly 3-1150 drives the movable portion 3-1120 to move relative to the fixed portion 3-1110, the first driving assembly 3-1150 may generate heat. However, excess heat may affect the imaging quality of the optical element 3-1230. Therefore, a heat control assembly 3-1300 may be disposed in the optical module 3-1001 to adjust the temperature of the optical element 3-1230, so the image quality may be enhanced. In some embodiments, the heat control assembly 3-1300 may correspond to the holder 3-1220 or the optical element 3-1230, and may include a first heat control element 3-1311, and a second heat control element 3-1320.

Figure 21B:
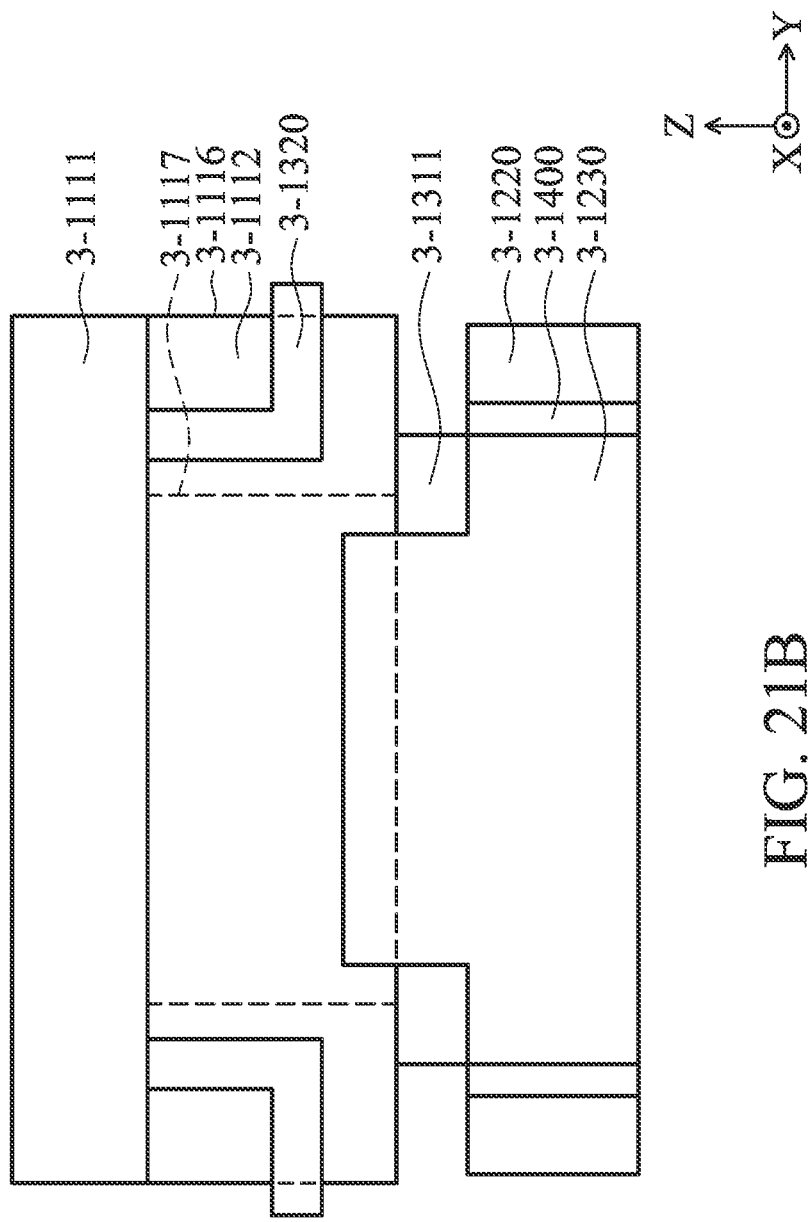
FIG. 21B is a schematic view of some elements in FIG. 21A.

FIG. 21B is a schematic view of some elements in FIG. 21A. For example, the first heat control element 3-1311 may isolate heat, and may be disposed between the light amount adjusting mechanism 3-1100 and the optical element driving mechanism 3-1200, such as between the optical element 3-1230 and the light amount adjusting mechanism 3-1100 to prevent the heat generated from the first driving assembly 3-1150 (heat source) to the optical element 3-1230.

The second heat control element 3-1320 may perform heat conduction or heat dissipation, so the heat generated by the first driving assembly 3-1150 (heat source) may be taken away from the optical element 3-1230. In some embodiments, the second heat control element 3-1320 may include metal, and the bottom 3-1112 does not include metal, such as the bottom 3-1112 may include nonmetal materials (e.g. plastic or resin, etc.). For example, the second heat control element 3-1320 may be affixed on the fixed portion 3-1110, such as may be embedded in the bottom 3-1112, may expose from a first surface 3-1116 of the bottom 3-1112 facing away from the optical element 3-1230, and does not expose from a second surface 3-1117 of the bottom 3-1112 facing the optical element 3-1230. In some embodiments, the second heat control element 3-1320 may connect to the case 3-1111, and the material of the case 3-1111 may include metal, so the heat generated from the first driving assembly 3-1150 may be transferred from the case 3-1111 by the second heat control element 3-1320. Afterwards, the heat may be dissipated by the metal case 3-1111. Moreover, in some embodiments, since the second heat control element 3-1320 is exposed from the bottom 3-1112, the heat may be further dissipated from the portion of the second heat control element 3-1320 exposed from the bottom 3-1112. Therefore, the optical element 3-1230 may be prevented from being affected by the heat generated by the first driving assembly 3-1150.

In some embodiments, the heat conductivity of the first heat control element 3-1311 is less than the heat conductivity of the second heat control element 3-1320. The heat conductivity of the bottom 3-1112 is less than the heat conductivity of the case 3-1111. The heat conductivity of the second heat control element 3-1320 is higher than the heat conductivity of the case 3-1111. In some embodiments, the distance between the first heat control element 3-1311 and the optical element 3-1230 is less than the distance between the second heat control element 3-1320 and the optical element 3-1230. The first heat control element 3-1311 is disposed between the optical element 3-1230 and the second heat control element 3-1320.

In some embodiments, the first adhesive element 3-1400 may connect the holder 3-1220 and the optical element 3-1230. For example, as shown in FIG. 21A and FIG. 21B, the first adhesive element 3-1400 may in direct contact with the holder 3-1220 and the optical element 3-1230, and the first adhesive element 3-1400 may include nonmetal material (e.g. plastic or resin). In some embodiments, the first heat control element 3-1311 may be called as a second adhesive element, and the second heat control element 3-1320 may be (indirectly) connected to the optical element 3-1230 through the first heat control element 3-1311. In some embodiments, the material of the first heat control element 3-1311 and the first adhesive element 3-1400 may be different, such the heat conductivity of the first heat control element 3-1311 may be less than the heat conductivity of the first adhesive element 3-1400.

Figure 21C:
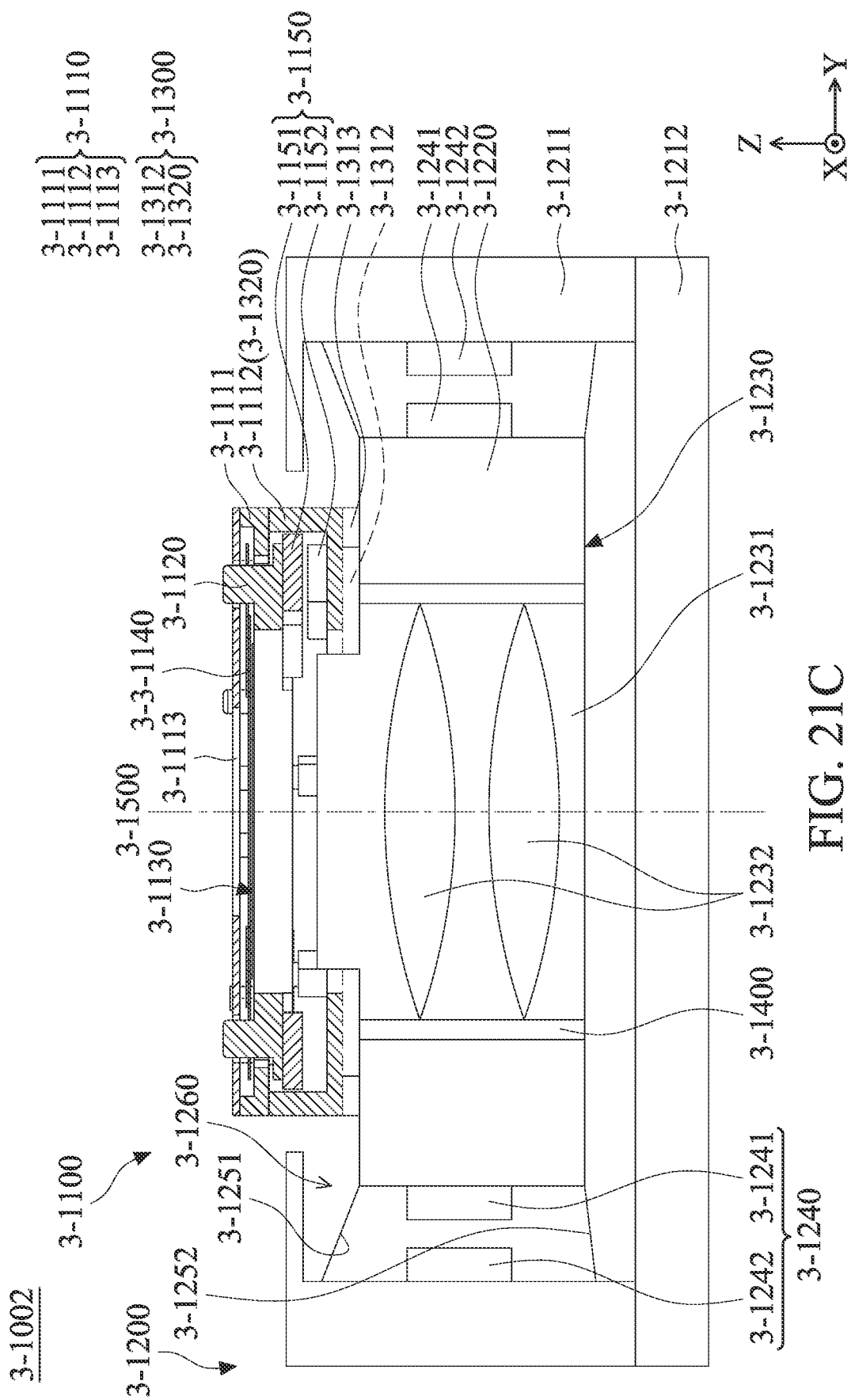
FIG. 21C is a schematic view of an optical module 3-1002 in some embodiments of the present disclosure.
Figure 21D:
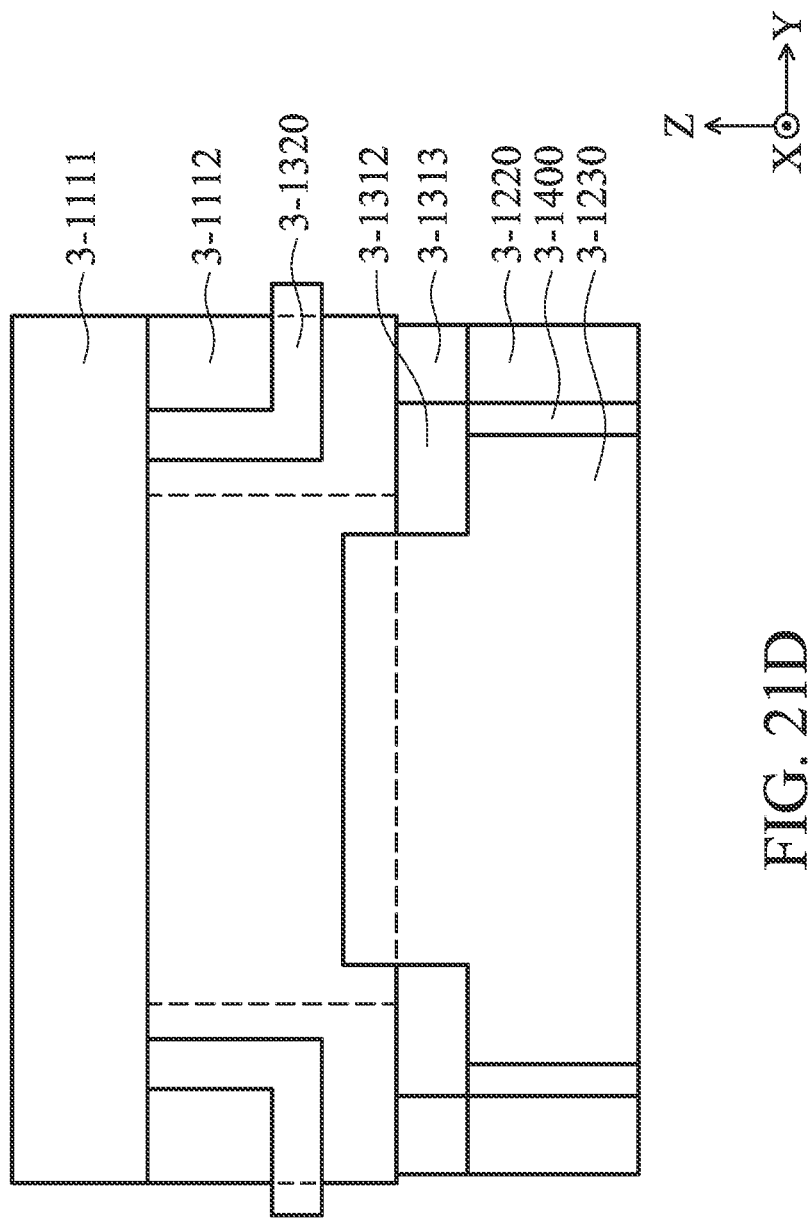
FIG. 21D is a schematic view of some elements in FIG. 21C.

FIG. 21C is a schematic view of an optical module 3-1002 in some embodiments of the present disclosure. FIG. 21D is a schematic view of some elements in FIG. 21C. In some embodiments, the elements of the optical module 3-1002 may be substantially similar to the elements of the optical module 3-1001, and the difference is that a first heat control element 3-1312 of the optical module 3-1002 may be a gap positioned between the bottom 3-1112 and the optical element 3-1230 to prevent heat conduction. In such embodiment, a third adhesive element 3-1313 may be used for connecting the bottom 3-1112 and the holder 3-1220. The third adhesive element 3-1313 may be glue or solder material, and the heat conductivity of the third adhesive element 3-1313 may be different from the heat conductivity of the first adhesive element 3-1400. This configuration also prevents the heat generated from the first driving assembly 3-1150 (heat source) to reach the optical element 3-1230.

Figure 23A:
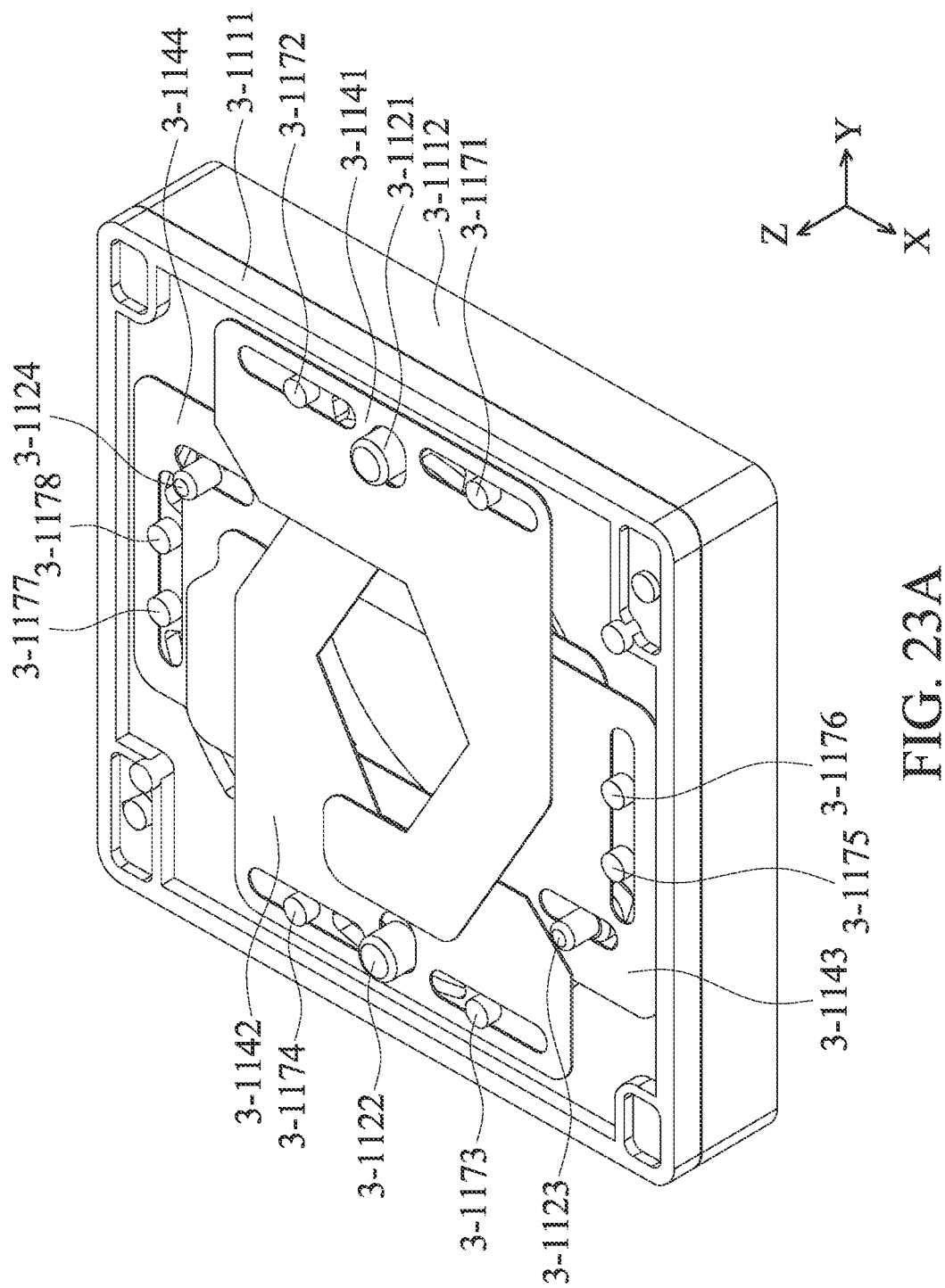
FIG. 23A is a schematic view of some elements of the light amount adjusting mechanism.
Figure 23B:
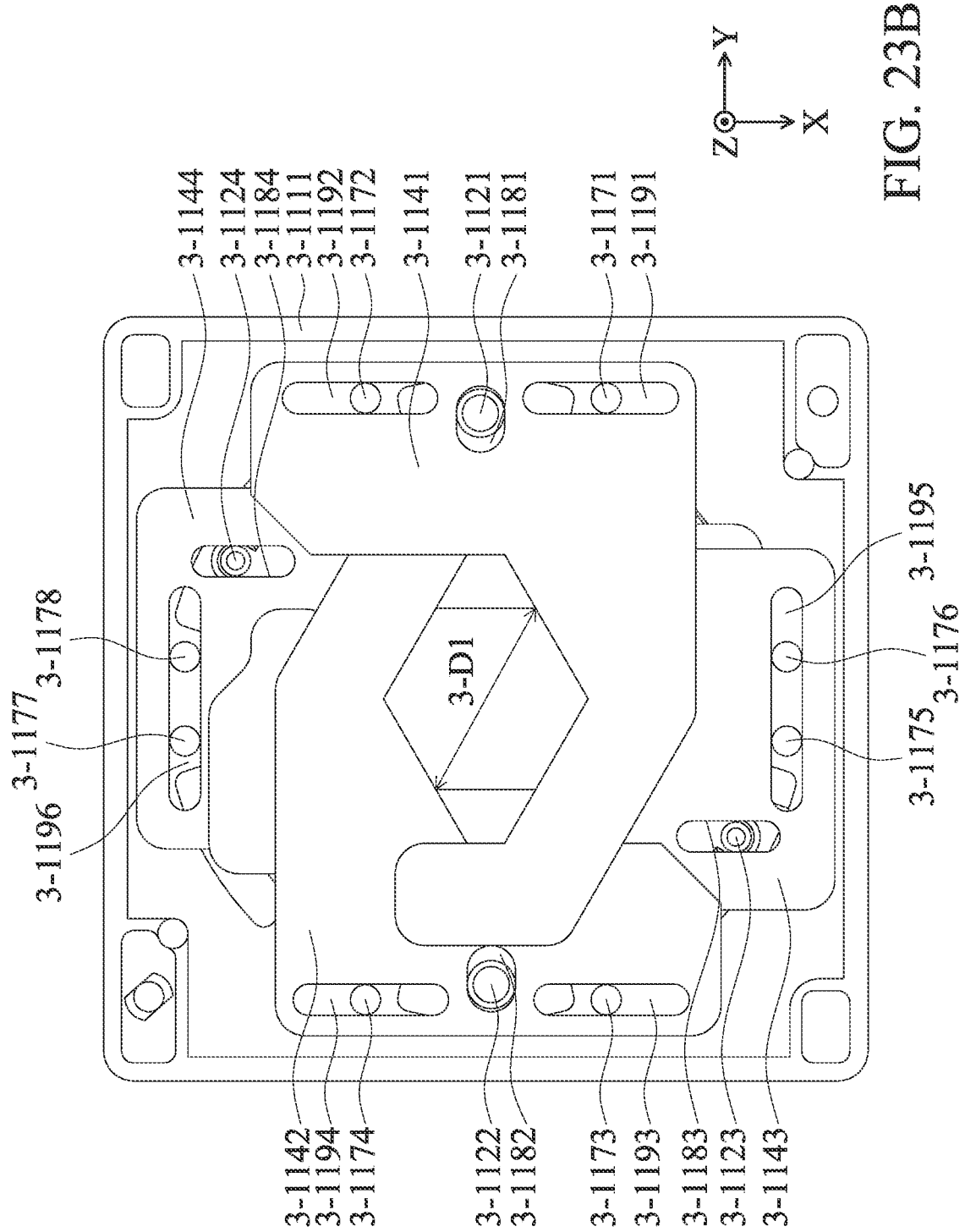
FIG. 23B is a top view of some elements of the light amount adjusting mechanism.
Figure 23C:
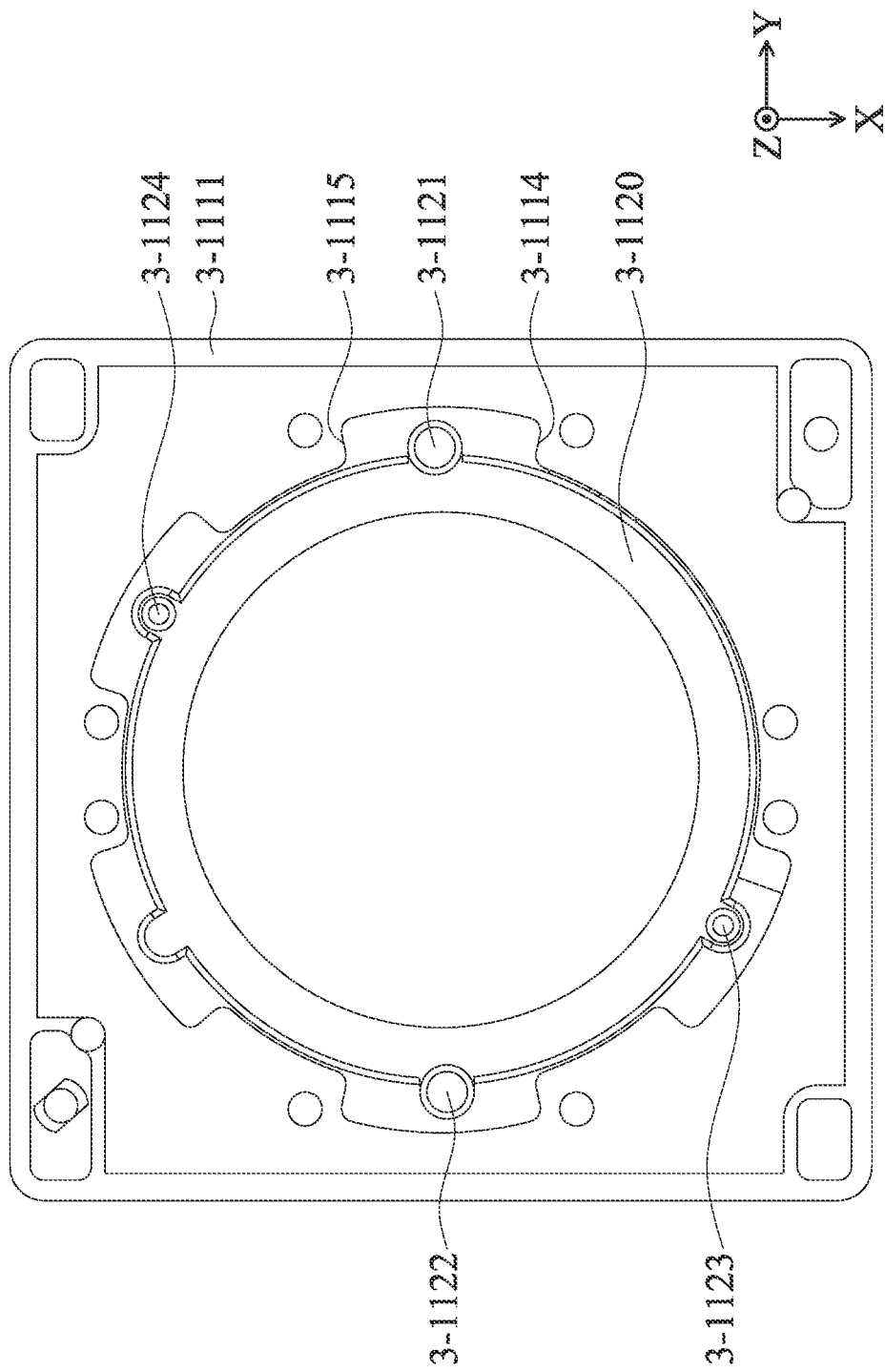
FIG. 23C is a top view of some elements of the light amount adjusting mechanism.
Figure 23D:
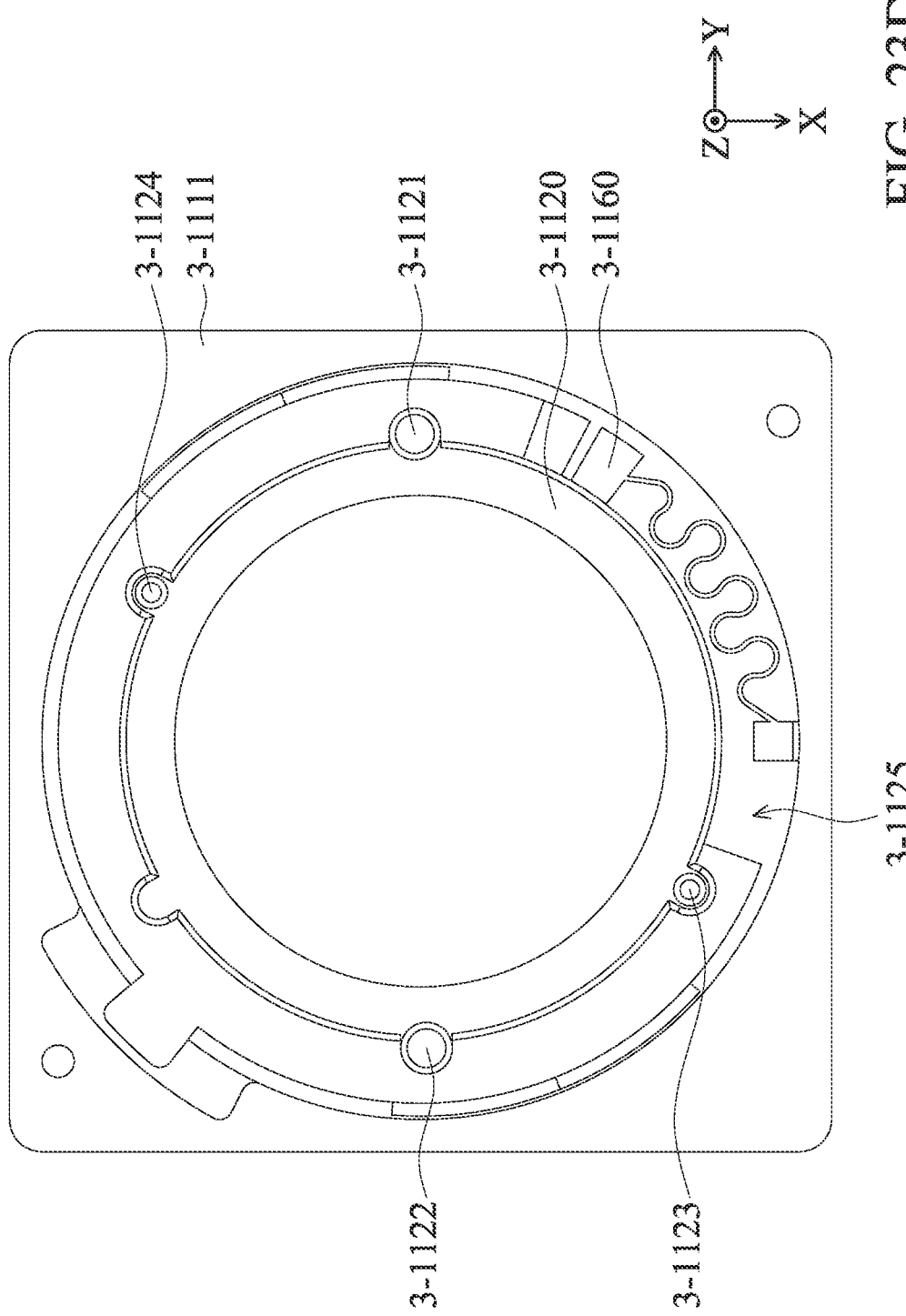
FIG. 23D is a top view of some elements of the light amount adjusting mechanism.

FIG. 23A is a schematic view of some elements of the light amount adjusting mechanism 3-1100. FIG. 23B is a top view of some elements of the light amount adjusting mechanism 3-1100, wherein the top plate 3-1113 is omitted. FIG. 23C is a top view of some elements of the light amount adjusting mechanism 3-1100, wherein the elements on the case 3-1111 is omitted. FIG. 23D is a top view of some elements of the light amount adjusting mechanism 3-1100, wherein the case 3-1111 and the elements on the case 3-1111 are omitted.

As shown in FIG. 23A to FIG. 23D, the first light amount control unit 3-1141, the second light amount control unit 3-1142, the third light amount control unit 3-1143, and the fourth light amount control unit 3-1144 of the light amount control element 3-1140 may form an opening with a size 3-D1. The opening may be used for allowing light passing through. Moreover, the first light amount control unit 3-1141, the second light amount control unit 3-1142, the third light amount control unit 3-1143, and the fourth light amount control unit 3-1144 may be movably connected to the movable portion 3-1120.

Specifically, in some embodiments, when viewed along the main axis 3-1500, the first light amount control unit 3-1141 include a first guiding recess 3-1181 extending in a first direction (e.g. the Y direction). The second light amount control unit 3-1142 includes a second guiding recess 3-1182 extending in the first direction. The third light amount control unit 3-1143 includes a second guiding recess 3-1182 extending in a second direction (e.g. the X direction). The fourth light amount control unit 3-1144 may include a fourth guiding recess 3-1184 extending in the second direction.

Furthermore, the movable portion 3-1120 may include a first guiding portion 3-1121, a second guiding portion 3-1122, a third guiding portion 3-1123, and a fourth guiding portion 3-1124 extending in the main axis 3-1500. The first guiding portion 3-1121 may be disposed in the first guiding recess 3-1181, the second guiding portion 3-1122 may be disposed in the second guiding recess 3-1182, the third guiding portion 3-1123 may be disposed in the third guiding recess 3-1183, and the fourth guiding portion 3-1124 may be disposed in the fourth guiding recess 3-1184.

In some embodiments, when the movable portion 3-1120 rotates, the first guiding portion 3-1121, the second guiding portion 3-1122, the third guiding portion 3-1123, and the fourth guiding portion 3-1124 may slide in the first guiding recess 3-1181, the second guiding recess 3-1182, the third guiding recess 3-1183, and the fourth guiding recess 3-1184, respectively, to move the first light amount control unit 3-1141, the second light amount control unit 3-1142, the third light amount control unit 3-1143, and the fourth light amount control unit 3-1144 in specific directions. Therefore, the size of the opening may be controlled to adjust the size of the aperture.

In some embodiments, the first light amount control unit 3-1141 may further include a first positioning recess 3-1191 and a second positioning recess 3-1192 extending in the second direction (the X direction). The second light amount control unit 3-1142 may further include a third positioning recess 3-1193 and a fourth positioning recess 3-1194 extending in the second direction. The third light amount control unit 3-1143 may further include a fifth positioning recess 3-1195 extending in the first direction (the Y direction). The fourth light amount control unit 3-1144 may further include a sixth positioning recess 3-1196 extending in the first direction.

In some embodiments, the case 3-1111 may include a first positioning portion 3-1171, a second positioning portion 3-1172, a third positioning portion 3-1173, a fourth positioning portion 3-1174, a fifth positioning portion 3-1175, a sixth positioning portion 3-1176, a seventh positioning portion 3-1177, and an eighth positioning portion 3-1178 extending along the main axis 3-1500. The first positioning portion 3-1171 may be disposed in the first positioning recess 3-1191. The second positioning portion 3-1172 may be disposed in the second positioning recess 3-1192. The third positioning portion 3-1173 may be disposed in the third positioning recess 3-1193. The fourth positioning portion 3-1174 may be disposed in the fourth positioning recess 3-1194. The fifth positioning portion 3-1175 and the sixth positioning portion 3-1176 may be disposed in the fifth positioning recess 3-1195. The seventh positioning portion 3-1177 and the eighth positioning portion 3-1178 may be disposed in the sixth positioning recess 3-1196. The first positioning portion 3-1171 and the second positioning portion 3-1172 may arrange in the second direction. The third positioning portion 3-1173 and the fourth positioning portion 3-1174 may arrange in the second direction. The fifth positioning portion 3-1175 and the sixth positioning portion 3-1176 may arrange in the first direction. The seventh positioning portion 3-1177 and the eighth positioning portion 3-1178 may arrange in the first direction.

Therefore, the movable directions of the first light amount control unit 3-1141, the second light amount control unit 3-1142, the third light amount control unit 3-1143, and the fourth light amount control unit 3-1144 may be controlled by the positioning portions arranged in specific directions. For example, since the first positioning portion 3-1171 and the second positioning portion 3-1172 arrange in the second direction, the movable direction of the first light amount control unit 3-1141 is restricted in the second direction. Moreover, the movable range of the first light amount control unit 3-1141, the second light amount control unit 3-1142, the third light amount control unit 3-1143, and the fourth light amount control unit 3-1144 may be defined by the first positioning portion 3-1171, the second positioning portion 3-1172, the third positioning portion 3-1173, the fourth positioning portion 3-1174, the fifth positioning portion 3-1175, the sixth positioning portion 3-1176, the seventh positioning portion 3-1177, and the eighth positioning portion 3-1178.

As shown in FIG. 23D, the third resilient element 3-1160 may be disposed on the bottom 3-1112, the movable portion 3-1120 may include a recess 3-1125, and the third resilient element 3-1160 may be disposed in the recess 3-1125. The size of the recess 3-1125 may be greater than the size of the third resilient element 3-1160. Therefore, the movable range of the movable portion 3-1120 may be defined by the third resilient element 3-1160 when the movable portion 3-1120 rotates in the clockwise direction or in the counterclockwise direction.

Figure 24A:
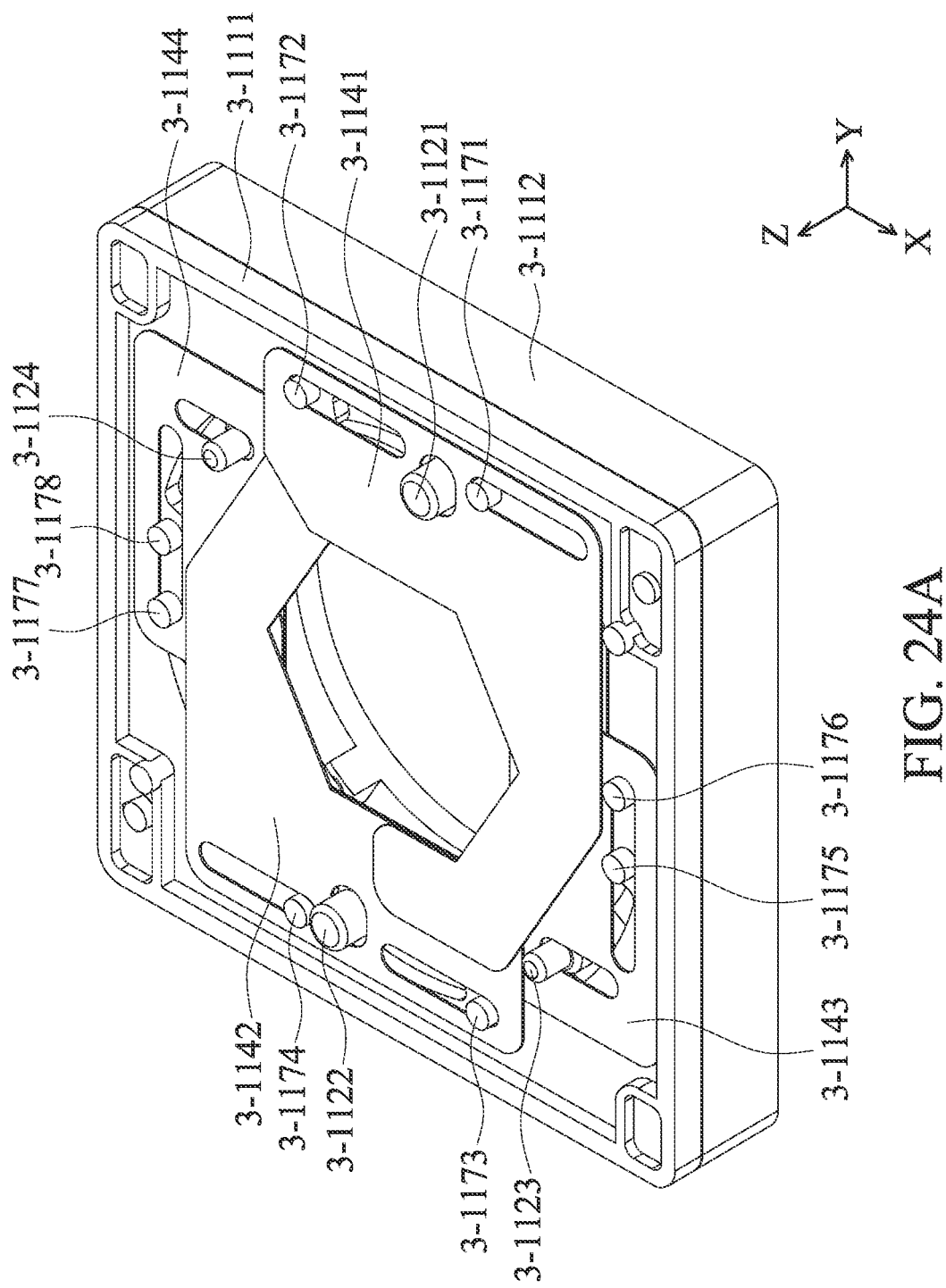
FIG. 24A to FIG. 24C are schematic views of some elements of the light amount adjusting mechanism when the movable portion rotates in the clockwise direction
Figure 24B:
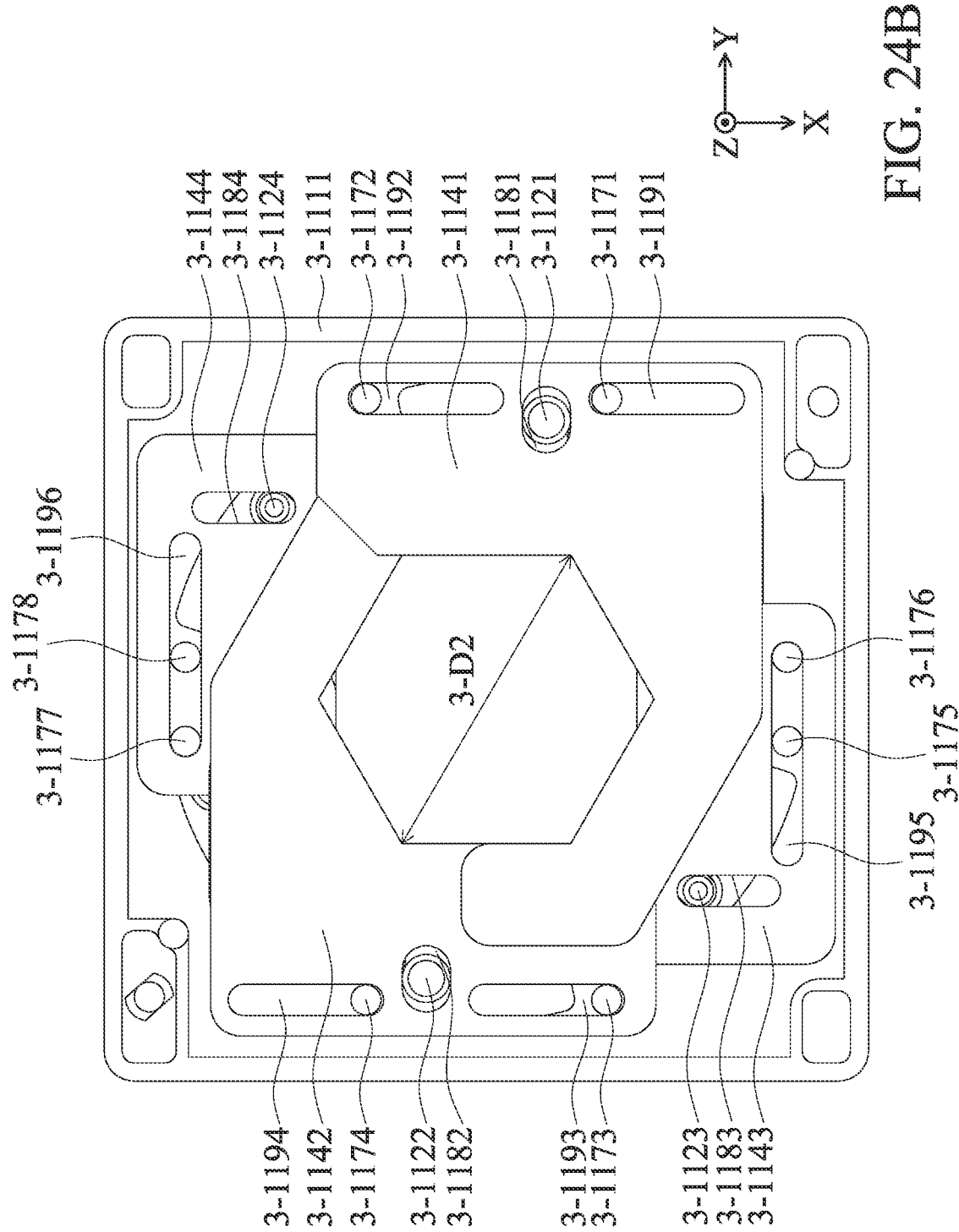
Figure 24C:
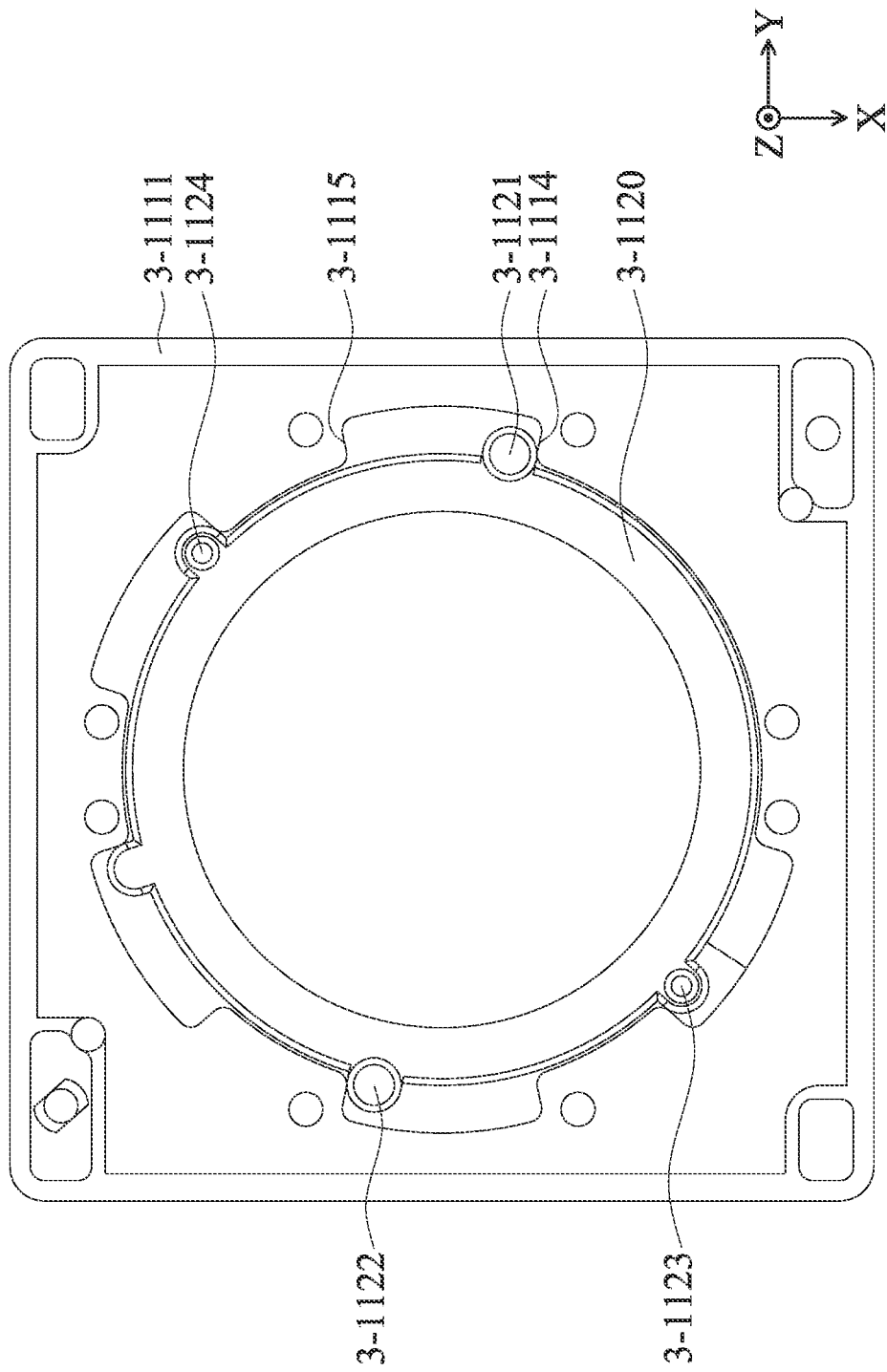

FIG. 24A to FIG. 24C are schematic views of some elements of the light amount adjusting mechanism 3-1100 when the movable portion 3-1120 rotates in the clockwise direction (first dimension), wherein similar elements in FIG. 23A to FIG. 23C are shown. As shown in FIG. 24A to FIG. 24C, when the movable portion 3-1120 rotates in the clockwise direction until the first guiding portion 3-1121 being in contact with a first stopping portion 3-1114 of the case 3-1111, the opening defined by the first light amount control unit 3-1141, second light amount control unit 3-1142, third light amount control unit 3-1143, fourth light amount control unit 3-1144 has a size 3-D2, wherein the size 3-D2 is greater than the size 3-D1. Therefore, the size of the opening may be adjusted.

Figure 25A:
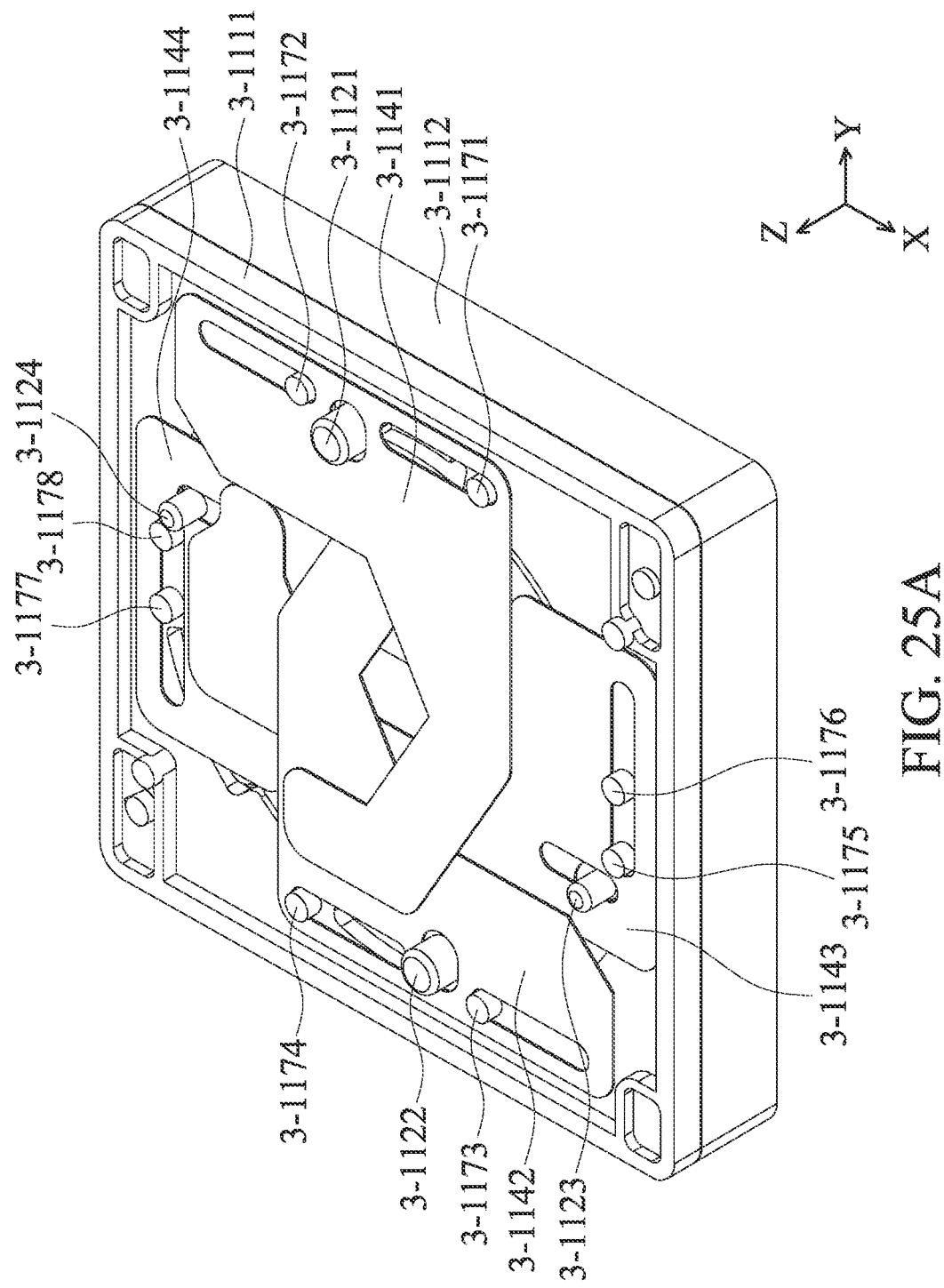
FIG. 25A to FIG. 25C are schematic views of some elements of the light amount adjusting mechanism when the movable portion rotates in the counterclockwise direction.
Figure 25B:
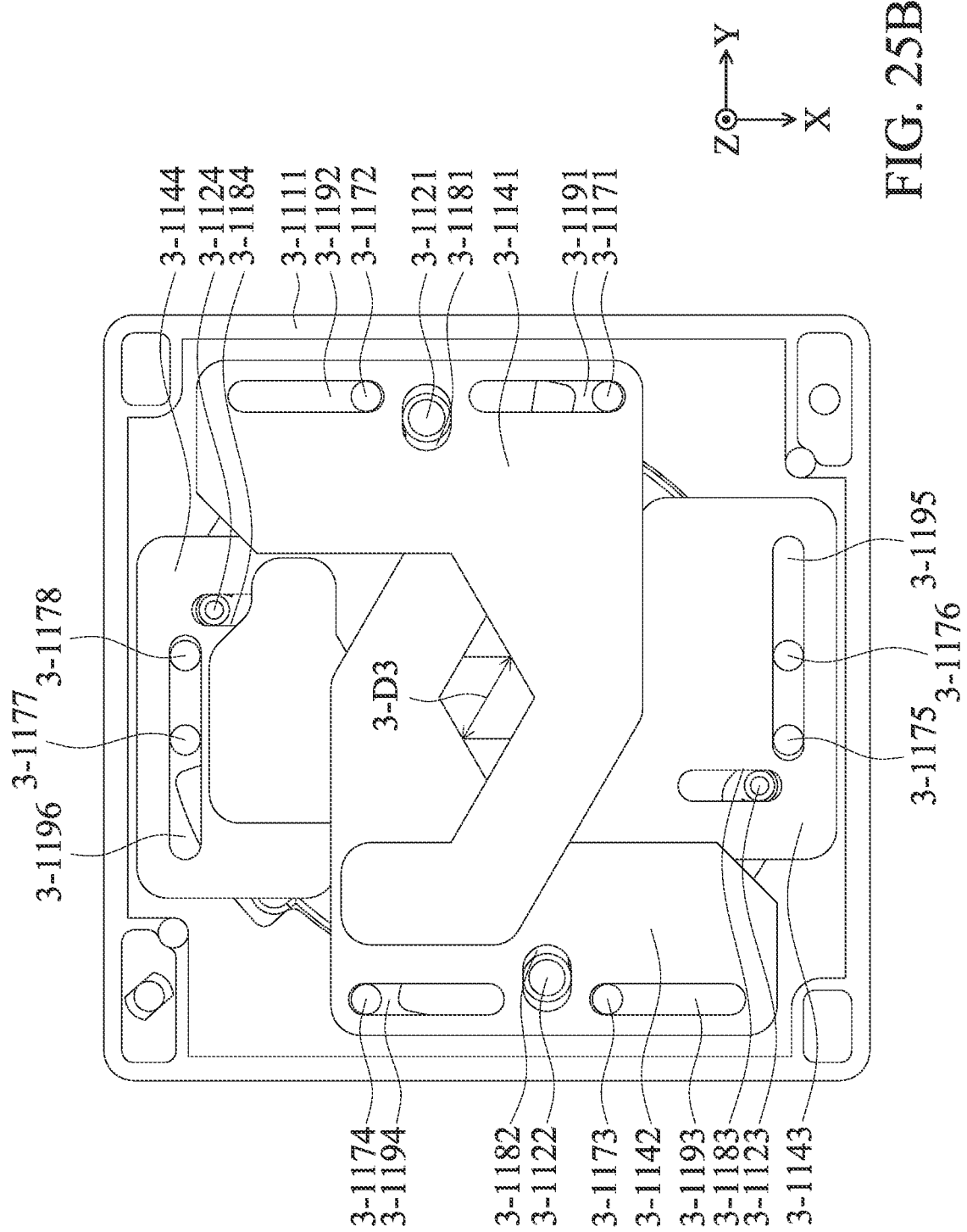
Figure 25C:
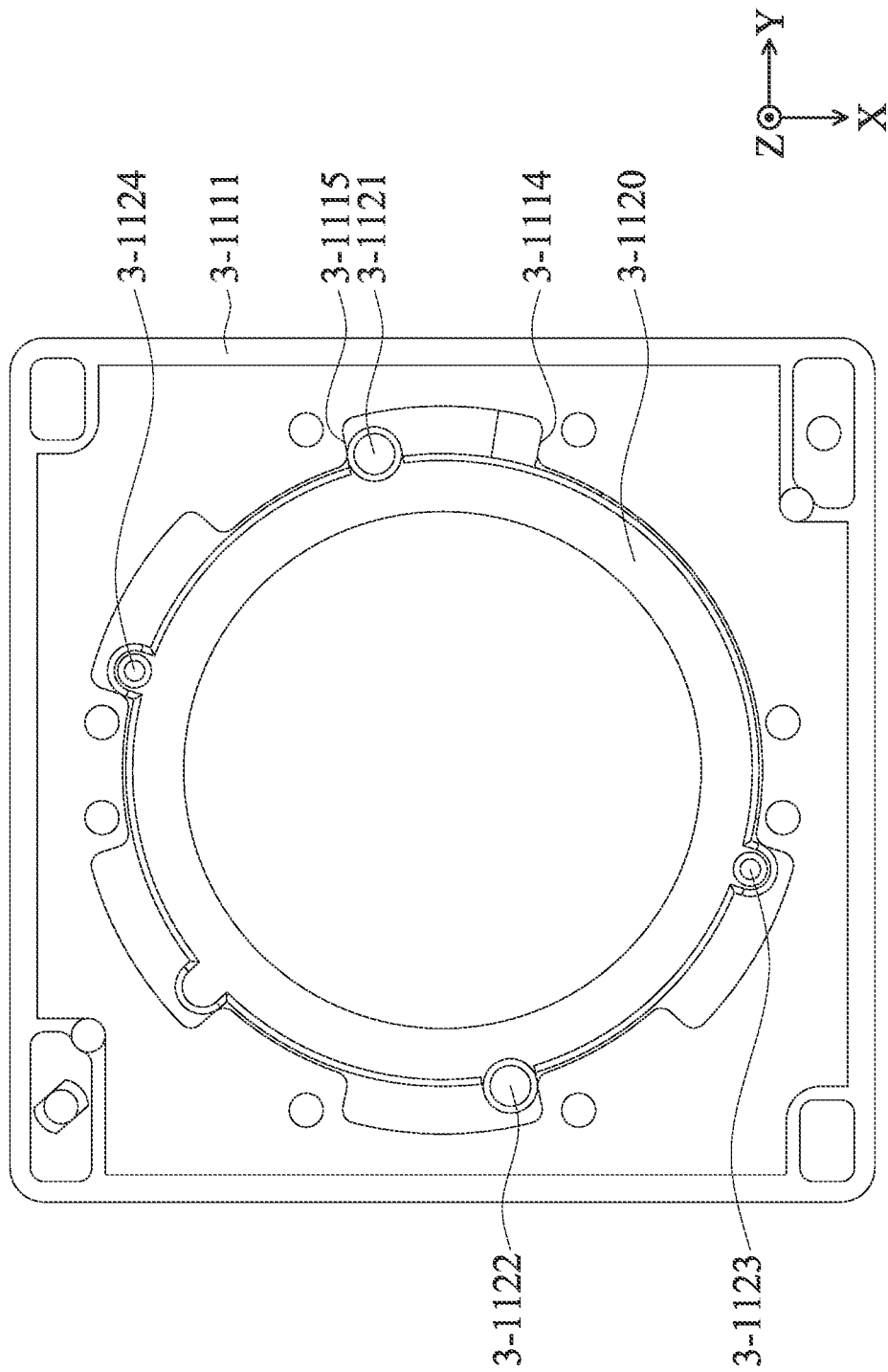

FIG. 25A to FIG. 25C are schematic views of some elements of the light amount adjusting mechanism 3-1100 when the movable portion 3-1120 rotates in the counterclockwise direction (second dimension), wherein similar elements in FIG. 23A to FIG. 23C are shown. As shown in FIG. 25A to FIG. 25C, when the movable portion 3-1120 rotates in the clockwise direction until the first guiding portion 3-1121 being in contact with a second stopping portion 3-1115 of the case 3-1111, the opening defined by the first light amount control unit 3-1141, second light amount control unit 3-1142, third light amount control unit 3-1143, fourth light amount control unit 3-1144 has a size 3-D3, wherein the size 3-D3 is less than the size 3-D1 and the size 3-D2. Therefore, the size of the opening may be adjusted.

Figure 26:
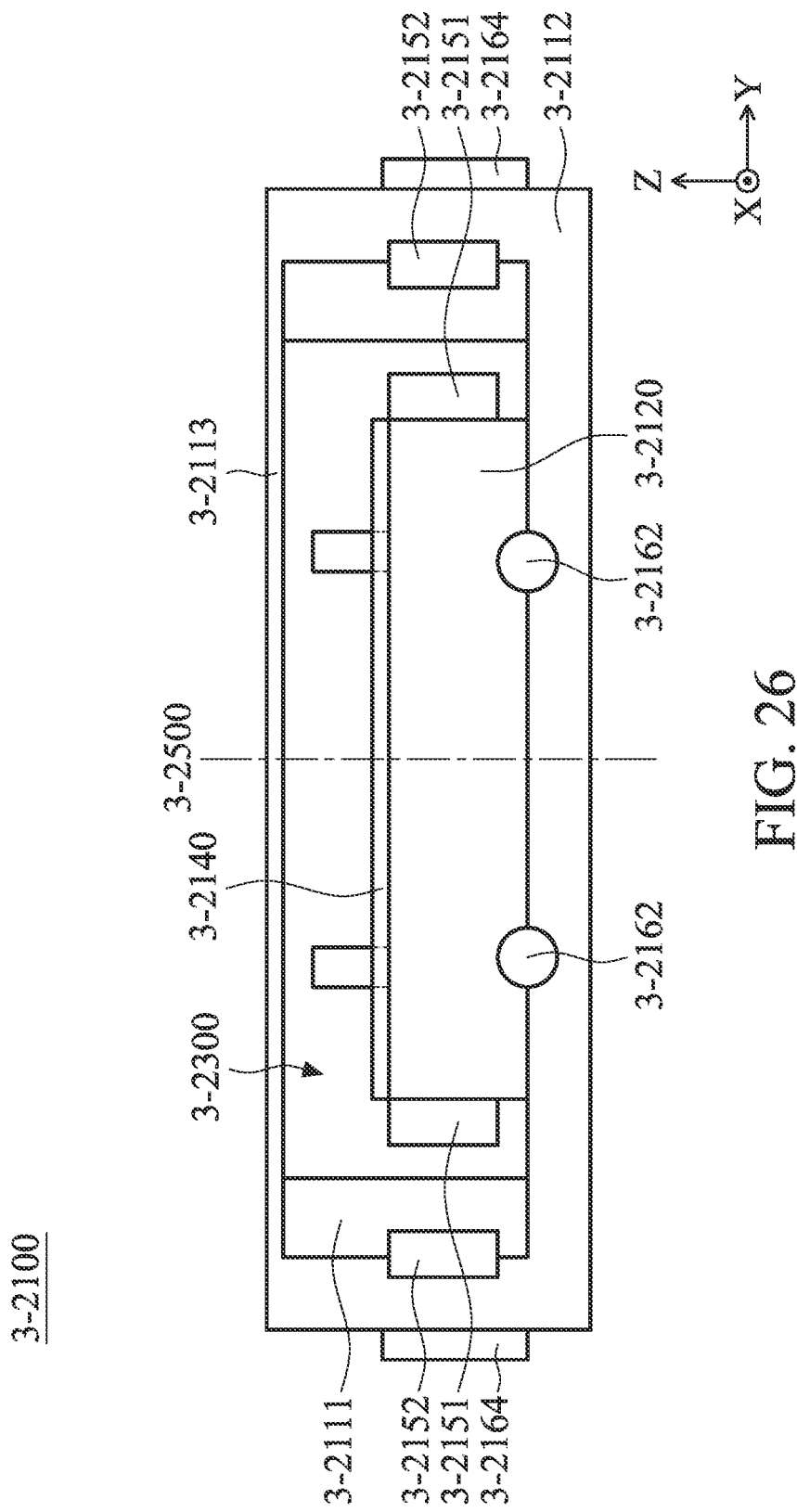
FIG. 26 is a schematic view of a light amount adjusting mechanism in some embodiments of the present disclosure.

FIG. 26 is a schematic view of a light amount adjusting mechanism 3-2100 in some embodiments of the present disclosure. In some embodiments, the light amount adjusting mechanism 3-2100 may mainly include a case 3-2111, a bottom 3-2112, a top plate 3-2113, a movable portion 3-2120, a light amount control element 3-2140, a first driving element 3-2151, a first driving element 3-2152, a connecting element 3-2162, and a magnetic conductive element 3-2164 arranged in a main axis 3-2500. The light amount adjusting mechanism 3-2100 may substitute the light amount adjusting mechanism 3-1100 to be disposed in the optical module 3-1001 or the optical module 3-1002 to control the amount or characteristic of light incident to the optical element 3-1230. The case 3-2111, the bottom 3-2112, the top plate 3-2113 may form an accommodating space 3-2300 to accommodating other elements. The functions of the case 3-2111, the bottom 3-2112, the top plate 3-2113, the movable portion 3-2120, the light amount control element 3-2140, the first driving element 3-2151, the first driving element 3-2152, the connecting element 3-2162, the magnetic conductive element 3-2164 may be identical or similar to the case 3-1111, the bottom 3-1112, the top plate 3-1113, the movable portion 3-1120, the light amount control element 3-1140, the first driving element 3-1151, the second driving element 3-1152, the connecting element 3-1162, and the magnetic conductive element 3-1164, and are not descripted again.

As shown in FIG. 26, in some embodiments, the first driving element 3-2151 and the first driving element 3-2152 may arrange in a direction that is perpendicular to the main axis 3-2500, and the magnetic conductive element 3-2164 and the first driving element 3-2151 are also arranged in the direction that is perpendicular to the main axis 3-2500. The first driving element 3-2152 may be between the magnetic conductive element 3-2164 and the first driving element 3-2151. Therefore, the movable portion 3-2120 may be driven to move relative to the case 3-2111 or the bottom 3-2112 to control the light amount control element 3-2140, so the amount or characteristic of the light incident to the optical element 3-1230 may be controlled.

An optical module is provided in some embodiments of the present disclosure. The optical module includes a holder for connecting to an optical element and a heat control assembly used for control the temperature of the optical element. The heat control assembly corresponds to the optical element or the holder. Therefore, the heat generated from elements other may be prevented from affecting the optical element, and miniaturization may be achieved.

The relative positions and size relationship of the elements in the present disclosure may allow the driving mechanism achieving miniaturization in specific directions or for the entire mechanism. Moreover, different optical modules may be combined with the driving mechanism to further enhance optical quality, such as the quality of photographing or accuracy of depth detection. Therefore, the optical modules may be further utilized to achieve multiple anti-vibration systems, so image stabilization may be significantly improved.

The fourth embodiment of the present disclosure is described below.

An optical element driving mechanism is provided in the present disclosure, including a plurality of optical elements, such as lenses and optical sensing elements, etc. To achieve desirable optical effects, these optical elements may be movable relative to each other. Therefore, the optical element driving mechanism of the present disclosure further includes a plurality of driving assemblies for moving one or more optical elements, respectively. In the present disclosure, these driving assemblies allow the optical elements to move in different directions, such as translational movements on X, Y, Z axes and/or rotational movements around Z axis, thereby achieving great optical effects.

Figure 27:
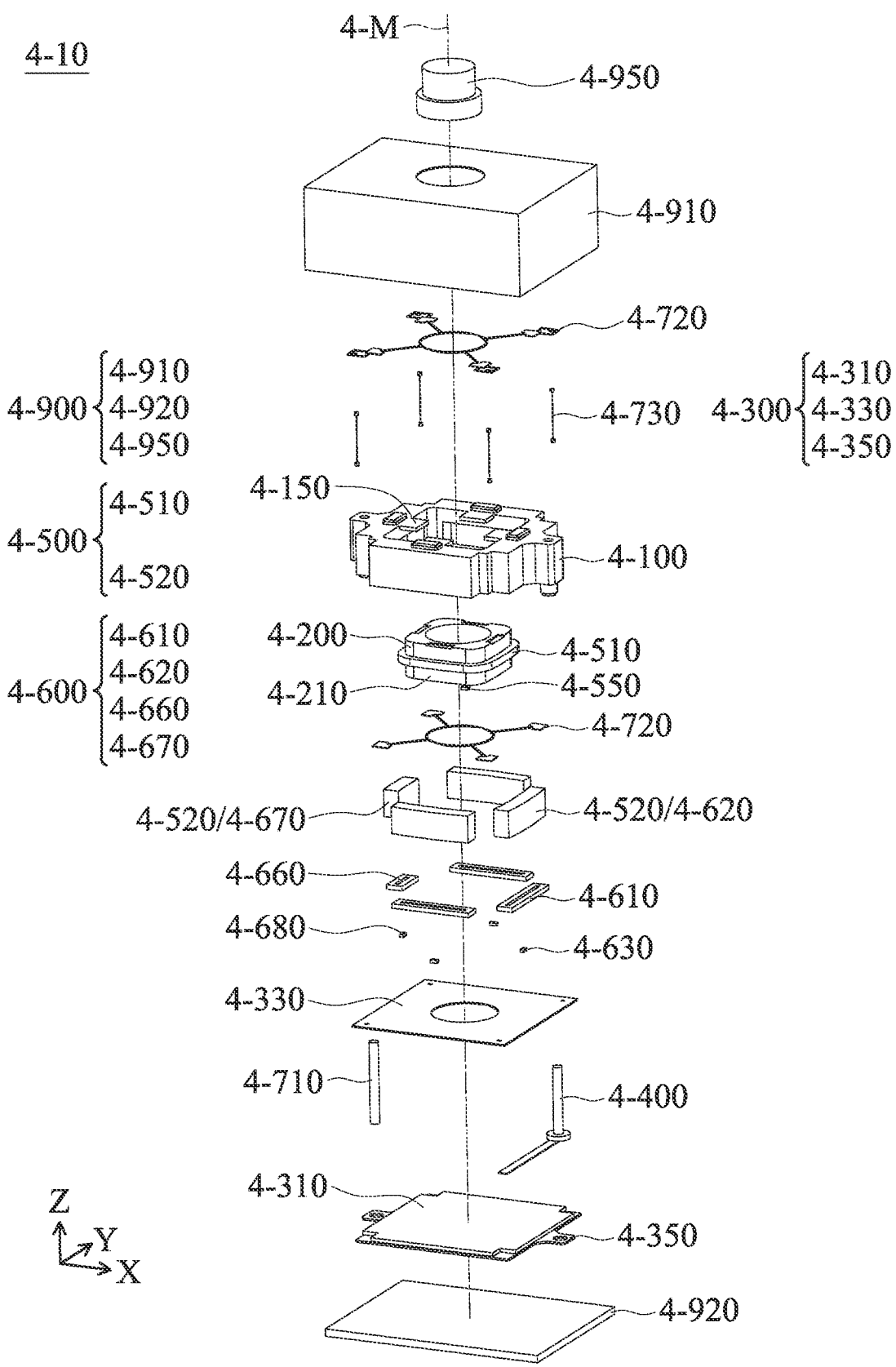
FIG. 27 is an exploded view of the optical element driving mechanism, according to some embodiments of the present disclosure.

Referring to FIG. 27, FIG. 27 is an exploded view of the optical element driving mechanism 4-10, according to some embodiments of the present disclosure. As shown in FIG. 27, the optical element driving mechanism 4-10 mainly includes: a first movable portion 4-100, a second movable portion 4-200, a third movable portion 4-300, a first driving assembly 4-400, a second driving assembly 4-500, a third driving assembly 4-600, and a fixed portion 4-900. In some embodiments, the first movable portion 4-100 may be connected to a first optical element (e.g. a lens group including one or more lenses, not shown), and the second movable portion 4-200 may also be connected to the first optical element. The third movable portion 4-300 may be connected to a second optical element (e.g. an optical sensing element, not shown). Each of the components of the optical element driving mechanism 4-10 are arranged along the main axis 4-M. The first optical element has a first optical axis 4-O1, and the second optical element has a second optical axis 4-O2 (see FIG. 30). In some embodiments, the main axis 4-M, the first optical axis 4-O1, and the second optical axis 4-O2 are parallel to one another. According to some embodiments of the present disclosure, the first driving assembly 4-400 drives the first movable portion 4-100 to move relative to the fixed portion 4-900 in a first dimension. The second driving assembly 4-500 drives the second movable portion 4-200 to move relative to the fixed portion 4-900 in a second dimension. The third driving assembly 4-600 drives the third movable portion 4-300 to move relative to the fixed portion 4-900 in a third dimension. More specifically, the second movable portion 4-200 is movable relative to the first movable portion 4-100, and the third movable portion 4-300 is movable relative to the first movable portion 4-100 and the second movable portion 4-200. In some embodiments, the third dimension is different from the first dimension, and also different from the second dimension. For example, in some embodiments, a movement in the first dimension is a translational movement along the main axis 4-M. A movement in the second dimension is a translational movement along the first optical axis 4-O1. A movement in the third dimension is a translational movement in a direction that is perpendicular to the second optical axis 4-O2 or a rotational movement around a first rotational axis, wherein the first rotational axis is parallel to the second optical axis 4-O2.

Figure 28:
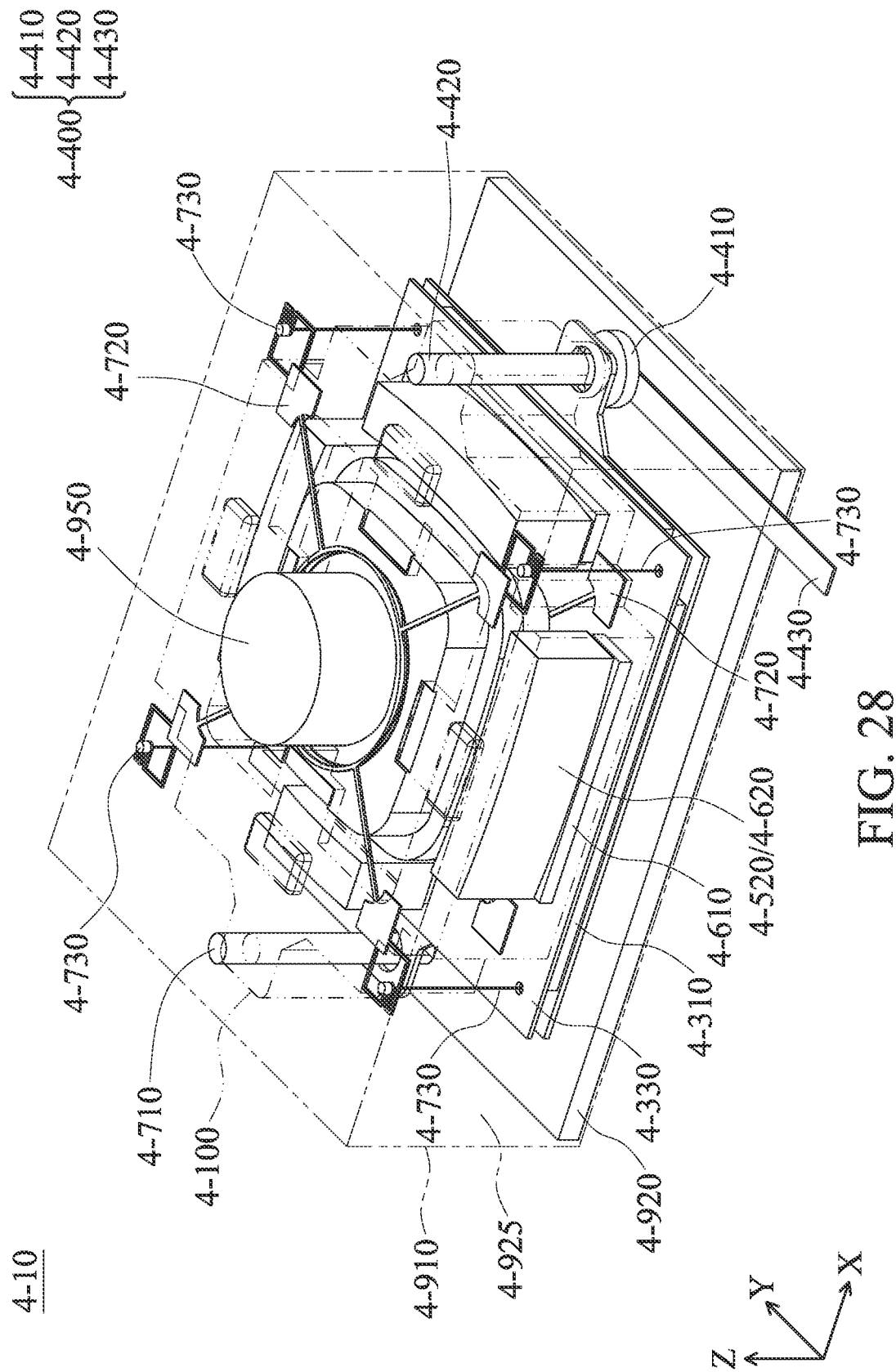
FIG. 28 is a perspective view of the optical element driving mechanism, according to some embodiments of the present disclosure.

Referring to FIG. 27 and FIG. 28, FIG. 28 is a perspective view of the optical element driving mechanism 4-10, according to some embodiments of the present disclosure. The optical element driving mechanism 4-10 of the present disclosure further includes a first supporting assembly 4-710, a second supporting assembly 4-720, and a third supporting assembly 4-730. The first supporting assembly 4-710 is disposed between the first movable portion 4-100 and the fixed portion 4-900. The first movable portion 4-100 moves relative to the fixed portion 4-900 via the first supporting assembly 4-710. The second supporting assembly 4-720 is disposed between the first movable portion 4-100 and the second movable portion 4-200. The second movable portion 4-200 moves relative to the fixed portion 4-900 via the second supporting assembly 4-720. The third supporting assembly 4-730 is disposed between the first movable portion 4-100 and the third movable portion 4-300. The third movable portion 4-300 moves relative to the fixed portion 4-900 via the third supporting assembly 4-730.

Specifically, the first supporting assembly 4-710 includes a first supporting element with a bar-shaped structure that is fixedly disposed at the fixed portion 4-900 and extends along the main axis, as shown in FIG. 28. The first movable portion 4-100 has a through hole that corresponds to the first supporting element, allowing the first supporting element to go through the through hole, so that the first movable portion 4-100 is movable relative to the first supporting element. The second supporting assembly 4-720 includes one or more second elements that have flexibility and plate structures and are perpendicular to the first optical axis 4-O1. In the embodiment shown in FIG. 28, the second supporting assembly 4-720 includes two supporting elements, disposed above and under the second moveable portion 4-200, respectively. In some embodiments, the second supporting elements may be spring sheets or other suitable flexible material, and may be in any suitable shapes. The second movable portion 4-200 is movably connected to the first movable portion 4-100 via the second supporting elements. the third supporting assembly 4-730 includes one or more third supporting elements that have flexibility and bar-shaped structures. In the embodiments shown in FIG. 28, the third supporting assembly 4-730 includes four of the third supporting elements, disposed at the four corners of the first movable portion 4-100, respectively, and extending along the second optical axis 4-O2. In some embodiments, the third supporting elements may be suspension wires. The third movable portion 4-300 is movably connected to the first movable portion 4-100 via the third supporting element. In some other embodiments, the third supporting elements may have ball-shaped structures. By disposing multiple balls between the first movable portion 4-100 and the third movable portion 4-300, the third movable portion 4-300 is movable relative to the first movable portion 4-100. It should be noted that neither the second supporting assembly 4-720 nor the third supporting assembly 4-730 is in contact with the fixed portion 4-900. Additionally, if the side of the fixed portion 4-900 without the first supporting assembly 4-710 is referred to as the first side 4-901 (see FIG. 31), and the side of the fixed portion 4-900 with the first supporting assembly 4-710 is referred to as the second side 4-902 (see FIG. 31), as shown in FIG. 28, the distance between the second supporting assembly 4-720 and the first side 4-901 of the fixed portion 4-900 is smaller than the distance between the second supporting assembly 4-720 and the second side 4-902 of the fixed portion 4-900.

As shown in FIG. 28, on the side opposite from the first supporting assembly 4-710, the first driving assembly 4-400 is disposed. The first driving assembly 4-400 includes a driving element 4-410, a transmitting element 4-420, and a conducting element 4-430. The driving element 4-410 is affixed to the fixed portion 4-900, having piezoelectric material and generating the first driving force 4-F1 (see FIG. 30). The direction of the first driving force 4-F1 is parallel to the main axis 4-M. The transmitting element 4-420 has a bar-shaped structure and extends along the main axis 4-M. One of the ends of the transmitting element 4-420 is connected to the driving element 4-410, transmitting the first driving force 4-F1 to the first movable portion 4-100. The transmitting element 4-420 is movable relative to the fixed portion 4-900 and the first movable portion 4-100, achieving effects of optical zooming or optical focusing. More specifically, the first movable portion 4-100 has a through hole that corresponds to the transmitting element 4-420, allowing the transmitting element 4-420 to go through the through hole, so that the first movable portion 4-100 is movable relative to the transmitting element 4-420. When the transmitting element 4-420 is pushed by the first driving force 4-F1 generated by the driving element 4-410 and moves along the main axis 4-M, if the friction force between the transmitting element 4-420 and the first movable portion 4-100 is smaller than the maximum static friction therebetween, the transmitting element 4-420 may carry the first movable portion 4-100 to move together along the main axis 4-M. Thus, the first movable portion 4-100 may be driven to move relative to the fixed portion 4-900. It should be noted that, in some embodiments, the first driving assembly 4-400 drives the first movable portion 4-100 to move while carrying the second movable portion 4-200 to move relative to the fixed portion 4-900. In some embodiments, the first driving assembly 4-400 drives the first movable portion 4-100 to move while also carrying the third movable portion 4-300 to move relative to the fixed portion 4-900. The conducting element 4-430 is electrically connected to the driving element 4-410 and an external power source, providing a driving signal to the first driving assembly 4-400.

Figure 29:
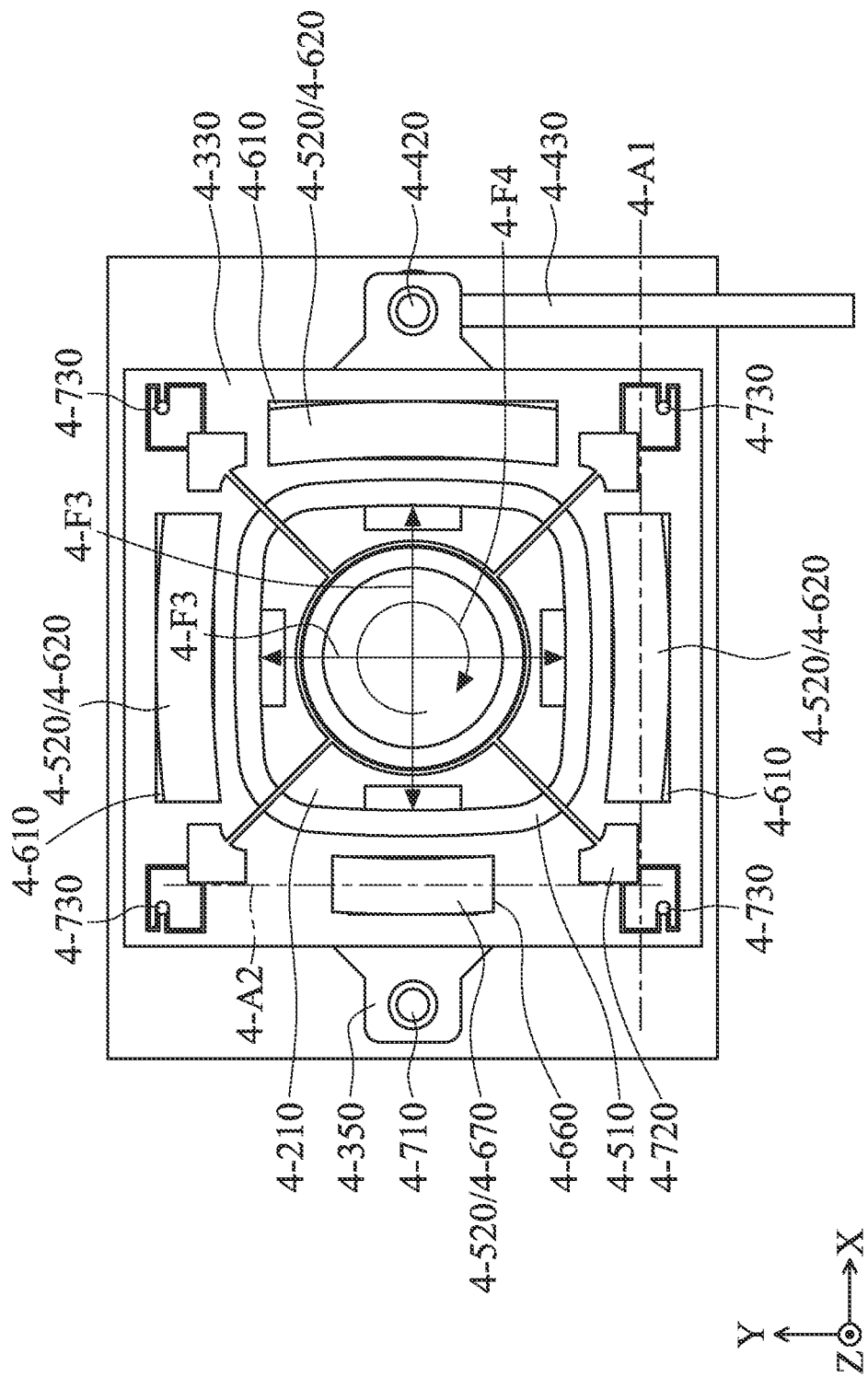
FIG. 29 is a top view of the optical element driving mechanism, according to some embodiments of the present disclosure, wherein the case and the first movable portion are omitted.
Figure 30:
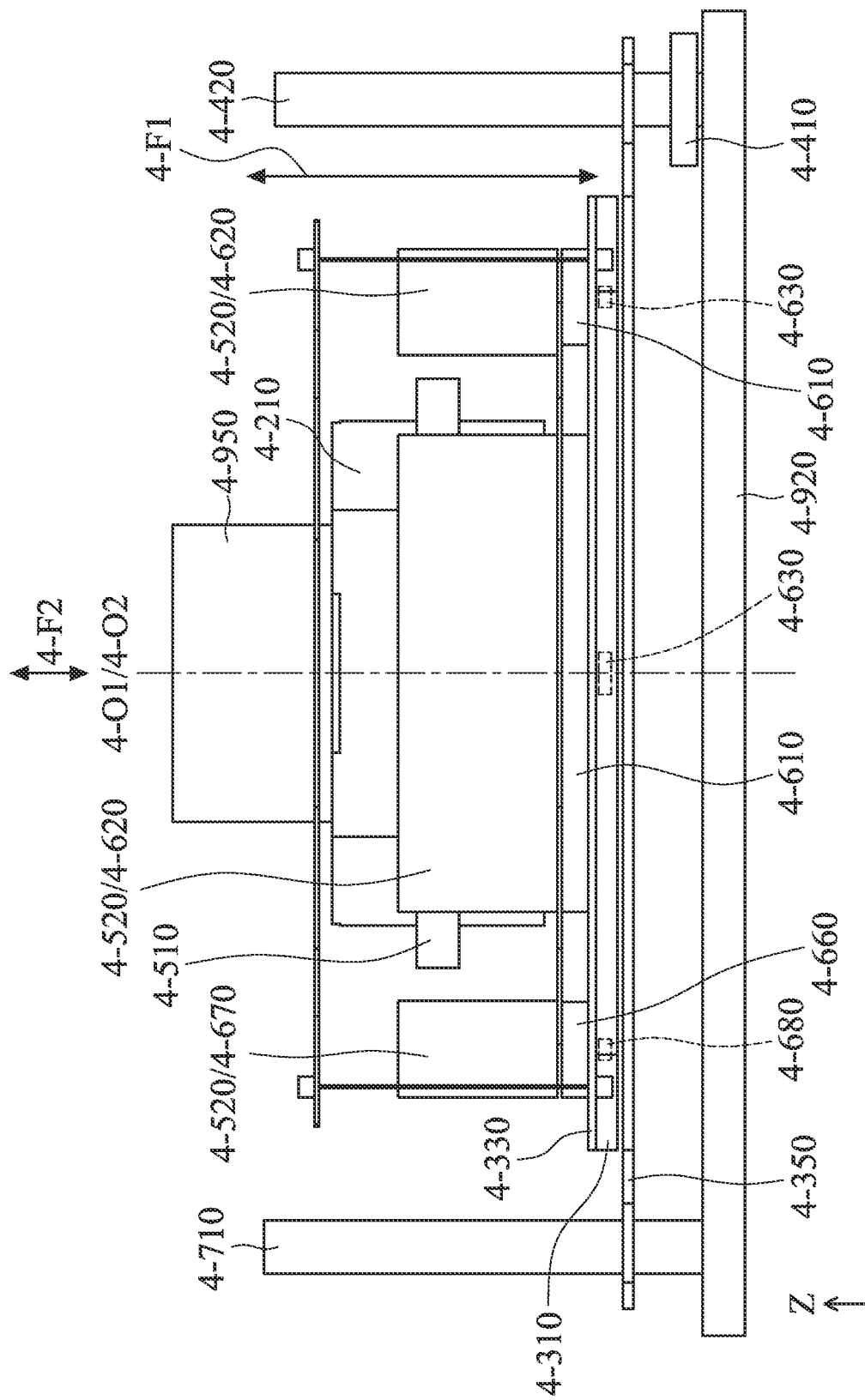
FIG. 30 is a front view of the optical element driving mechanism, according to some embodiments of the present disclosure, wherein the case and the first movable portion are omitted.

Next, referring to FIG. 29 and FIG. 30, FIG. 29 and FIG. 30 are respectively a top view and a front view of the optical element driving mechanism 4-10, according to some embodiments of the present disclosure, wherein the case 4-910 and the first movable portion 4-100 are omitted. In some embodiments, the second movable portion 4-200 includes a first holder 4-210. The first holder 4-210 may be connected to the first optical element (not shown). For example, the first optical element may be disposed inside the first holder 4-210. The third movable portion 4-300 includes a second holder 4-310, a circuit assembly 4-330 and a bottom board 4-350. The second holder 4-310 may be connected to the second optical element (not shown). For example, the second optical element may be disposed inside the second holder 4-310. The circuit assembly 4-330 is electrically connected to the third driving assembly 4-600, providing driving force to the third movable portion 4-300. The bottom board 4-350 is fixedly connected to the second holder 4-310. There are holes on the bottom board 4-350 for the first driving assembly 4-400 and the first supporting assembly 4-710 to go through.

As shown in FIG. 29, the second driving assembly 4-500 includes a first coil 4-510 and at least one first magnetic elements 4-520. In the embodiment of FIG. 29, the first coil 4-510 has a ring structure surrounding the second movable portion 4-200, which is helpful for simplifying the circuit routes. In some other embodiments, the first coil 4-510 may also be multiple coils that are disposed on each side of the second movable portion 4-200. In the embodiment of FIG. 29, the second driving assembly 4-500 includes four of the first magnetic elements 4-520, disposed on four sides of the second movable portion 4-200, respectively. The first magnetic elements 4-520 correspond to the first coil 4-510, generating the second driving force 4-F2 (FIG. 30). The direction of the second driving force 4-F2 is parallel to the first optical axis 4-O1. The second driving force 4-F2 drives the second movable portion 4-200 to move along the first optical axis 4-O1 relative to the fixed portion 4-900.

As shown in FIG. 29 and FIG. 30, the third driving assembly 4-600 includes three of the second coils 4-610 and three of the second magnetic elements 4-620. Each of the second magnetic elements 4-620 corresponds to one of the second coils 4-610, generating the third driving force 4-F3. Due to the positions of the second coils 4-610 and the second magnetic elements 4-620, the third driving force 4-F3 may be generated in X direction and in Y direction, so that the third driving assembly 4-600 may drive the third movable portion 4-300 to move in X direction and in Y direction, that is, in directions that are perpendicular to the second optical axis 4-O2. When viewed along the second optical axis 4-O2, any one of the third driving forces 4-F3 extends through the center of the second optical element, as shown in FIG. 29. Additionally, since the second coils 4-610 and the second magnetic elements 4-620 are all disposed above the second optical element (in the +Z direction), the third driving forces 4-F3 do not extend through the center of the second optical element when viewed in a direction that is perpendicular to the second optical axis 4-O2 (as the view angle in FIG. 30). The third driving assembly 4-600 further includes a third coil 4-660 and a third magnetic element 4-670. The third magnetic element 4-670 corresponds to the third coil 4-660, generating the fourth driving force 4-F4. As shown in FIG. 29, the direction of the fourth driving force 4-F4 is perpendicular to the second optical axis 4-O2, being a driving force that rotates around the second optical axis 4-O2. Therefore, the third driving assembly 4-600 may also drive the third movable portion 4-300 to rotate around the second optical axis 4-O2.

It should be noted that, for miniaturization of the mechanism, in some embodiments, the second magnetic elements 4-620 may be formed integrally with the first magnetic elements 4-520, and the third magnetic element 4-670 may also be formed integrally with one of the first magnetic elements 4-520. In other words, the second driving assembly 4-500 and the third driving assembly 4-600 may share the magnetic elements. Additionally, when viewed along the second optical axis 4-O2, the second magnetic elements 4-620 may have bar-shaped structures, such as rectangular structures. In FIG. 29, the two of the second magnetic elements 4-620 that are arranged in Y direction extend along the first axis 4-A1, and the second magnetic element 4-620 and the third magnetic element 4-670 that are arranged in X direction extend along the second axis 4-A2. The first axis 4-A1 and the second axis 4-A2 are not parallel. In some embodiments, the first axis 4-A1 is perpendicular to the second axis 4-A2. In the embodiment shown in FIG. 29, the third magnetic element 4-670 has an arc structure when viewed along the second optical axis 4-O2. The arc structure of the third magnetic element 4-670 is helpful for the stability of the fourth driving force 4-F4 which provides a rotational motion. As shown in FIG. 29, when viewed along the second optical axis 4-O2, the largest size of the second magnetic element 4-620 along the first axis 4-A1 is different from the largest size of the third magnetic element 4-670 along the second axis 4-A2. More specifically, the largest size of the second magnetic element 4-620 along the first axis 4-A1 is larger than the largest size of the third magnetic element 4-670 along the second axis 4-A2. Correspondingly, the largest size of the second coil 4-610 along the first axis 4-A1 is different from the largest size of the third coil 4-660 along the second axis 4-A2. More specifically, the largest size of the second coil 4-610 along the first axis 4-A1 is larger than the largest size of the third coil 4-660 along the second axis 4-A2. Additionally, in some embodiments, the second coil 4-610 and the third coil 4-660 may be at least partially embedded in the circuit assembly 4-330.

Figure 31:
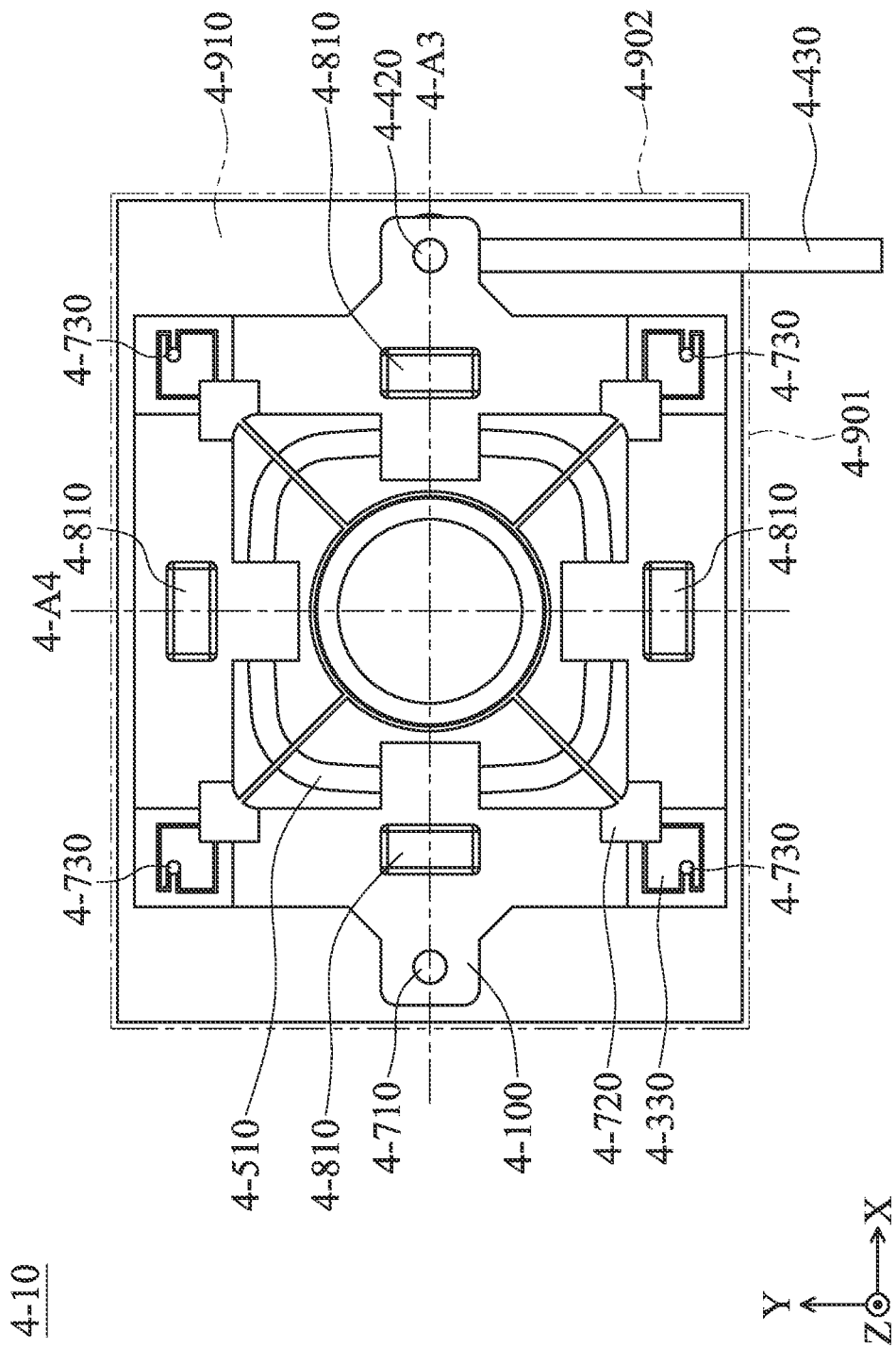
FIG. 31 is a top view of the optical element driving mechanism, according to some embodiments of the present disclosure, wherein the case is omitted.

Next, referring to FIG. 31, FIG. 31 is a top view of the optical element driving mechanism 4-10, according to some embodiments of the present disclosure, wherein the case 4-910 is omitted. When viewed along the main axis 4-M, the fixed portion 4-900 has a polygonal structure, such as a rectangular structure. As mentioned above, the fixed portion 4-900 includes the first side 4-901 and the second side 4-902. The first side 4-901 extends along a third axis 4-A3, and the second side 4-902 extends along a fourth axis 4-A4. The largest size of the first side 4-901 on the third axis 4-A3 is different from the largest size of the second side 4-902 on the fourth axis 4-A4. More specifically, The largest size of the first side 4-901 on the third axis 4-A3 is larger than the largest size of the second side 4-902 on the fourth axis 4-A4. It should be noted that, in the embodiments of the present disclosure, the first axis 4-A1 is parallel to the third axis 4-A3, and the second axis 4-A2 is parallel to the fourth axis 4-A4.

When viewed along the main axis 4-M, the first driving assembly 4-400 is located at the second side 4-902 of the fixed portion 4-900. As a result, the overall size of the mechanism may be reduced in a certain direction (e.g. Y direction). When viewed along the third axis 4-A3, the first driving assembly 4-400 partially overlaps the second driving assembly 4-500. When viewed along the fourth axis 4-A4, the first driving assembly 4-400 does not overlap the second driving assembly 4-500, and the first driving assembly 4-400 does not overlap the third driving assembly 4-600 as well. When viewed along the third axis 4-A3, the first driving assembly 4-400 partially overlaps the third driving assembly 4-600. More specifically, when viewed along the third axis 4-A3, the first driving assembly 4-400 partially overlaps the second magnetic element 4-620, and the first driving assembly 4-400 also partially overlaps the third magnetic element 4-670. Additionally, as shown in FIG. 31, when viewed along the main axis 4-M, a line connecting the first supporting assembly 4-710 and the first driving assembly 4-400 passes through the first optical element that is located in the center.

Figure 32:
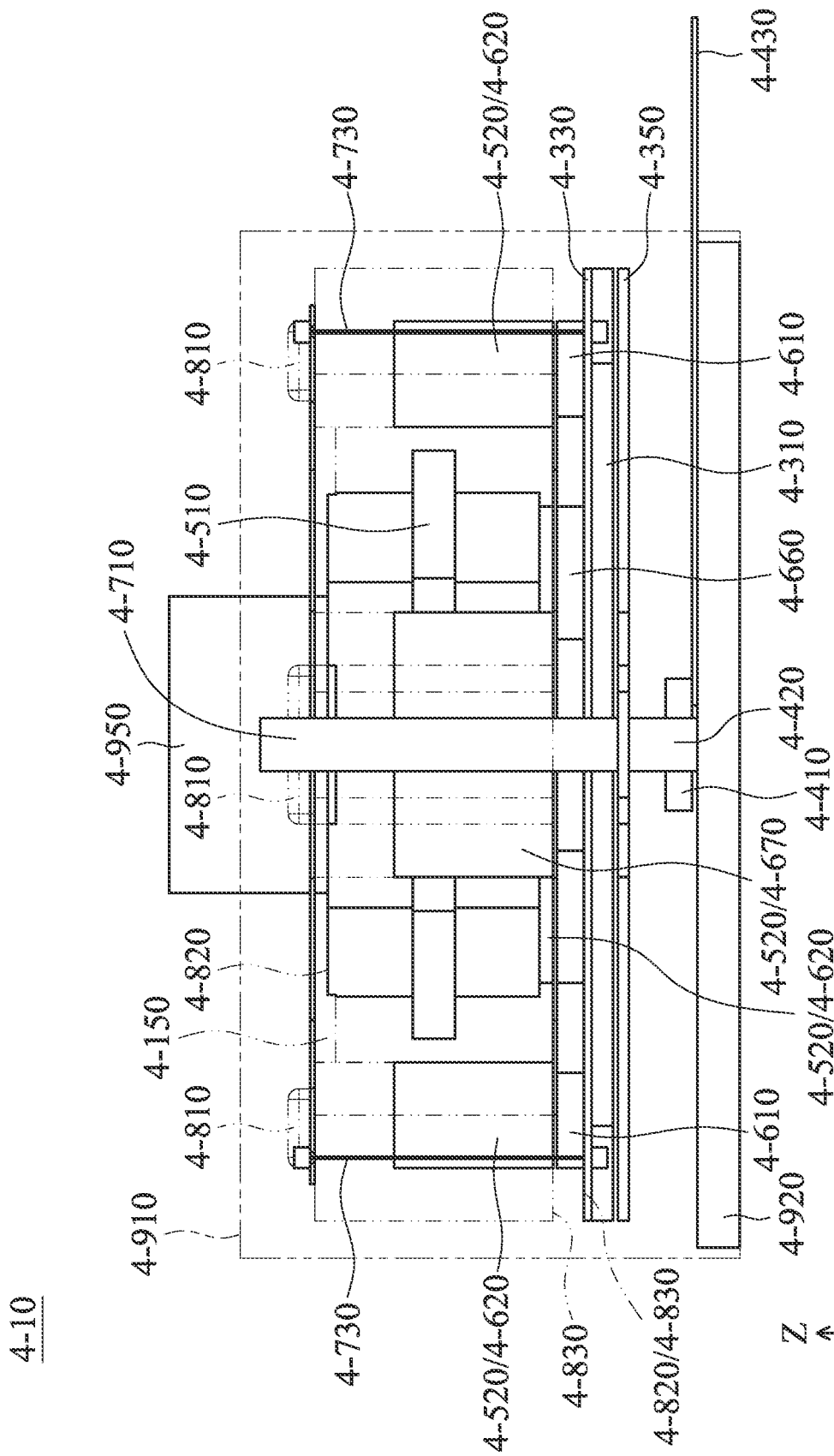
FIG. 32 is a left side view of the optical element driving mechanism, according to some embodiments of the present disclosure.

Next, referring to FIG. 32, FIG. 32 is a left side view of the optical element driving mechanism 4-10, according to some embodiments of the present disclosure. When viewed along the third axis 4-A3, the first supporting assembly 4-710 at least partially overlaps the first driving assembly 4-400; the first supporting assembly 4-710 partially overlaps the second driving assembly 4-500; the first supporting assembly 4-710 partially overlaps the third driving assembly 4-600; the first supporting assembly 4-710 partially overlaps the first optical element; and the first supporting assembly 4-710 partially overlaps the second optical element. Additionally, when viewed along the fourth axis 4-A4, the first supporting assembly 4-710 does not overlap the first driving assembly 4-400; the first supporting assembly 4-710 does not overlap the second driving assembly 4-500; the first supporting assembly 4-710 does not overlap the third driving assembly 4-600; the first supporting assembly 4-710 does not overlap the first optical element; and the first supporting assembly 4-710 does not overlap the second optical element.

In some embodiments, the fixed portion 4-900 may include a case 4-910, a base 4-920, and a third optical element 4-950. The case 4-910 includes a top wall that has a plate shape and is perpendicular to the main axis 4-M. The base 4-920 is fixedly connected to the case 4-910. An accommodating space 4-925 is formed between the case 4-910 and the base 4-920, for accommodating the first movable portion 4-100 and other components. The third optical element 4-950 is fixedly disposed on the case 4-910. In some embodiments, since the third optical element 4-950 is closer to the light source than the first optical element, the light passes through the third optical element 4-950 before entering the first optical element. In some embodiments, the third optical element 4-950 is for optical zooming. In some embodiments, the first driving assembly 4-400 may drive the first optical element to move relative to the third optical element 4-950. Additionally, in some embodiments, since the first optical element is closer to the light source than the second optical element, the light passes through the first optical element before entering the second optical element. In other words, before the light arrives at the second optical element (e.g. the optical sensing element), the light passes through the first optical element and the third optical element 4-950. After the initial optical zooming and/or optical focusing, the light enters the second optical element. However, it should be noted that, in the embodiments according to the present disclosure, the second optical element is movable relative to the first optical element and the third optical element 4-950. The relative motion may be used for further optical zooming and/or optical focusing effects.

In some embodiments, the optical element driving mechanism 4-10 further includes a first stopper assembly 4-810, a second stopper assembly 4-820, and a third stopper assembly 4-830. The first stopper assembly 4-810 is located at the first movable portion 4-100 and the fixed portion 4-900. For example, the first stopper assembly 4-810 may include a plurality of bulges that are located on the top surface of the first movable portion 4-100. During the motion of the first movable portion 4-100, when these bulges are in contact with the fixed portion 4-900, the first movable portion 4-100 may be defined to move within a first range of movement relative to the fixed portion 4-900. The second stopper assembly 4-820 is located at the first movable portion 4-100 and the third movable portion 4-300. For example, the first movable portion 4-100 may include a frame 4-150 that surrounds its circumference. The second stopper assembly 4-820 may be located at the surface of the frame 4-150 that faces the second movable portion 4-200 and at the surface of the circuit assembly 4-300 of the third movable portion 4-300 that faces the second movable portion 4-200. During the motion of the second movable portion 4-200, when the second movable portion 4-200 is in contact with the frame 4-150 or the circuit assembly 4-330, the second movable portion 4-200 may be defined to move within a second range of movement relative to the first movable portion 4-100. The third stopper assembly 4-830 is located at the first movable portion 4-100 and the third movable portion 4-300. For example, the third stopper assembly 4-830 may be located at the surface of the first movable portion 4-100 that faces the third movable portion 4-300 and at the surface of the circuit assembly 4-300 of the third movable portion 4-300 that faces the first movable portion 4-100. During the motion of the third movable portion 4-300, when the circuit assembly 4-330 is in contact with the first movable portion 4-100, the third movable portion 4-300 may be defined to move within a third range of movement relative to the first movable portion 4-100 and/or the second movable portion 4-200.

In some embodiments, the size of the first range of movement along the main axis 4-M is different from the size of the second range of movement along the main axis 4-M. More specifically, the size of the first range of movement along the main axis 4-M is wider than the size of the second range of movement along the main axis 4-M. These embodiments are adapted to the fact that the stroke distance for optical zooming is usually larger than the stroke distance for optical focusing. In some other embodiments, the sizes of the first range of movement and the second range of movement may be determined based on different requirements.

Additionally, in some embodiments, the optical element driving mechanism 4-10 may further include a first sensing assembly 4-550, a second sensing assembly 4-630, and a third sensing assembly 4-680. The first sensing assembly 4-550 is connected to the second driving assembly 4-500, for sensing the positions of the second movable portion 4-200 relative to the fixed portion 4-900. The second sensing assembly 4-630 is connected to the third driving assembly 4-600, for sensing the translational positions of the third movable portion 4-300 relative to the fixed portion 4-900. The third sensing assembly 4-680 is connected to the third driving assembly 4-600, for sensing the rotational positions of the third movable portion 4-300 relative to the fixed portion 4-900. In some embodiments, the second sensing assembly 4-630 and the third sensing assembly 4-680 may be embedded in the second holder 4-310, and electrically connected to the circuit assembly 4-330, as shown in FIG. 30.

In summary, the optical element driving mechanism 4-10 of the present disclosure includes a plurality of optical elements: the first optical element (e.g. a lens), the second optical element (e.g. an optical sensing element), and the third optical element (e.g. a lens). By using a plurality of driving assemblies (e.g. the first driving assembly 4-400, the second driving assembly 4-500, and the third driving assembly 4-600), through piezoelectric and electromagnetic driving methods, the first optical element and the second optical element are driven to move. In addition to the motion of the lens itself relative to the fixed portion 4-900, the optical sensing element is also movable and rotatable in the direction that is perpendicular to the optical axis. This is helpful for more precise zooming and/or focusing, achieving better optical effects.

The fifth embodiment of the present disclosure is described below.

Figure 33:
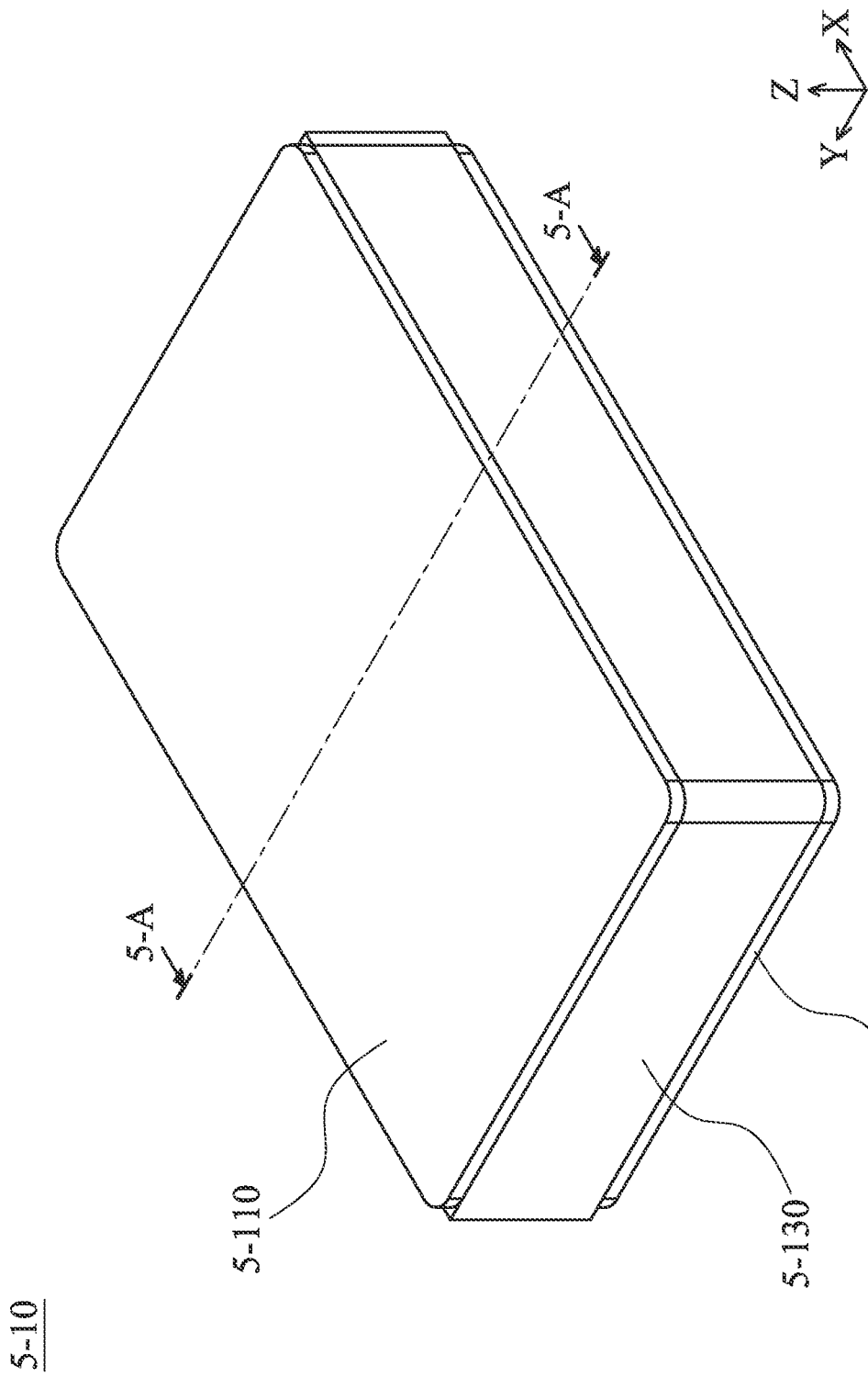
FIG. 33 shows a perspective view of a haptic feedback system in accordance with some embodiments of the present disclosure.

FIG. 33 shows a perspective view of a haptic feedback system 5-10 in accordance with some embodiments of the present disclosure. It should be noted first that in this embodiment, the haptic feedback system 5-10 may be, for example, disposed in an electronic device (not shown), and generate a feedback (e.g. haptic feedback) according to different functions. The present disclosure provides a haptic feedback system 5-10 that is capable of providing different vibration modes and achieving miniaturization. As shown in FIG. 33, the haptic feedback system 5-10 includes a casing 5-110, a base 5-120 and an outer frame 5-130. In some embodiments, the outer frame 5-130 is disposed between the casing 5-110 and the base 5-120 such that the casing 5-110, the base 5-120 and the outer frame 5-130 may form a substantially rectangular housing.

In some embodiments, the thickness of the outer frame 5-130 in the vertical direction (e.g. the Z axis) is less than the dimensions of the casing 5-110 and the base 5-120 in the horizontal direction (e.g. the direction parallel to the X-Y plane). In this way, the size of the haptic feedback system 5-10 in at least one direction may be significantly reduced, thereby achieving miniaturization of the electronic device and the haptic feedback system 5-10 disposed therein. In some embodiments, the casing 5-110, the base 5-120 and the outer frame 5-130 may be different components (for example, the casing 5-110, the base 5-120 and the outer frame 5-130 may be separated from each other), thereby reducing the difficulty of assembling the various components inside the haptic feedback system 5-10. In other embodiments, the outer frame 5-130 may be integrated with the casing 5-110 or the base 5-120 (e.g. the outer frame 5-130 may be integrally formed with the casing 5-110 or the base 5-120), thereby reducing the assembly steps of the haptic feedback system 5-10.

Figure 34:
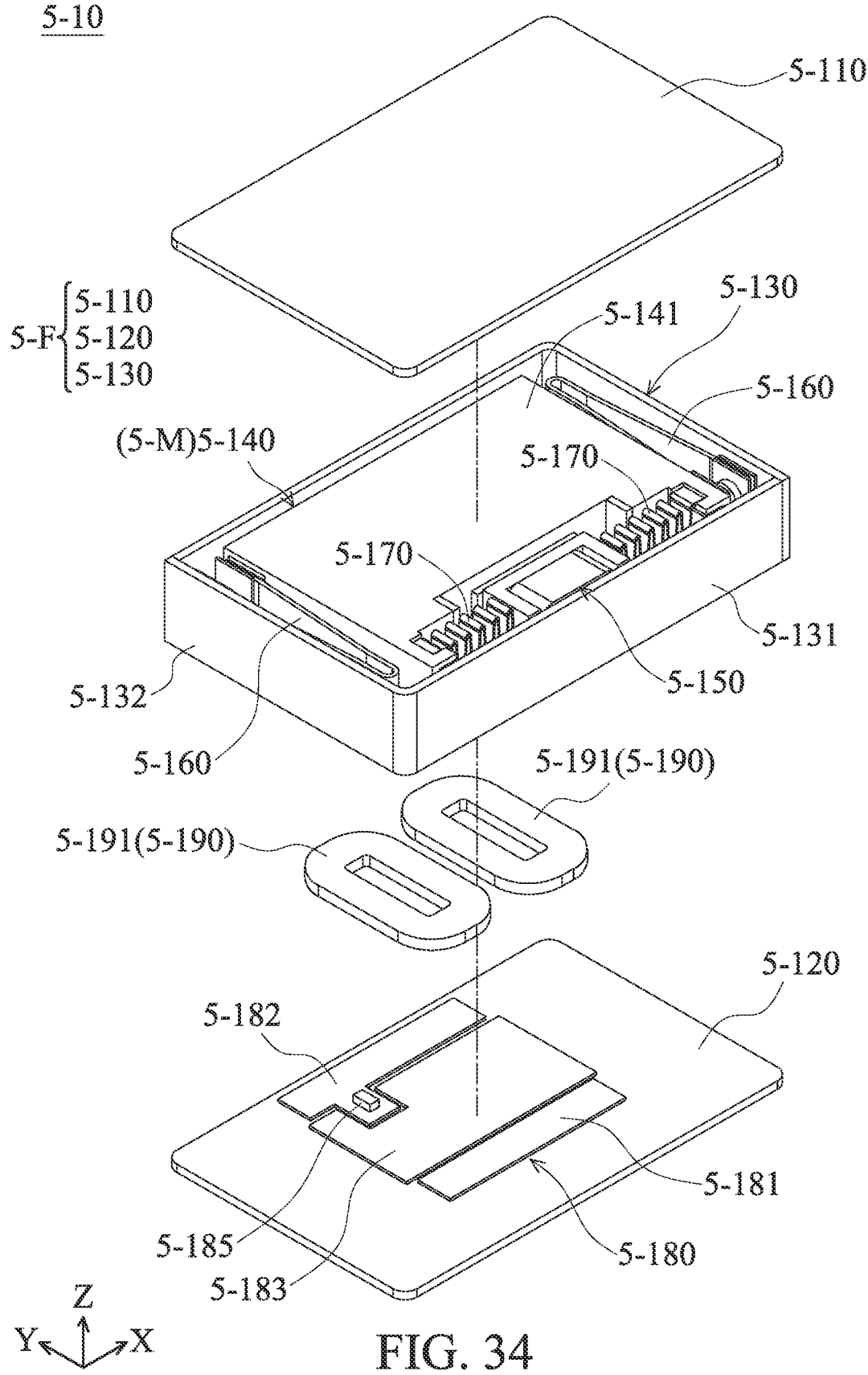
FIG. 34 shows an exploded view of the haptic feedback system in accordance with some embodiments of the present disclosure.

FIG. 34 shows an exploded view of the haptic feedback system 5-10 in accordance with some embodiments of the present disclosure. As shown in FIG. 34, the haptic feedback system 5-10 includes a fixed portion 5-F, a movable portion 5-M, a driving assembly 5-190 and a first connecting assembly 5-160. In some embodiments, the fixing portion F may include a casing 5-110, a base 5-120 and an outer frame 5-130, and may be fixedly connected to the electronic device where the haptic feedback system 5-10 is disposed. The movable portion 5-M is movable relative to the fixed portion 5-F. In some embodiments, the movable portion 5-M may include a mode adjustment assembly 5-140 and may be driven by the driving assembly 5-190 to move relative to the fixed portion 5-F, so as to generate a feedback (e.g. haptic feedback) to the electronic device. The movable portion 5-M may be movably connected to the fixed portion 5-F via the first connection assembly 5-160.

In some embodiments, the outer frame 5-130 may have a first sidewall 5-131 and a second sidewall 5-132 connected to each other. The first sidewall 5-131 and the second sidewall 5-132 may be substantially perpendicular to each other. In some embodiments, a rounded corner may be formed between the first sidewall 5-131 and the second sidewall 5-132, thereby reducing the probability of damage to the outer frame 5-130 due to collision with other components in the electronic device. In some embodiments, mode adjustment assembly 5-140 includes a frame 5-141, an adjustment element 5-150 and a second connection assembly 5-170. The frame 5-141 is connected to the first connection assembly 5-160. The adjustment element 5-150 may be movably connected to the frame 5-141 via the second connecting assembly 5-170, so that the adjustment element 5-150 is movable relative to the frame 5-141 and the fixed portion 5-F. As shown in FIG. In some embodiments, the mass of the adjustment element 5-150 is different from the mass of the frame 5-141. The detailed structure of the frame 5-141 and the operation of the mode adjustment assembly 5-140 will be further described below with reference to FIG. 35.

In some embodiments, the circuit board 5-180 is disposed on the base 5-120, and the circuit board 5-180 may include a first portion 5-181 and a second portion 5-182 that are spaced apart from each other. In other words, the first portion 5-181 and the second portion 5-182 are not in direct contact, and a gap is formed between the first portion 5-181 and the second portion 5-182. In some embodiments, the shapes of the first portion 5-181 and the second portion 5-182 on the base 5-120 are different, but the present disclosure is not limited thereto. The first portion 5-181 and the second portion 5-182 of the circuit board 5-180 may be physically and electrically connected via the driving assembly 5-190 (e.g. a coil 5-191). In this way, signals can be transmitted between the first portion 5-181 and the second portion 5-182, thereby reducing the manufacturing cost of the circuit board 5-180. The circuit board 5-180 may be used to receive or transmit signals between the driving assembly 5-190 (e.g. the coil 5-191) and external components, so that the mode adjustment assembly 5-140 can generate haptic feedback.

In some embodiments, a metallic sheet 5-183 may be disposed between the first portion 5-181 and the second portion 5-182 to support the drive assembly 5-190 (e.g. the coil 5-191) connecting the first portion 5-181 and the second portion 5-182. The metallic sheet 5-183 may be disposed corresponding to the gap between the first portion 5-181 and the second portion 5-182. For example, the metallic sheet 5-183 may be disposed along the contours of the first portion 5-181 and the second portion 5-182. For example, the spacing between the metallic sheet 5-183 and the first portion 5-181 (and/or the second portion 5-182) may be kept constant, but the present disclosure is not limited thereto. The metallic sheet 5-183 may not contact the first portion 5-181 and the second portion 5-182 and be electrically insulated from the first portion 5-181 and the second portion 5-182. In some embodiments, the metallic sheet 5-183 may not be electrically connected to any conductive element, and will not be used to transmit any signal. In this way, the probability of forming a short circuit between the metallic sheet 5-183 and other conductive elements can be reduced. In some embodiments, the metallic sheet 5-183 may be omitted, or replaced with other insulating materials, and these configurations are within the scope of the present disclosure.

The position sensor 5-185 may be disposed on the circuit board 5-180. In some embodiments, the position sensor 5-185 may be disposed on the second portion 5-182 and located inside the coil 5-191 (e.g. surrounded by the coil 5-191). For example, the position sensor 5-185 may be a Hall effect sensor, and may be located at a position where the second portion 5-182 protrudes toward the first portion 5-181. The position sensor 5-185 can detect the position of the mode adjustment assembly 5-140, thereby determining if the parameters related to the transmitted signal and vibration need to be adjusted. However, it should be understood that the above-mentioned configuration is only an example of the present disclosure, and those skilled in the art can derive other similar configurations (for example, setting the position sensor 5-185 on the first portion 5-181 or changing the shape or position of the first portion 5-181 and the second portion 5-182), and these configurations are all within the scope of the present disclosure.

Figure 35:
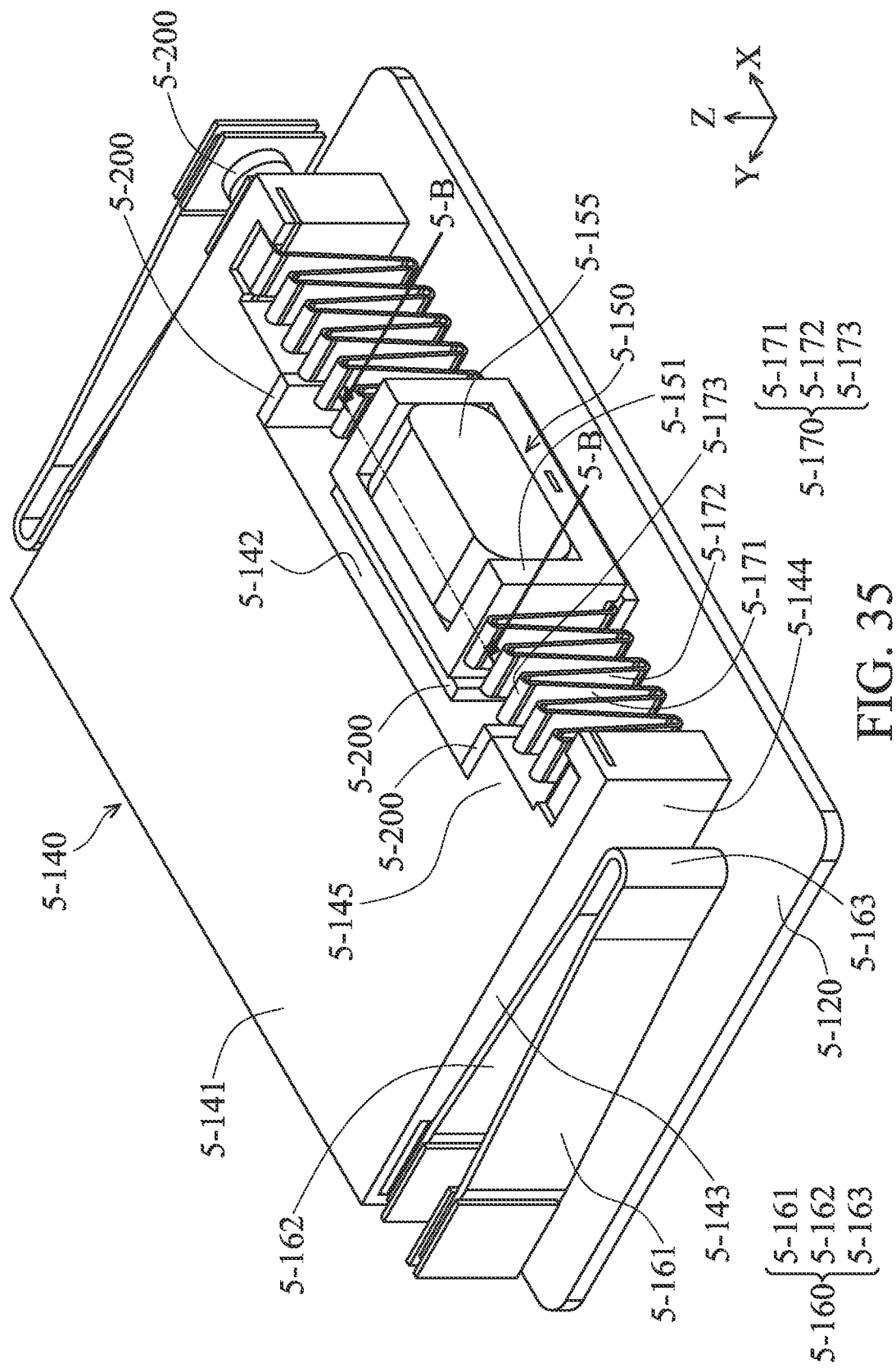
FIG. 35 shows a perspective view of the interior of the haptic feedback system in accordance with some embodiments of the present disclosure.

FIG. 35 shows a perspective view of the interior of the haptic feedback system 5-10 in accordance with some embodiments of the present disclosure. It should be noted that, in order to clearly illustrate the internal structure of the haptic feedback system 5-10, the casing 5-110 and the outer frame 5-130 will not be shown in this embodiment. As shown in FIG. 35, the frame 5-141 of the mode adjustment assembly 5-140 has a first side 5-142 and a second side 5-143 that is different from the first side surface 5-142. In some embodiments, both the first side 5-142 and the second side 5-143 are substantially perpendicular to the top surface of the frame 5-141. The second connecting assembly 5-170 may connect the outer frame 5-130 (see FIG. 34) and the second side 5-143 of the frame 5-141. Accordingly, the frame 5-141 is movable relative to the fixing portion 5-F (e.g. the outer frame 5-130).

The first side 5-142 may face the adjustment element 5-150. The frame 5-141 further has a plurality of protruding portions 5-144 protruding from the first side 5-142. The protruding portions 5-144 may extend to opposite sides of the adjustment element 5-150. In this way, the second connecting assembly 5-170 may connect the protruding portion 5-144 and the adjustment element 5-150, so that the adjustment element 5-150 is movable relative to the frame 5-141. In addition, the frame 5-141 also has a plurality of stopping portions 5-145 formed on the first side 5-142, for example, extending from the first side 5-142 toward the second connecting assembly 5-170. The stopping portions 5-145 can limit the range of motion of the adjustment element 5-150. In other words, the adjustment element 5-150 is merely movable within the range between the opposing stopping portions 5-145. A buffer member 5-200 may be disposed on the first side 5-142 and the stopping portions 5-145. As a result, the adjustment element 5-150 will contact the buffer member 5-200 without directly hitting the frame 5-141 (e.g. the first side 5-142 and the stopping portions 5-145). For example, the buffer members 5-200 may be made of a material (e.g. rubber or colloid) with a hardness that is less than the hardness of the frame 5-141, and when the adjustment element 5-150 contacts the buffer member 5-200, the impact force of the adjustment element 5-150 may be absorbed, and therefore reducing the probability of damage to the overall mode adjustment assembly 5-140, or reducing the noise generated by the operation of the adjustment element 5-150.

The adjustment element 5-150 may include a carrier 5-151 and a weighting member 5-155 disposed in the carrier 5-151. In some embodiments, the carrier 5-151 and the weighting member 5-155 may be made of different materials. For example, the weighting member 5-155 may be made of high density alloys such as tungsten(W)-containing alloys or any other suitable material, while the carrier 5-151 may be made of, for example, plastic or any other suitable material. With the arrangement of the weighting member 5-155, the adjustment element 5-150 may be arranged with sufficient mass in a limited space, so that the mode adjustment assembly 5-140 may operate in a desired vibration mode. The carrier 5-151 is made of a material that is easy to process, so that the desired appearance of the adjustment element 5-150 may be formed in cooperation with the weighting member 5-155.

For example, the first connecting assembly 5-160 may be a spring sheet or other elastic elements. In this embodiment, the first connection assembly 5-160 includes a first section 5-161, a second section 5-162 and a connecting portion 5-163. For example, the first section 5-161 and the second section 5-162 may be defined as a portion extending substantially along a straight line, and the connecting portion 5-163 may be defined as a portion connecting the first section 5-161 and the second section 5-162. In some embodiments, the first segment 5-161 may be connected to the outer frame 5-130, the second segment 5-162 may be connected to the frame 5-141 (e.g. connected to the second side 5-143), and the first segment 5-161 and the second segment 5-162 are connected via the connecting portion 5-163. In some embodiments, the extending directions of the first segment 5-161 and the second segment 5-162 are not parallel. By disposing the first connecting assembly 5-160 on opposite sides of the frame 5-141, the frame 5-141 is movable in an axial direction (e.g. in a direction substantially parallel to the X-axis). In some embodiments, the orientations of the connecting portions 5-163 of the first connecting assemblies 5-160 disposed on opposite sides of the frame 5-141 are different. More specifically, the connecting portion 5-163 of one of the first connecting assemblies 5-160 is disposed to face the protruding portions 5-144 of the frame 5-141, and the connecting portion 5-163 of the other first connecting assembly 5-160 is disposed to be away from the protruding portions 5-144 of the frame 5-141. However, the above configurations are only examples and are not intended to limit the scope of the present disclosure.

For example, the second connecting assembly 5-170 may be a spring sheet or other elastic elements. In this embodiment, the second connection assembly 5-170 includes a plurality of first sections 5-171, a plurality of second sections 5-172 and a plurality of connecting portions 5-173. For example, the first sections 5-171 and the second sections 5-172 may be defined as portions extending substantially along a straight line, and the connecting portions 5-173 may be defined as portions connecting the first sections 5-171 and the second sections 5-172. In some embodiments, the first sections 5-171 and the second sections 5-172 are alternately arranged, and each of the first sections 5-171 and each of the second sections 5-172 is connected via a corresponding connecting portion 5-173. In some embodiments, the connecting portion 5-163 and the connecting portion 5-173 are oriented differently. More specifically, the connecting portion 5-173 may face the casing 5-110 or the base 5-120 (see FIG. 34). In some embodiments, the orientation of the connecting portion 5-163 and the orientation of the connecting portion 5-173 may be substantially perpendicular, but the present disclosure is not limited thereto. By arranging the second connecting assemblies 5-170 on opposite sides of the adjustment element 5-150, the adjustment element 5-150 is movable in an axial direction (e.g. in a direction substantially parallel to the X-axis). It should be understood that the above configurations are only examples and are not intended to limit the scope of the present disclosure.

Figure 36:
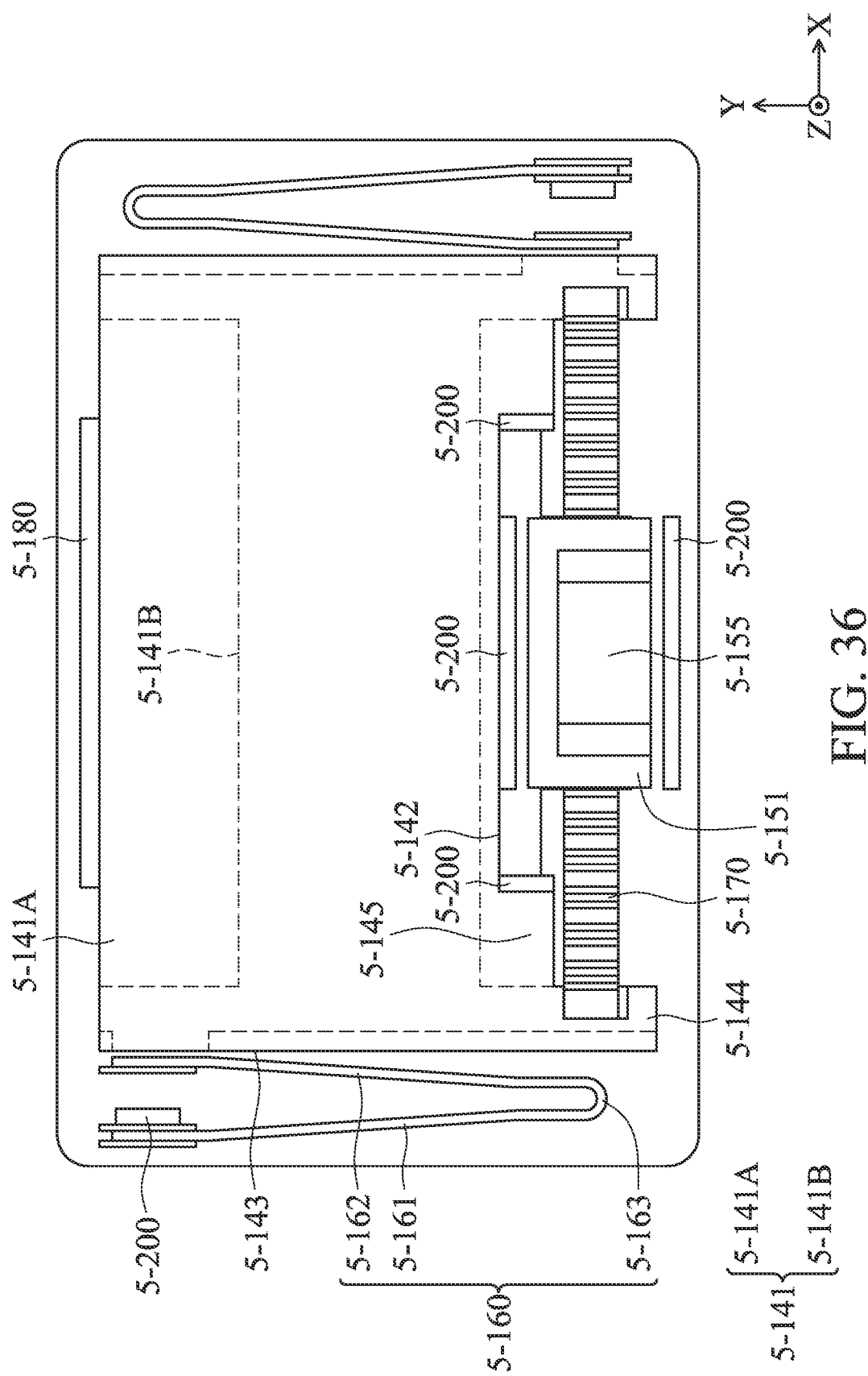
FIG. 36 shows a top view of the interior of the haptic feedback system in accordance with some embodiments of the present disclosure.

FIG. 36 shows a top view of the interior of the haptic feedback system 5-10 in accordance with some embodiments of the present disclosure. As shown in FIG. 36, the first frame 5-141 may include a body 5-141A and a metallic member 5-141B. In some embodiments, the metallic member 5-141B may be formed in the body 5-141A by insert molding. In some embodiments, the hardness of the metallic member 5-141B may be greater than the hardness of the body 5-141A, thereby improving the overall structural strength of the frame 5-141. In this embodiment, the metallic member 5-141B may be exposed on the protruding portion 5-144 of the frame 5-141, and the exposed portion of the metallic member 5-141B may be connected to the second connecting assembly 5-170 in any suitable manner (e.g. by welding, etc.).

In addition, as shown in FIG. 36, the buffer member 5-200 may be disposed between the first section 5-161 and the second section 5-162 of the first connection assembly 5-160 to provide the buffer between the first section 5-161 and the second section 5-162, reducing the probability of damage to the first connecting assembly 5-160. In this embodiment, the buffer member 5-200 may be disposed on the first section 5-161, but the present disclosure is not limited thereto. In other embodiments, the buffer member 5-200 may also be disposed on the second section 5-162 (between the first section 5-161 and the second section 5-162), or on the connecting portion 5-163 (located between the connecting portion 5-163 and the frame 5-141). These embodiments are intended to be included within the scope of the present disclosure. With the configuration of the buffer element 5-200, the service life of the first connection assembly 5-160 and/or the mode adjustment assembly 5-140 may be prolonged, or the noise generated by the mode adjustment assembly 5-140 during operation may be reduced.

The circuit board 5-180 may generate a signal or receive a signal from the outside, and transmit the signal to the driving assembly 5-190 (the coil 5-191), and therefore the coil 5-191 and the magnetic element of the driving assembly 5-190 can generate a driving force to drive the movable portion 5-M to move relative to the fixed portion 5-F. Since the driving force has a specific frequency, the mode adjustment assembly 5-140 of the movable portion 5-M is caused to resonate, so that the mode adjustment assembly 5-140 vibrates, forming a vibration mode. In this way, the haptic feedback system 5-10 can achieve the function of generating haptic feedback. In some embodiments, the circuit board 5-180 may extend beyond the projection range of the frame 5-141 on the X-Y plane. For example, the circuit board 5-180 may be closer to the outer frame 5-130 (see FIG. 34) than the frame 5-141, but the present disclosure is not limited thereto.

For example, the coil 5-191 may receive a first signal, wherein the first signal has a first frequency, and causes the movable portion 5-M to have a first vibration mode relative to the fixed portion 5-F. In this embodiment, the first frequency is the same as the frequency of the first vibration mode. More specifically, when the movable portion 5-M moves in the first vibration mode, the movable portion 5-M (e.g. the frame 5-141) is movable (e.g. in a linear motion) relative to the fixed portion 5-F in a first dimension (e.g. along a direction substantially parallel to the X-axis). Meanwhile, the adjustment element 5-150 is movable relative to the frame 5-141 in a first movement manner, and the frequency of the first movement manner is substantially the same as the frequency of the first vibration mode. When the adjustment element 5-150 moves relative to the frame 5-141 in the first movement manner, the adjustment element 5-150 is movable (for example, linear motion) in a second dimension (for example, in a direction substantially parallel to the X-axis). When the movable portion 5-M moves in the first vibration mode, a first phase difference exists between the movement of the frame 5-141 relative to the fixed portion 5-F and the movement of the adjustment element 5-150 relative to the frame 5-141. For example, the frame 5-141 and the adjustment element 5-150 may reach the extreme position in the direction of the positive X-axis (that is, the farthest position relative to the center of the haptic feedback system 5-10 that is reachable in this direction). The phase difference between the movement of the frame 5-141 and the movement of the adjustment element 5-150 may be approximately 0 degrees.

The movable portion 5-M may have a second vibration mode relative to the fixed portion 5-F by setting the mode adjustment assembly 5-140, wherein the frequency of the first vibration mode and the frequency of the second vibration mode are different. For example, the coil 5-191 may receive a second signal, wherein the second signal has a second frequency, and causes the movable portion 5-M to have a second vibration mode relative to the fixed portion 5-F. In this embodiment, the second frequency is the same as the frequency of the second vibration mode. When the movable portion 5-M moves in the second vibration mode, the movable portion 5-M moves relative to the fixed portion 5-F in the first dimension (e.g. along a direction substantially parallel to the X-axis). At this time, the adjustment element 5-150 moves relative to the frame 5-141 in a second movement manner, and the frequency of the second movement manner is the same as the frequency of the second vibration mode. When the adjustment element 5-150 moves relative to the frame 5-141 in the second movement manner, the adjustment element 5-150 moves in the second dimension (e.g. in a direction substantially parallel to the X-axis). When the movable portion 5-M moves relative to the frame 5-141 in the second vibration mode, a second phase difference exists between the movement of the frame 5-141 relative to the fixed portion 5-F and the movement of the adjustment element 5-150 relative to the frame 5-141, and the first phase difference and the second phase difference are different. For example, when the frame 5-141 reaches the extreme position in the direction of the positive X-axis, the adjustment element 5-150 may reach the extreme position in the direction of the negative X-axis, and the phase difference between the movement of the frame 5-141 and the movement of the adjustment element 5-150 may be about 90 degrees. In some embodiments, the difference between the first phase difference and the second phase difference is greater than 45 degrees, but the present disclosure is not limited thereto.

As set forth above, since the movement of the frame 5-141 and the adjustment element 5-150 may have different phase differences, the movable portion 5-M of the haptic feedback system 5-10 can generate different vibration modes, thereby achieving the effect of generating different types of haptic feedback. It should be understood that, although the above embodiments illustrate two vibration modes, those skilled in the art should be able to derive other or more vibration modes according to the content of the present disclosure. The vibration modes that are achievable by the disclosed structures are all within the scope of the present disclosure.

Figure 37:
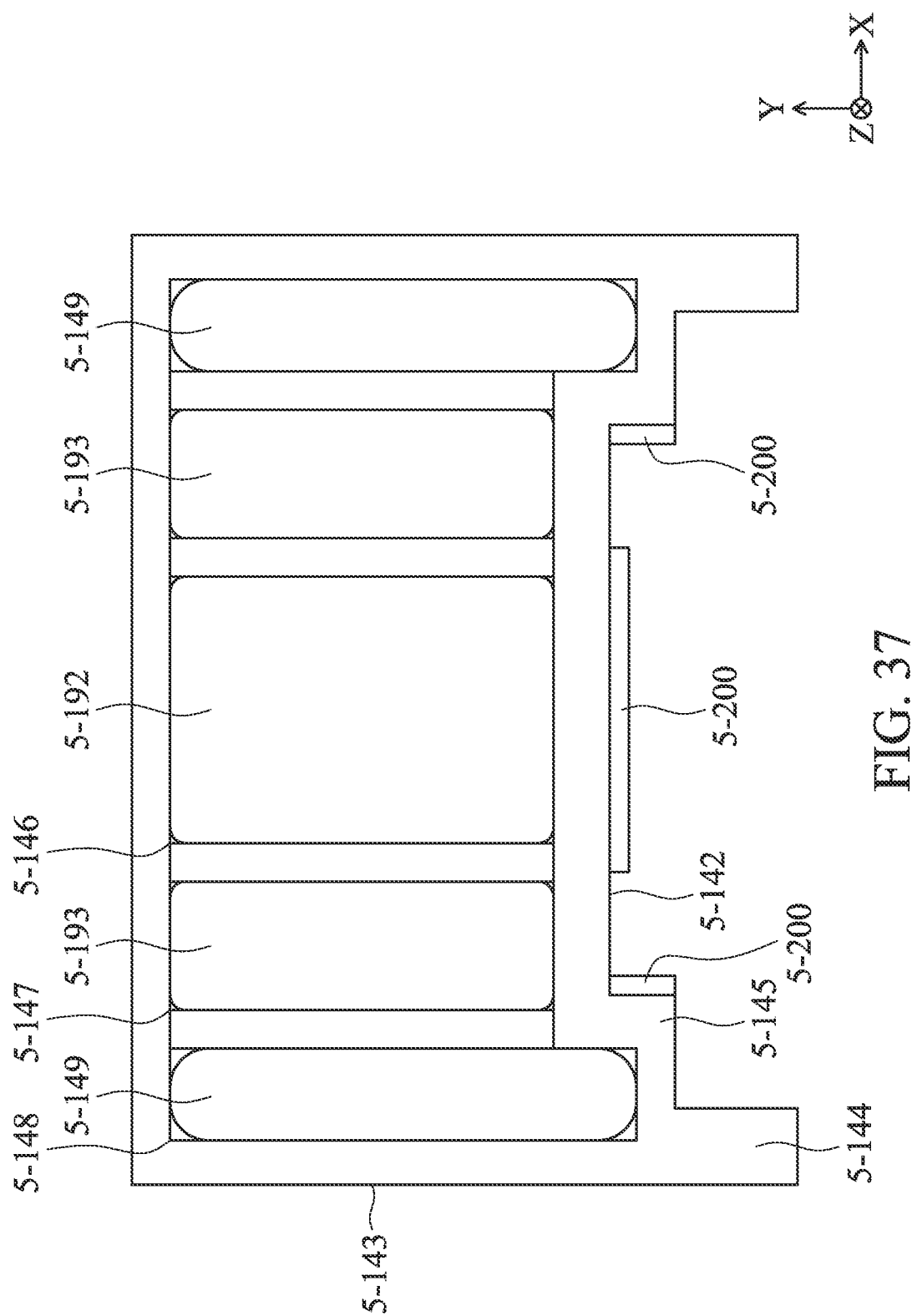
FIG. 37 shows a bottom view of a frame of a mode adjustment assembly in accordance with some embodiments of the present disclosure.

FIG. 37 shows a bottom view of the frame 5-141 of the mode adjustment assembly 5-140 in accordance with some embodiments of the present disclosure. As shown in FIG. 37, the frame 5-141 has a plurality of grooves 5-146, 5-147 and 5-148 for containing different components. In some embodiments, the driving assembly 5-190 may include a first magnetic element 5-192 and a pair of second magnetic elements 5-193, which may generate a driving force with the coil 5-191 to drive the mode adjustment assembly 5-140. In some embodiments, the magnetic pole directions of the first magnetic element 5-192 and the second magnetic elements 5-193 may be different. For example, the magnetic pole direction of the first magnetic element 5-192 may be directed toward the negative Y-axis direction, and the magnetic pole direction of the second magnetic elements 5-193 may be directed toward the positive Y-axis direction, but the present disclosure is not limited thereto. For the brevity of the description, other magnetic pole configurations of the first magnetic element 5-192 and the second magnetic elements 5-193 will not be listed separately, but all possible magnetic pole configurations are included within the scope of the present disclosure.

In this embodiment, the first magnetic element 5-192 is contained in the groove 5-146, and the second magnetic elements 5-193 are each accommodated in one of the grooves 5-147. It should be noted that, in some embodiments, the first magnetic element 5-192, the second magnetic elements 5-193, and the corresponding grooves 5-146 and 5-147 are not completely fitted, that is, there may be gaps between the first magnetic element 5-192 and the groove 5-146 (e.g. in the corners of the groove 5-146), and there may be gaps between the second magnetic elements 5-193 and the grooves 5-147 (e.g. in the corners of the grooves 5-147). In this way, the assembly difficulty of the first magnetic element 5-192 and the second magnetic elements 5-193 may be reduced.

The mode adjustment assembly 5-140 further includes weighting members 5-149. In some embodiments, frame 5-141 (e.g. body 5-141A) and the weighting members 5-149 may be made of different materials. For example, the weighting members 5-149 may be made of high density alloys such as tungsten (W)-containing alloys or any other suitable material, while the body 5-141A of the frame 5-141 may be made of, for example, plastic or any other suitable material. With the arrangement of the weighting members 5-149, the mode adjustment assembly 5-140 may be arranged with sufficient mass in a limited space, so that the mode adjustment assembly 5-140 can operate in a required vibration mode. The body 5-141A is made of an easy-to-process material, so that the desired shape of the mode adjustment assembly 5-140 can be obtained by combining the body 5-141A with the weighting members 5-149. In this embodiment, the weighting members 5-149 are each contained in one of the grooves 5-148. Similarly, the weighting members 5-149 and the corresponding grooves 5-148 are not fully fitted, i.e. there may be gaps between the weighting members 5-149 and the grooves 5-148 (e.g. in the corners of the grooves 5-148). In this way, the assembly difficulty of the weighting members 5-149 can be reduced.

Figure 38:
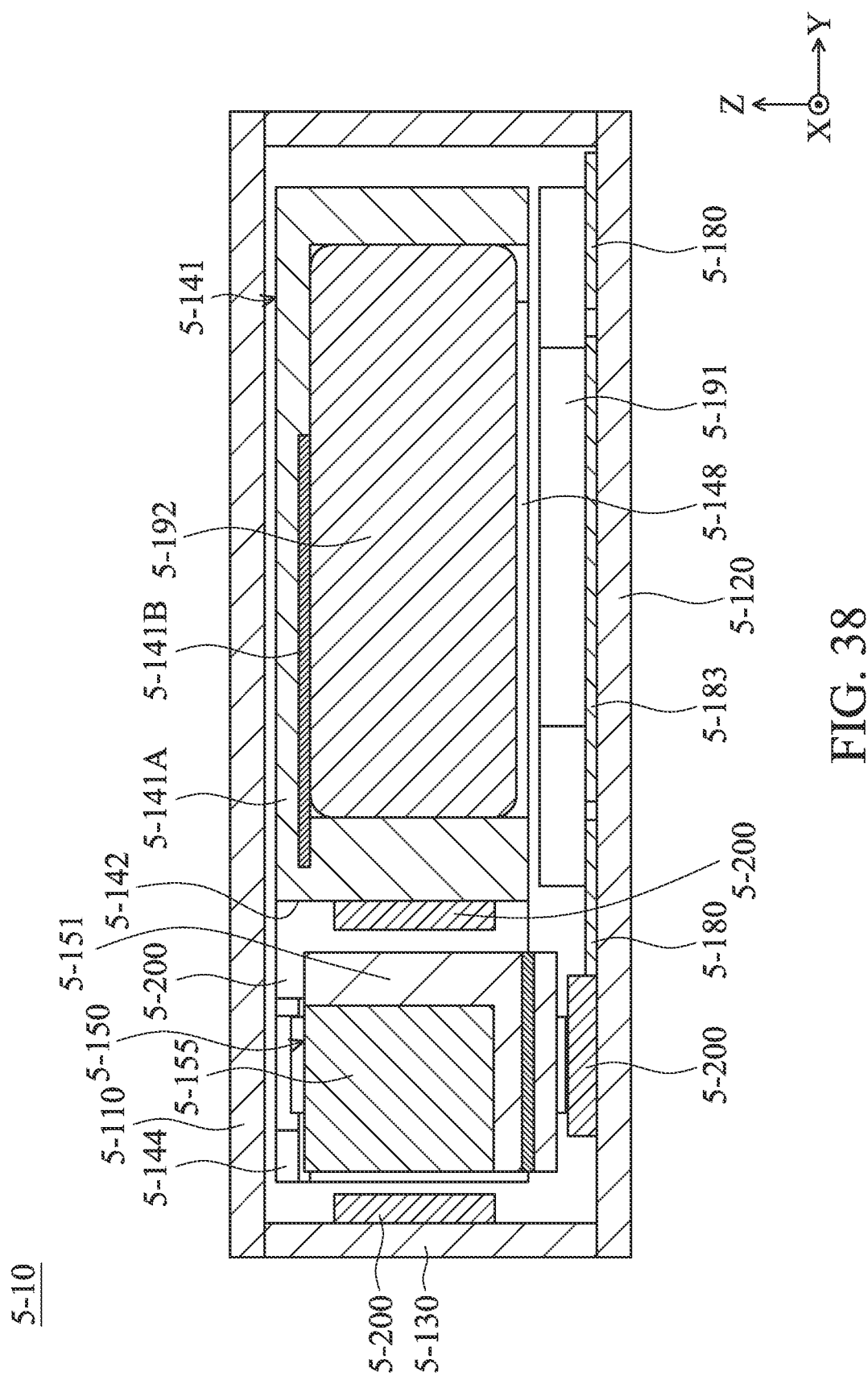
FIG. 38 shows a cross-sectional view of the haptic feedback system along line 5-A-5-A shown in FIG. 33 in accordance with some embodiments of the present disclosure.

FIG. 38 shows a cross-sectional view of the haptic feedback system 5-10 along line 5-A-5-A shown in FIG. 33 in accordance with some embodiments of the present disclosure. As shown in FIG. 38, multiple buffer members 5-200 are provided around the adjustment element 5-150. For example, the buffer members 5-200 may be disposed on the surfaces of the outer frame 5-130, the base 5-120 and the frame 5-141, wherein these surfaces face the adjustment element 5-150. In some embodiments, the buffer members 5-200 may also be disposed on the surface of the casing 5-110 facing the adjustment element 5-150, so as to further reduce the probability of the adjustment element 5-150 colliding with surrounding elements. In some embodiments, the thickness of the buffer member 5-200 disposed on the base 5-120 may be greater than the thickness of the circuit board 5-180, and the thicknesses of the buffer member 5-200 and the circuit board 5-180 may be measured along a direction that is substantially parallel to the Z-axis, for example. In this way, the probability of the circuit board 5-180 being struck by the adjustment element 5-150 can be reduced.

In some embodiments, the metallic member 5-141B of the frame 5-141 may partially overlap the first magnetic element 5-192 in a direction that is substantially parallel to the Z-axis. For example, the shortest distance between the metallic member 5-141B and the first side 5-142 may be smaller than the shortest distance between the first magnetic element 5-192 and the first side 5-142. These shortest distances may be measured along a direction that is parallel to the Y-axis, for example, but the present disclosure is not limited thereto. In some embodiments, the metallic member 5-141B may completely overlap the first magnetic element 5-192 in a direction that is substantially parallel to the Z-axis. In addition, as shown in FIG. 38, the weighting member 5-149 may be disposed lower than the first magnetic element 5-192, and therefore the weighting member 5-149 may be closer to the coil 5-191 than the first magnetic element 5-192.

Figure 39:
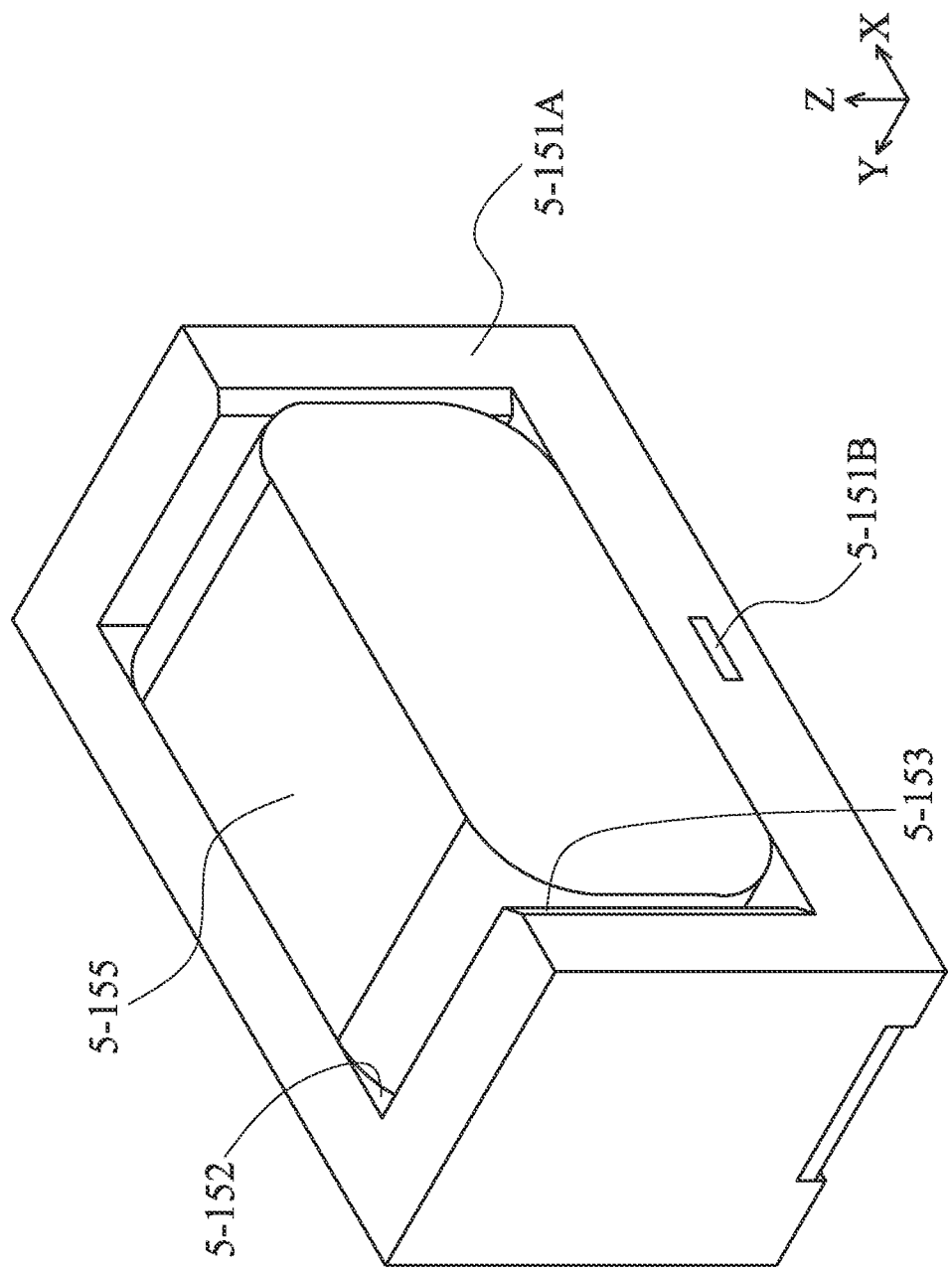
FIG. 39 shows a perspective view of an adjustment element in accordance with some embodiments of the present disclosure.

FIG. 39 shows a perspective view of the adjustment element 5-150 in accordance with some embodiments of the present disclosure. As shown in FIG. 39, the carrier 5-151 of the adjustment element 5-150 includes a body 5-151A and a metallic member 5-151B embedded in the body 5-151A. The metallic member 5-151B may be formed in the body 5-151A by insert molding. In some embodiments, the hardness of the metallic member 5-151B may be greater than the hardness of the body 5-151A, thereby improving the overall structural strength of the carrier 5-151. The carrier 5-151 has a recess 5-152 configured to contain the weighting member 5-155. Similarly, the weighting member 5-155 and the corresponding recess 5-152 are not fully fitted, that is, there may be gaps between the weighting member 5-155 and the recess 5-152 (e.g., in the corners of the recess 5-152). In some embodiments, the recess 5-152 may be disposed to face the outer frame 5-130, that is, the recess 5-152 cannot be seen when viewed from the first surface 5-142 of the frame 5-141 to the adjustment element 5-150. In some embodiments, a bevel structure 5-153 may be disposed on the outer edges of the recess 5-152, and the above configuration can reduce the difficulty of disposing the weighting member 5-155, but the present disclosure is not limited thereto. In other embodiments, the bevel structure 5-153 may be omitted, thereby reducing the difficulty of manufacturing the carrier 5-151.

Figure 40:
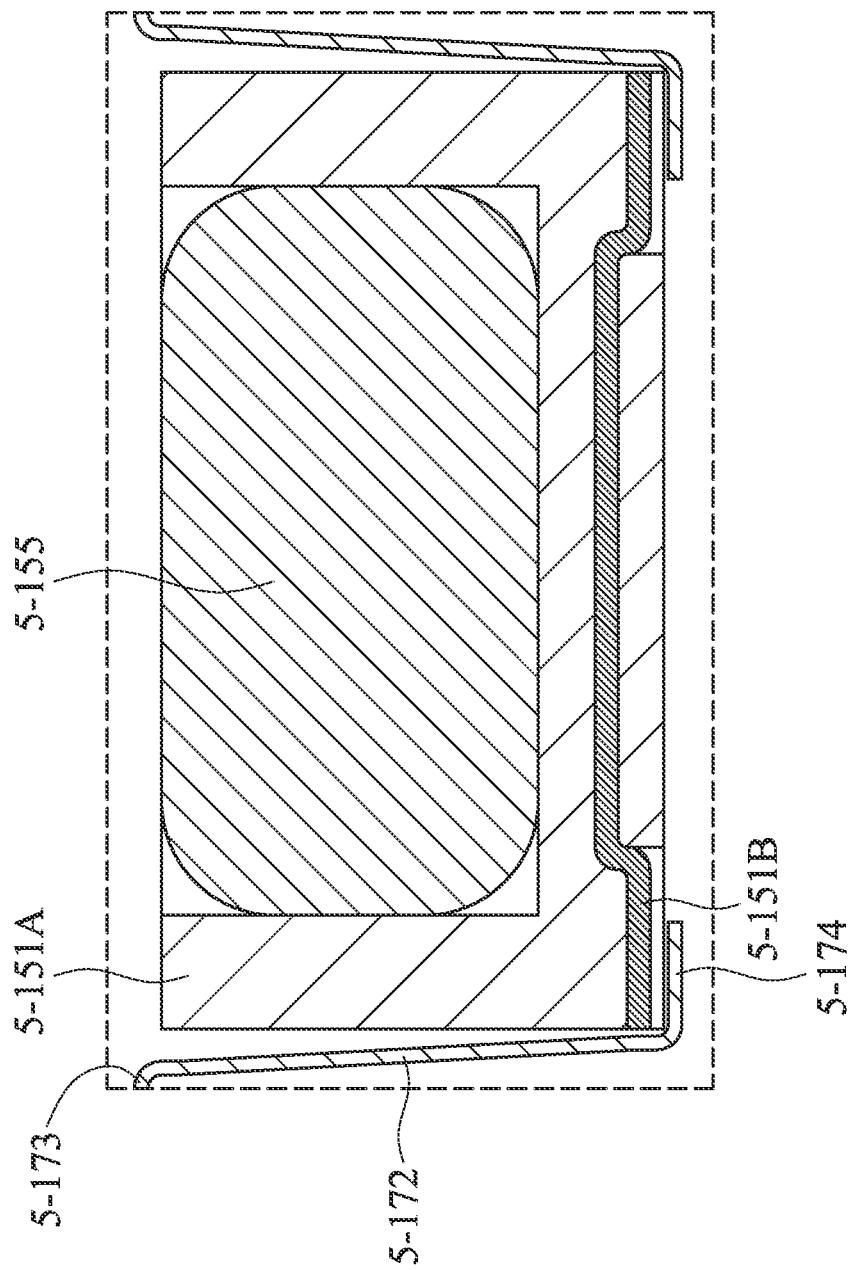
FIG. 40 shows a cross-sectional view of the adjustment element along line 5-B-5-B shown in FIG. 35 in accordance with some embodiments of the present disclosure.

FIG. 40 shows a cross-sectional view of the adjustment element 5-150 along line 5-B-5-B shown in FIG. 35 in accordance with some embodiments of the present disclosure. As shown in FIG. 40, the second connecting assembly 5-170 further includes an extension portion 5-174 connected to the second section 5-172. In this embodiment, the metallic member 5-151B may be partially exposed from the body 5-151A, and the exposed portion of the metallic member 5-151B may be connected to the extension portion 5-174 of the second connecting assembly 5-170 in any suitable manner (e.g. by welding, etc.). In addition, in this cross-sectional view, the metallic member 5-151B may have a non-linear profile within the carrier 5-151. More specifically, the metallic member 5-151B may be located higher (compared to the exposed portion of the metallic member 5-151B) at a position corresponding to the weighting member 5-155 and wrapped by the body 5-151A. In some embodiments, a portion of the metallic member 5-151B corresponding to the weighting member 5-155 and another portion of the metallic member 5-151B not corresponding to the weighting member 5-155 are located on different planes. In this way, the structural strength of the carrier 5-151 may be improved to bear the weight of the weighting member 5-155.

In summary, the present disclosure provides a haptic feedback system with different vibration modes. The movable portion and the fixed portion may have vibration modes with different frequencies by setting the mode adjustment assembly. Because the driving assembly receives signals of different frequencies, different phase differences may exist between the movements of the frame and the adjustment element of the mode adjustment assembly, thereby achieving different vibration modes. In addition, a plurality of buffer members are arranged around the movable range of the movable portion, thereby prolonging the service life of the haptic feedback system or reducing the noise generated when the haptic feedback system operates.

The sixth embodiment of the present disclosure is described below.

Figure 41:
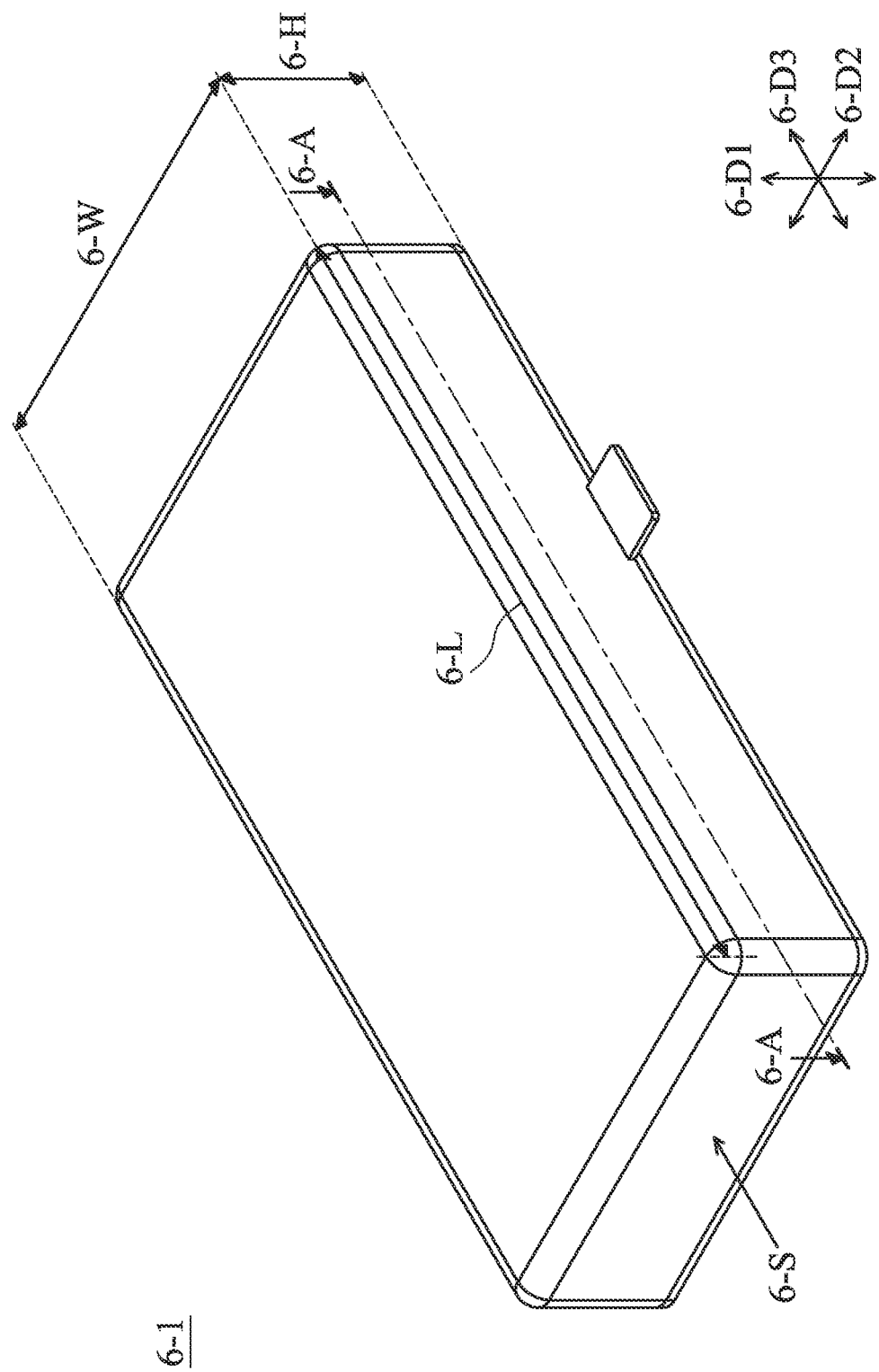
FIG. 41 is a perspective view of a haptic feedback system according to an embodiment of the present disclosure.
Figure 42:
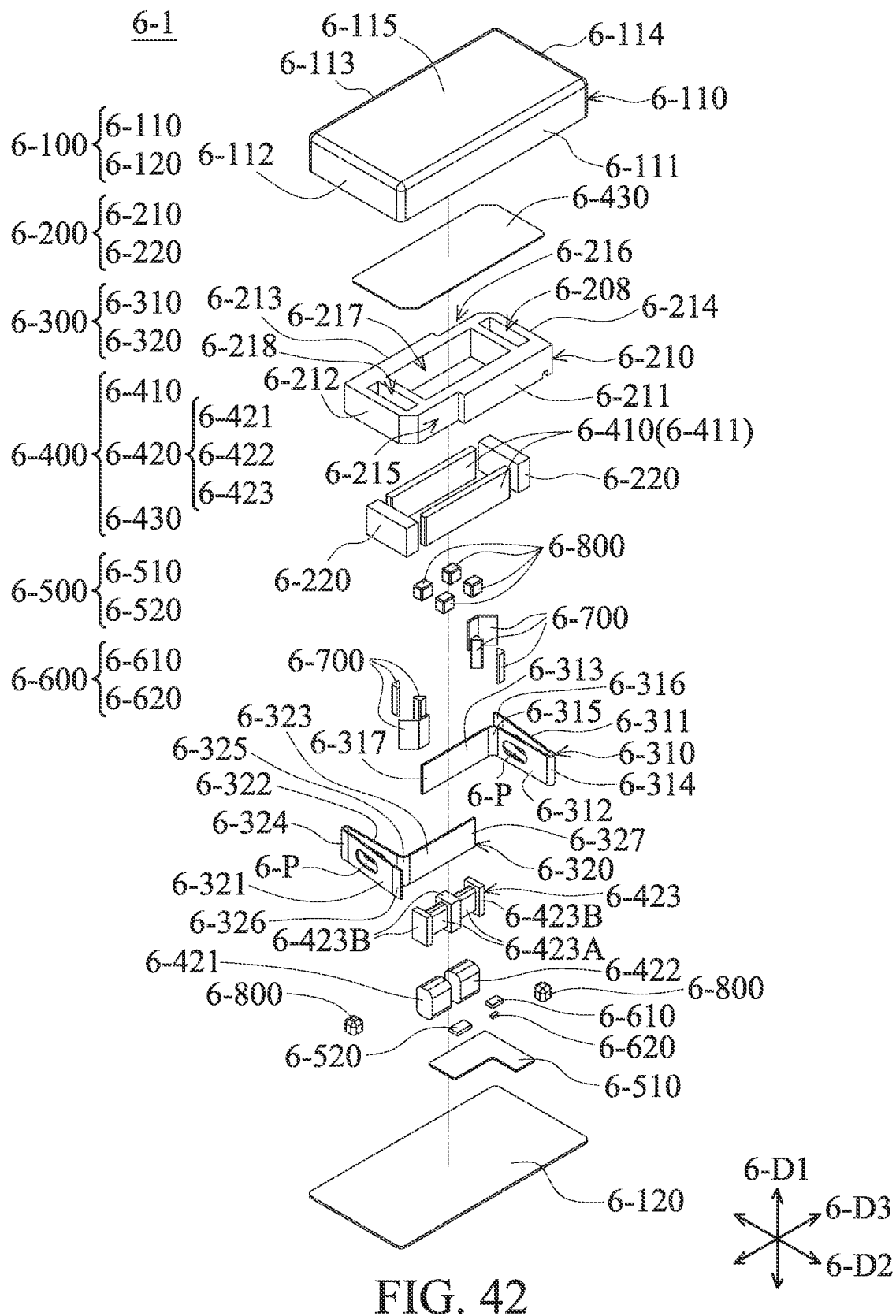
FIG. 42 is an exploded view of a haptic feedback system according to an embodiment of the present disclosure.
Figure 43:
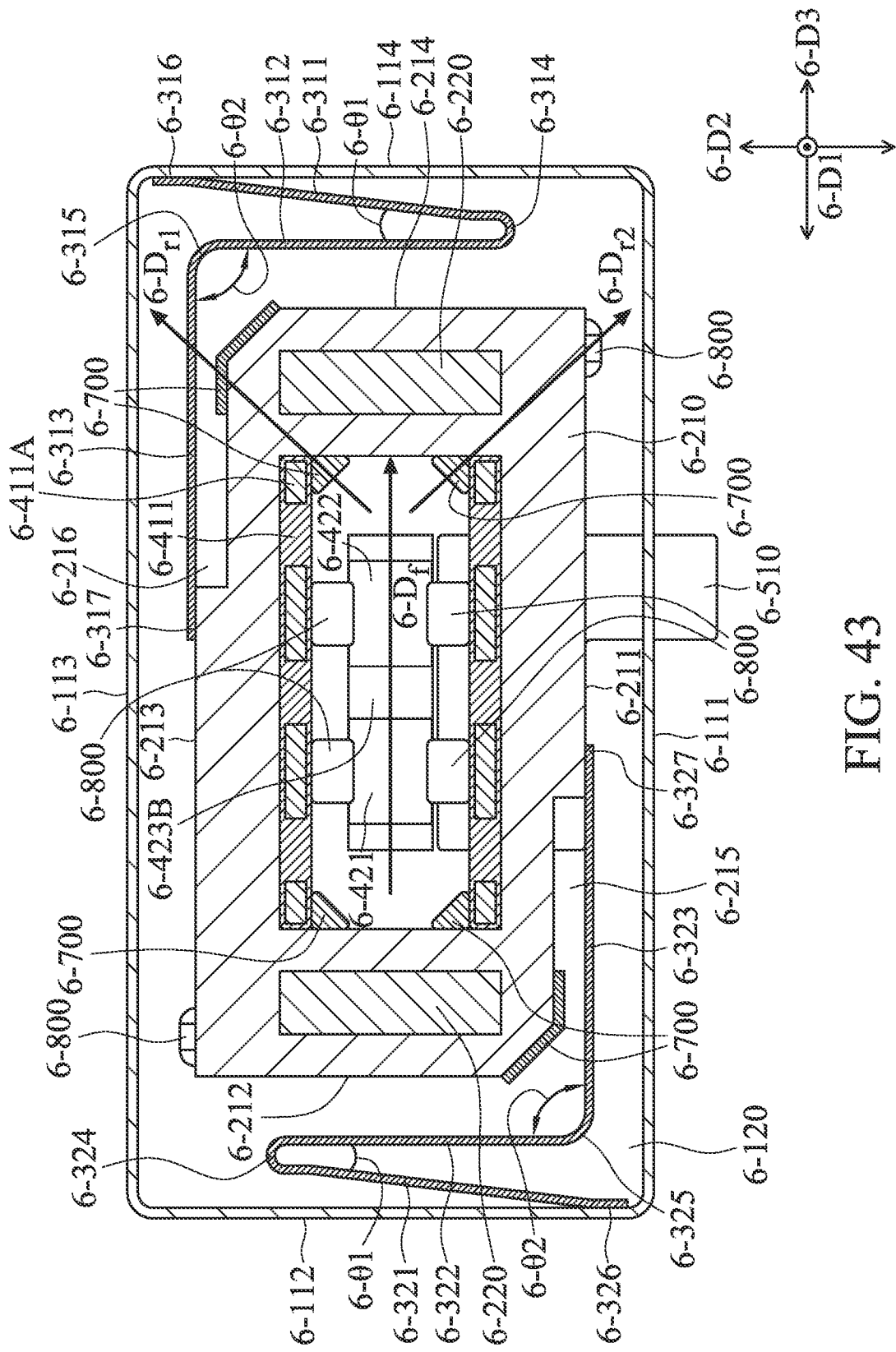
FIG. 43 is a cross-sectional view of the haptic feedback system cut along the line 6-A-6-A in FIG. 41.

First, refer to FIG. 41 to FIG. 43. FIG. 41 is a perspective view of a haptic feedback system 6-1 according to an embodiment of the present disclosure. FIG. 42 is an exploded view of a haptic feedback system 6-1 according to an embodiment of the present disclosure. FIG. 43 is a cross-sectional view of the haptic feedback system cut along the line 6-A-6-A in FIG. 41. The haptic feedback system 6-1 may be widely set in various devices, such as smart phones, wearable devices, gamepads, game consoles, tablets, etc., so that the devices may use the vibration of the haptic feedback system 6-1 as information feedback. The haptic feedback system 6-1 includes a fixed portion 6-100, a movable portion 6-200, a connecting assembly 6-300, a driving assembly 6-400, a circuit assembly 6-500, a position sensing assembly 6-600, a plurality of buffer elements 6-700, and a plurality of damping elements 6-800.

The fixed portion 6-100 is fixedly connected to any of the above-mentioned devices, and includes an upper cover 6-110 and a base 6-120. The upper cover 6-110 has a first surface 6-111, a second surface 6-112, a third surface 6-113, a fourth surface 6-114, and a top surface 6-115. The first surface 6-111 is opposite to the third surface 6-113, and the second surface 6-112 is opposite to the fourth surface 6-114. The top surface 6-115 is rectangular and has a length 6-L and a width 6-W. The first surface 6-111, the second surface 6-112, the third surface 6-113, and the fourth surface 6-114 have a height 6-H. The first surface 6-111, the second surface 6-112, the third surface 6-113, and the fourth surface 6-114 extend from the top surface 6-115 along a first direction 6-D1 toward the base 6-120. The height 6-H is smaller than the length 6-L and the width 6-W. Therefore, the haptic feedback system is formed to a flat structure, which is beneficial to the miniaturization of the device.

The movable portion 6-200 is movable relative to the fixed portion 6-100 along a first mode direction 6-Dr1 and a second mode direction 6-Dr2, and is movably connected to the fixed portion 6-100 via the connecting assembly 6-300. The movable portion 6-200 includes a main body 6-210 and a plurality of counterweight elements 6-220. The main body 6-210 is disposed inside the upper cover 6-110 and has a first side 6-211, a second side 6-212, a third side 6-213, a fourth side 6-214, a first recessed portion 6-215, a second recessed portion 6-216, a first accommodating portion 6-217, and a plurality of second accommodating portions 6-218. The first side 6-211, the second side 6-212, the third side 6-213, and the fourth side 6-214 are respectively opposite to the first surface 6-111, the second surface 6-112, the third surface 6-113, and the fourth surface 6-114.

The first recessed portion 6-215 is recessed from the first side 6-211 along a second direction 6-D2 away from the first surface 6-111, and the second recessed portion 6-216 is recessed from the third side 6-213 along the second direction 6-D2 away from the third surface 6-113. The first accommodating portion 6-217 and the second accommodating portions 6-218 pass through the movable portion 6-200 along the first direction 6-D1. When viewed along a third direction 6-D3, the first accommodating portion 6-217 and the second accommodating portions 6-218 at least partially overlap. The second direction 6-D2 is perpendicular to the first direction 6-D1, and the third direction 6-D3 is perpendicular to the first direction 6-D1 and the second direction 6-D2.

The counterweight elements 6-220 are respectively disposed in the second accommodating portions 6-218. The counterweight elements 6-220 and the main body 6-210 are made of different materials. For example, the weight element 6-220 may be made of high density metal, such as an alloy containing tungsten (W) or any other suitable material, while the body 6-210 may be made of, for example, plastic or any other suitable material. With the arrangement of the counterweight element 6-220, sufficient mass may be configured in a limited space, so that the movable portion 6-200 may operate in a required mode of vibration, thereby enhancing the vibration feedback felt by the user.

The connecting assembly 6-300 includes a first elastic element 6-310 and a second elastic element 6-320. The first elastic element 6-310 has a first segment 6-311, a second segment 6-312, a third segment 6-313, a first bending portion 6-314, a second bending portion 6-315, a first connecting portion 6-316, and a second connecting portion 6-317. The first segment 6-311 is connected to the second segment 6-312 via the first bending portion 6-314, and the second segment 6-312 is connected to the third segment 6-313 via the second bending portion 6-315. The first connecting portion 6-316 connects the first segment 6-311 and the fixed portion 6-100, and the second connecting portion 6-317 connects the third segment 6-313 and the movable portion 6-200.

The first segment 6-311, the second segment 6-312, and the third segment 6-313 are not parallel to each other. The first bending portion 6-314 has a first bending angle 6-θ1, and the second bending portion 6-315 has a second bending angle 6-θ2. The first segment 6-311 has a first length, the second segment 6-312 has a second length, and the third segment 6-313 has a third length. In some embodiments, the first bending angle 6-θ1 is smaller than the second bending angle 6-θ2, and the first length is longer than the second length, and the third length is longer than the second length, but not limited this, which may be changed as required.

The second elastic element 6-320 has the same structure as the first elastic element 6-310, and has a first segment 6-321, a second segment 6-322, a third segment 6-323, a first bending portion 6-324, a second bending portion 6-325, a first connecting portion 6-326, and a second connecting portion 6-327. When viewed along the first direction 6-D1, the first elastic element 6-310 and the second elastic element 6-320 are symmetrically disposed.

In more detail, the first connecting portion 6-316 of the first elastic element 6-310 is connected to the fourth surface 6-114 of the upper cover 6-110, and the second connecting portion 6-317 of the first elastic element 6-310 is connected to the third surface 6-113 of the upper cover 6-110. The first connecting portion 6-326 of the second elastic element 6-320 is connected to the second surface 6-112 of the upper cover 6-110, and the second connecting portion 6-327 of the second elastic element 6-320 is connected to the first surface 6-111 of the upper cover 6-110. The first segment 6-311 and the second segment 6-312 of the first elastic element 6-310 are disposed between the fourth surface 6-114 of the upper cover 6-110 and the fourth side 6-214 of the movable portion 6-200. The third segment 6-313 of the first elastic element 6-310 is disposed between the third surface 6-113 of the upper cover 6-110 and the second recessed portion 6-216 of the movable portion 6-200. The first segment 6-321 and the second segment 6-322 of the second elastic element 6-320 are disposed between the second surface 6-112 of the upper cover 6-110 and the second side 6-212 of the movable portion 6-200. The third segment 6-323 of the second elastic element 6-320 is disposed between the first surface 6-111 of the upper cover 6-110 and the first recessed portion 6-215 of the movable portion 6-200.

In some embodiments, at least one of the first segments 6-311, 6-321 and the second segments 6-312, 6-322 of the first elastic element 6-310 and the second elastic element 6-320 is provided with a hollow pattern 6-P. In some embodiments, the first segments 6-311, 6-321 and the second segments 6-312, 6-322 are all provided with hollow patterns 6-P, so as to adjust the resonance frequency and vibration response of the first elastic element 6-310 and the second elastic element 6-320.

Figure 44:
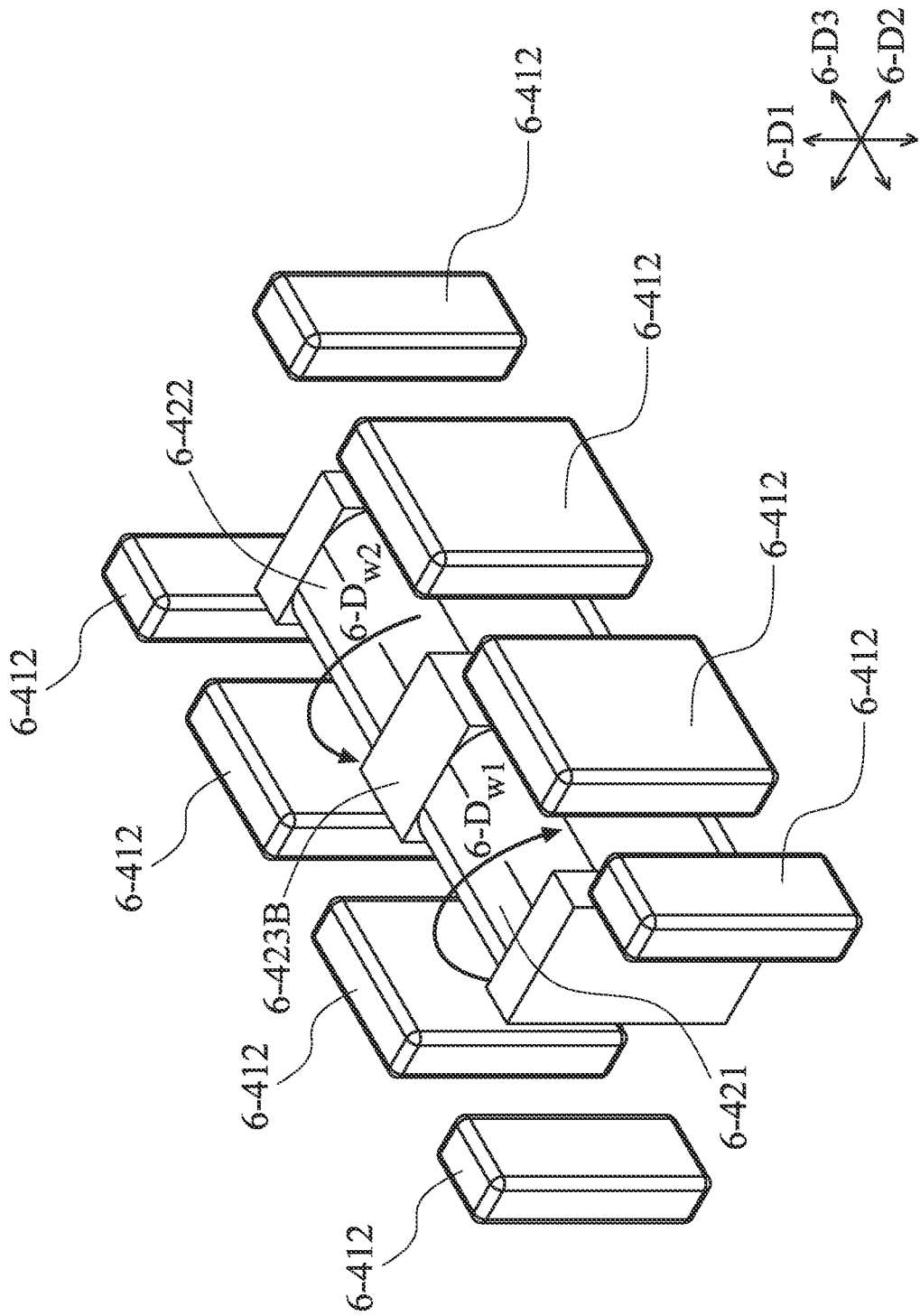
FIG. 44 is a schematic diagram of partial elements of a haptic feedback system according to an embodiment of the present disclosure.

Next, refer to FIG. 41 to FIG. 44. FIG. 44 is a schematic diagram of partial elements of a haptic feedback system 6-1 according to an embodiment of the present disclosure. The driving assembly 6-400 drives the movable portion 6-200 to move relative to the fixed portion 6-100 by a driving force, wherein a driving direction 6-Df of the driving force is different from the first mode direction 6-Dr1 and the second mode direction 6-Dr2, which will be described in detail later. The driving assembly 6-400 includes a driving magnet group 6-410, a driving coil group 6-420, and a magnetic permeable plate 6-430. The driving magnet group 6-410 is disposed on the first accommodating portion 6-217 of the movable portion 6-200, and the driving coil group 6-420 is disposed on the base 6-120 of the fixed portion 6-100 and partially accommodated in the first accommodating portion 6-217. When viewed along the first direction 6-D1, the driving magnet group 6-410 and the driving coil group 6-420 do not overlap.

The driving magnet group 6-410 includes at least two magnetic elements 6-411, which are symmetrically disposed on two inner walls of the first accommodating portion 6-217. Each of the two magnetic elements 6-411 includes at least three magnetic units 6-411A, as shown in FIG. 44. FIG. 44 is a schematic diagram showing the configuration of the magnetic units 6-411A disposed in the magnetic element 6-411 and the driving coil set 6-420. The magnetic units 6-411A are arranged along the third direction 6-D3. The magnetic pole directions of any two adjacent magnetic units 6-411A are different.

The driving coil set 6-420 includes a first coil 6-421, a second coil 6-422, and a magnetic permeable element 6-423. The first coil 6-421 and the second coil 6-422 are wound around the magnetic permeable element 6-423. The magnetic permeable element 6-423 has a shaft portion 6-423A and a partition portion 6-423B. The shaft portion 6-423A extends along the third direction 6-D3, and the partition portion 6-423B separates the first coil 6-421 from the second coil 6-422. A first winding direction 6-Dw1 of the first coil 6-421 is different from a second winding direction 6-Dw2 of the second coil 6-422. For example, in some embodiments, one of the first coil 6-421 and the second coil 6-422 winds around the shaft portion 6-423A in a clockwise direction, and the other one of the first coil 6-421 and the second coil 6-422 winds around the shaft portion 6-423A in a counterclockwise direction. With the configuration of the magnetic unit 6-411A, the first coil 6-421 and the second coil 6-422, the magnetic field along the third direction 6-D3 may be stronger, thereby making the driving force along the third direction 6-D3 larger. Therefore, a vibration amplitude may be increased.

The magnetic permeable plate 6-430 has a rectangular shape and is disposed between the movable portion 6-200 and the top surface 6-115 of the upper cover 6-110 for magnetic permeability. In addition, the magnetic permeable plate 6-430 may be used as a bearing surface of the movable portion 6-200 relative to the upper cover 6-110. The magnetic field may be increased with the magnetic permeable plate 6-430, so that the driving force may be increased, and the vibration amplitude may be increased. Moreover, it may also make it easier to assemble the driving magnet group 6-410 and the counterweight elements 6-220. When viewed along the first direction 6-D1, the magnetic permeable plate 6-430 at least partially overlaps with the driving magnet group 6-410.

The circuit assembly 6-500 and the position sensing assembly 6-600 are used to control the movable portion 6-200 in closed-loop. The circuit assembly 6-500 includes a circuit board 6-510 and a plurality of IC elements 6-520 (for simplicity, only one IC element 6-520 is shown in FIG. 42) disposed on the circuit board 6-510. The circuit board 6-510 is disposed on the base 6-120 of the fixed portion 6-100. The position sensing assembly 6-600 is connected to the circuit board 6-510 and senses the movement of the movable portion 6-200 relative to the fixed portion 6-100, and includes a reference element 6-610 and a position sensing element 6-620. In some embodiments, the reference element 6-610 is a magnetic element disposed on the movable portion 6-200, and the position sensing element 6-620 may be, for example, a Hall effect sensor, a magnetic resistance sensor, or a Fluxgate, etc., and is disposed on the circuit board 6-510 to sense the magnetic field of the reference element 6-610 disposed on the movable portion 6-200, so as to obtain the position of the movable portion 6-200 relative to the fixed portion 6-100. The reference element 6-610 and the position sensing element 6-620 at least partially overlap when viewed along the first direction 6-D1.

Figure 45:
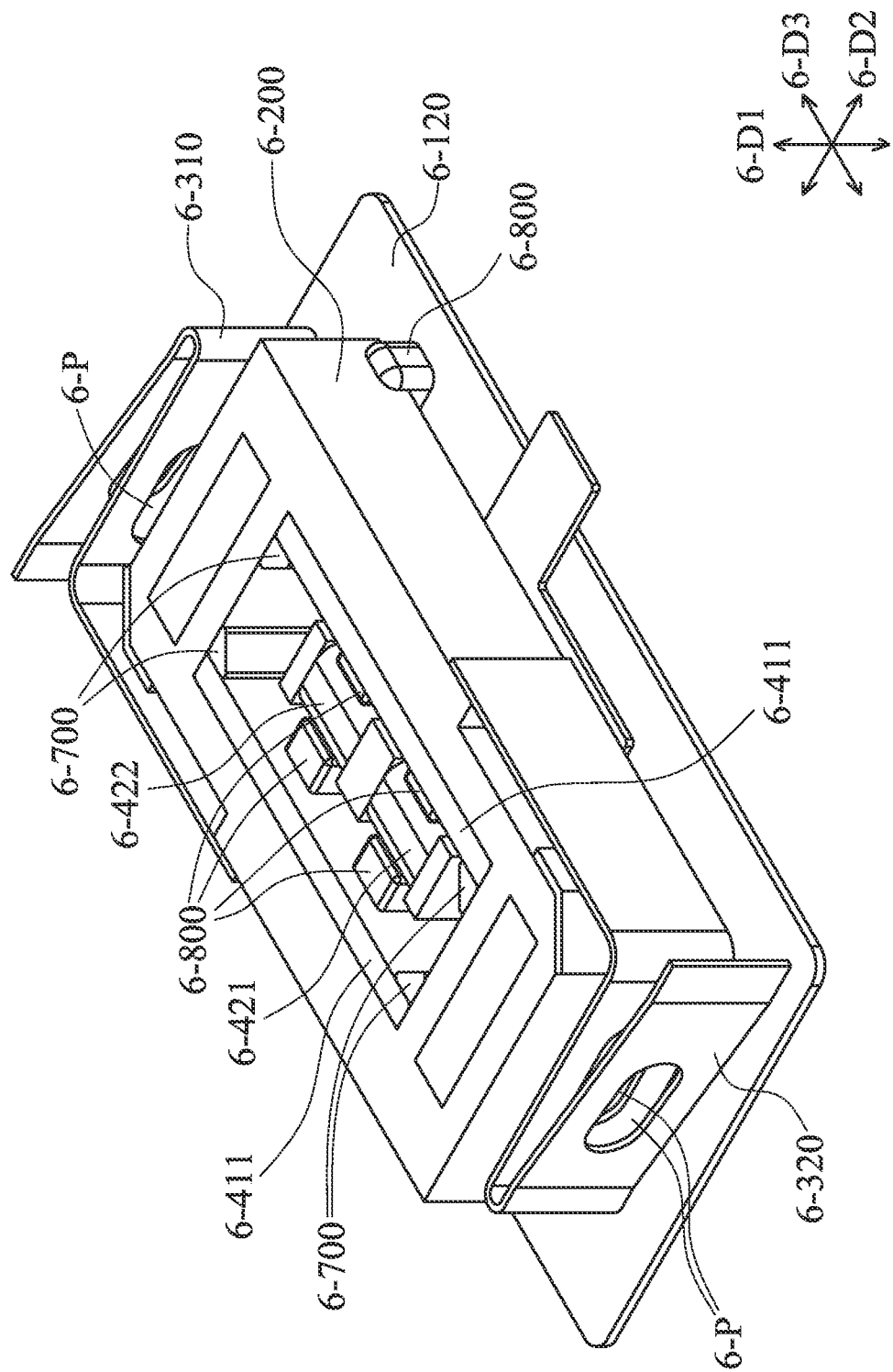
FIG. 45 is a schematic diagram of partial elements of a haptic feedback system according to an embodiment of the present disclosure.

Next, refer to FIG. 42, FIG. 43, and FIG. 45. FIG. 45 is a schematic diagram of partial elements of a haptic feedback system 6-1 according to an embodiment of the present disclosure. The buffer elements 6-700 may include gel or damping oil to reduce impact damage or noise generated when the haptic feedback system 6-1 operates. The buffer elements 6-700 are disposed between the fixed portion 6-100 and the movable portion 6-200. For example, when viewed along the first direction 6-D1, the first accommodating portion 6-217 of the movable portion 6-200 is a rectangle, and four of the buffer elements 6-700 may be disposed at four corners of the first accommodating portion 6-217 to prevent the movable portion 6-200 directly strikes the driving coil set 6-420 disposed on the fixed portion 6-100.

In addition, by the configuration of the first recessed portion 6-215 and the second recessed portion 6-216, there is a buffer distance between the connecting assembly 6-300 and the movable portion 6-200. In addition, two corners of the movable portion 6-200 close to the connecting assembly 6-300 are designed to be a non-right angle, and one of the buffer elements 6-700 is disposed between the first recessed portion 6-215 (and/or the second recessed portion 6-216) of the movable portion 6-200 and the connecting assembly 6-300 (two corners described above), which may prevent the movable portion 6-200 from hitting the connecting assembly 6-300 and breaking the connecting assembly 6-300.

The damping elements 6-800 may include gel or damping oil, etc., to accelerate the response speed of the haptic feedback system 6-1, so that the haptic feedback system 6-1 may achieve the effect of quick start and quick stop. The damping elements 6-800 are disposed between the fixed portion 6-100 and the movable portion 6-200. For example, at least one of the damping elements 6-800 may be disposed between the movable portion 6-200 and the base 6-120. And at least one of the damping elements 6-800 may be disposed between the movable portion 6-200 and the first coil 6-421 (and/or the second coil 6-422) of the driving assembly 6-400.

Next, the operation of the haptic feedback system 6-1 will be described with reference to FIG. 43. The movable portion 6-200 has a first natural frequency (more specifically, the combination of the movable portion 6-200 and the connecting assembly 6-300 has a first natural frequency), when the driving assembly 6-400 drives the movable portion 6-200 at a first exciting frequency, and when the first exciting frequency is equal to the first natural frequency, the movable portion 6-200 has a first mode of vibration relative to the fixed portion 6-100 and moves along the first mode direction 6-Dr1.

In addition, the movable portion 6-200 has a second natural frequency (more specifically, the combination of the movable portion 6-200 and the connecting assembly 6-300 has a second natural frequency), when the driving assembly 6-400 drives the movable portion 6-200 with a second exciting frequency, and when the second exciting frequency is equal to the second natural frequency, the movable portion 6-200 has a second mode of vibration relative to the fixed portion 6-100 and moves along the second mode direction 6-Dr2.

As mentioned above, the mass of the counterweight element 6-220 of the movable portion 6-200 can be changed, or the hollow pattern 6-P or the thickness of the connecting assembly 6-300 can be changed, thereby changing natural frequencies of the combination of the movable portion 6-200 and the connecting assembly 6-300. In this embodiment, the above variable factors are controlled so that the first mode direction 6-Dr1 and the second mode direction 6-Dr2 are different and not parallel. More specifically, the first mode direction 6-Dr1 and the second mode direction 6-Dr2 are perpendicular to the first direction 6-D1. In addition, in this embodiment, the driving direction 6-Df is perpendicular to the first direction 6-D1, and the driving direction 6-Df is neither parallel nor perpendicular to the first mode direction 6-Dr1 and the second mode direction 6-Dr2.

The movable portion 6-200 is subjected to two kinds of forces during the movement. One is the driving force, which is caused by the mutual interaction of magnetic fields between the driving magnet group 6-410 disposed on the movable portion 6-200 and the driving coil group 6-420 disposed on the fixed portion 6-100. The other one is the elastic restoring force of the first elastic element 6-310 and the second elastic element 6-320, and the elastic restoring force generated by the deformation of the first elastic element 6-310 and the second elastic element 6-320 under the movement of the movable portion 6-200.

In this embodiment, by the structural design of the first elastic element 6-310 and the second elastic element 6-320, that is, the first elastic element 6-310 and the second elastic element 6-320 respectively have the first segment 6-311, 6-321, the second segments 6-312, 6-322, and the third segments 6-313, 6-323, so that the first elastic element 6-310 and the second elastic element 6-320 are bent and deformed by the movement of the movable portion 6-200. Therefore, there is a deformed component in the direction that is parallel to the driving force while there is another deformed component in the direction that is perpendicular to the driving force. Thus, when the driving force is applied to the movable portion 6-200 by the driving assembly 6-400, even if the driving direction 6-Df of the driving force is not along the first mode direction 6-Dr1 or the second mode direction 6-Dr2, the movable portion 6-200 may move along the first mode direction 6-Dr1 at the first exciting frequency and may move along the second mode direction 6-Dr2 at the second exciting frequency because of the structure of the connecting assembly 6-300 mentioned above. Therefore, vibration in multiple directions may be generated by only one haptic feedback system 6-1, thus enhancing functions of the device, and light weight and low cost may be achieved.

In addition, the extension length, the first bending angle θ1, and the second bending angle 6-θ2 of the first segment 6-311, 6-321, the second segment 6-312, 6-322, and the third segment 6-313, 6-323 may also affect components of the vibration amplitude of the movable portion 6-200 in the second direction 6-D2 and the third direction 6-D3. Therefore, changing the length and angle between the segments may make the haptic feedback system 6-1 meet the components of vibration amplitude in different directions required by the device, thereby achieving custom products.

To sum up, the present disclosure provides a haptic feedback system, which is disposed in a device and includes a fixed portion, a movable portion, a connecting assembly, and a driving assembly. The fixed portion fixedly connects the device. The movable portion is movable along a first mode direction and a second mode direction relative to the fixed portion. The movable portion is movably connected to the fixed portion via the connecting assembly. The driving assembly drives the movable portion to move relative to the fixed portion by a driving force. The haptic feedback system of the present disclosure may make the movable portion move along the first mode direction or the second mode direction by the driving force along the same driving direction.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A tactile feedback system, disposed in an electronic device, comprising:
   a fixed part, affixed to the electronic device;
   a movable part, movably connected to the fixed part;
   a driving assembly, driving the movable part to move relative to the fixed part and generating a tactile feedback force to a user; and
   a control unit, transmitting a control signal to the driving assembly for driving the movable part to move relative to the fixed part,
   wherein the electronic device has a CPU and a sensing module, and the sensing module is disposed outside the tactile feedback system and transmits a first sensing signal to the CPU,
   wherein the CPU transmits a command signal to the control unit so that the control unit is adjusted to a specific control mode,
   wherein the sensing module further transmits a second sensing signal to the control unit without passing through the CPU,
   wherein a first curve is obtained by an external equipment measuring a motion of the movable part and the second sensing signal generated by the sensing module corresponding to the motion of the movable part, and the first curve represents the relationship between the motion of the movable part and the second sensing signal, and
   wherein the external equipment modifies a setting parameter of the control unit according to the first curve.

2. The tactile feedback system as claimed in claim 1, wherein the sensing module is disposed on a flat member of the electronic device, and the fixed part is affixed to the flat member, wherein the tactile feedback system electrically connects to the sensing module via a circuit assembly that is disposed on the flat member.

3. The tactile feedback system as claimed in claim 1, further comprising a sensor element, disposed in or on the fixed part for detecting a motion of the movable part, wherein the sensor element transmits a third sensing signal to the control unit, and the control unit transmits the control signal to the driving assembly according to the second and third sensing signals.

4. The tactile feedback system as claimed in claim 3, wherein a second curve is obtained by the external equipment measuring the motion of the movable part and the third sensing signal generated by the sensor element corresponding to the motion of the movable part, and the second curve represents the relationship between the motion of the movable part and the third sensing signal.

5. The tactile feedback system as claimed in claim 3, wherein the sensor element comprises a Hall sensor.

6. The tactile feedback system as claimed in claim 1, wherein the CPU transmits the command signal to the control unit according to the first sensing signal, and the control unit transmits the control signal to the driving assembly according to command signal.

7. The tactile feedback system as claimed in claim 6, wherein the control unit transmits the control signal to the driving assembly according to command signal and the second sensing signal.

8. The tactile feedback system as claimed in claim 1, wherein the tactile feedback system performs a closed-loop motion control to the movable part according to the second sensing signal.

9. The tactile feedback system as claimed in claim 1, wherein when the second sensing signal meets a first condition, the control unit controls the movable part to move in a first mode via the driving assembly, and when the second sensing signal meets a second condition, the control unit controls the movable part to move in a second mode via the driving assembly.

10. The tactile feedback system as claimed in claim 1, wherein the driving assembly includes a coil disposed on the fixed part and a magnet disposed on the movable part.

11. The tactile feedback system as claimed in claim 1, wherein the sensing module constitutes at least a part of a user interface of the electronic device.

12. The tactile feedback system as claimed in claim 1, wherein the second sensing signal is greater than or less than the first sensing signal.

13. The tactile feedback system as claimed in claim 1, wherein the second sensing signal is equal to the first sensing signal.

14. The tactile feedback system as claimed in claim 1, wherein the fixed part, the movable part, and the driving assembly constitute at least a part of a linear resonant actuator (LRA).

* * * * *